US011991765B2

(12) United States Patent
Patil et al.

(10) Patent No.: US 11,991,765 B2
(45) Date of Patent: May 21, 2024

(54) MECHANISMS TO SUPPORT SECONDARY CHANNEL OPERATION

(71) Applicant: QUALCOMM Incorporated, San Diego, CA (US)

(72) Inventors: Abhishek Pramod Patil, San Diego, CA (US); Alfred Asterjadhi, San Diego, CA (US); Youhan Kim, Saratoga, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/464,096

(22) Filed: Sep. 1, 2021

(65) Prior Publication Data

US 2021/0400751 A1    Dec. 23, 2021

Related U.S. Application Data

(62) Division of application No. 16/234,314, filed on Dec. 27, 2018, now Pat. No. 11,234,282.
(Continued)

(51) Int. Cl.
*H04W 76/15* (2018.01)
*H04W 52/02* (2009.01)
(Continued)

(52) U.S. Cl.
CPC ....... *H04W 76/15* (2018.02); *H04W 52/0216* (2013.01); *H04W 52/0219* (2013.01);
(Continued)

(58) Field of Classification Search
CPC ........... H04W 74/006; H04W 52/0219; H04W 76/15; H04W 76/40; H04W 52/0216; H04W 84/12; Y02D 30/70
See application file for complete search history.

(56) References Cited

U.S. PATENT DOCUMENTS 10,004,031 B2    6/2018  Seok
10,314,025 B1    6/2019  Chu et al.
(Continued)

FOREIGN PATENT DOCUMENTS

CN    102160447 A    8/2011
CN    103348742 A    10/2013
(Continued)

OTHER PUBLICATIONS

International Search Report and Written Opinion—PCT/US2018/067942—ISA/EPO—dated May 7, 2019.
(Continued)

*Primary Examiner* — Maharishi V Khirodhar
*Assistant Examiner* — Kenneth P Hunt
(74) *Attorney, Agent, or Firm* — Kevin M. Donnelly; Holland & Hart LLP

(57) ABSTRACT

Methods, systems, and devices for wireless communication are described. The described techniques relate to improved methods, systems, devices, or apparatuses that support a 20 MHz station (STA) parked on a secondary channel. Without the described techniques, mechanisms to support secondary channel operation may be unable to receive management frames or broadcast traffic from an access point (AP), which may cause the STA to lose synchronization with the AP, miss a channel change or other critical announcement from the AP, etc. Considerations for providing such information to STAs parked on a secondary channel are discussed. In some examples, an AP may restrict resource unit allocation to the secondary channel on which the STA is parked. In some cases, a trigger-based random access mechanism may utilize aspects of the present disclosure to limit access to certain resource units to STAs on a given secondary channel.

28 Claims, 37 Drawing Sheets

Related U.S. Application Data

(60) Provisional application No. 62/760,910, filed on Nov. 13, 2018, provisional application No. 62/726,979, filed on Sep. 4, 2018, provisional application No. 62/615,922, filed on Jan. 10, 2018, provisional application No. 62/615,926, filed on Jan. 10, 2018.

(51) Int. Cl.
*H04W 74/00* (2009.01)
*H04W 76/40* (2018.01)
*H04W 84/12* (2009.01)

(52) U.S. Cl.
CPC ......... *H04W 74/006* (2013.01); *H04W 76/40* (2018.02); *H04W 84/12* (2013.01)

(56) References Cited

U.S. PATENT DOCUMENTS

| | | | | |
|---|---|---|---|---|
| 11,234,282 | B2* | 1/2022 | Patil | H04W 74/006 |
| 2013/0128798 | A1* | 5/2013 | Liu | H04W 48/12 370/312 |
| 2013/0195029 | A1 | 8/2013 | Wang et al. | |
| 2014/0092860 | A1* | 4/2014 | Kneckt | H04W 74/08 370/329 |
| 2015/0341758 | A1* | 11/2015 | Aggarwal | H04W 4/06 370/329 |
| 2016/0127521 | A1* | 5/2016 | Wentink | H04L 5/0053 370/329 |
| 2016/0174200 | A1* | 6/2016 | Seok | H04L 5/0092 370/329 |
| 2016/0219512 | A1 | 7/2016 | Asterjadhi et al. | |
| 2016/0249357 | A1 | 8/2016 | Green et al. | |
| 2016/0381704 | A1* | 12/2016 | Chu | H04W 52/0229 370/329 |
| 2017/0104570 | A1 | 4/2017 | Kim et al. | |
| 2017/0338935 | A1 | 11/2017 | Ahn et al. | |
| 2018/0205584 | A1 | 7/2018 | Lim et al. | |
| 2018/0227917 | A1* | 8/2018 | Li | H04W 72/21 |
| 2019/0090253 | A1 | 3/2019 | Da Silva et al. | |
| 2019/0215884 | A1 | 7/2019 | Patil et al. | |
| 2019/0246354 | A1 | 8/2019 | Huang et al. | |

FOREIGN PATENT DOCUMENTS

| | | |
|---|---|---|
| CN | 105682247 A | 6/2016 |
| CN | 106470090 A | 3/2017 |
| CN | 107079470 A | 8/2017 |
| EP | 3291611 A1 | 3/2018 |
| WO | WO2012054412 A1 | 4/2012 |
| WO | WO2016072909 A1 | 5/2016 |
| WO | WO-2016133623 A1 | 8/2016 |
| WO | WO-2016163639 A1 | 10/2016 |
| WO | WO2016175435 A1 | 11/2016 |
| WO | WO-2017018615 A1 | 2/2017 |

OTHER PUBLICATIONS

International Preliminary Report on Patentability—PCT/US2018/067942, The International Bureau of WIPO—Geneva, Switzerland, dated Jul. 23, 2020.
Partial International Search Report—PCT/US2018/067942—ISA/EPO—dated Mar. 14, 2019.
Taiwan Search Report—TW111122124—TIPO—dated Mar. 9, 2023.
Taiwan Search Report—TW108100031—TIPO—dated Apr. 26, 2022.
Chu L., "LB225 11ax D1.0 Comment Resolution 27.11.1, 27.11.2", IEEE Draft, 11-17-1282-04-00AX, IEEE-SA Mentor, Piscataway, NJ, USA, vol. 802.11ax, No. 4, Sep. 12, 2017, XP068116856, pp. 1-5.
European Search Report—EP23180945—Search Authority—The Hague—dated Sep. 11, 2023.
European Search Report—EP23181472—Search Authority—The Hague—dated Sep. 18, 2023.
"High Efficiency (HE) MAC specification", IEEE Draft, TGAX_CL_27, IEEE-SA, Piscataway, NJ, USA, vol. 802.11ax drafts, No. D2.1, Jan. 5, 2018, XP068137519, 113 pages.

* cited by examiner

MECHANISMS TO SUPPORT SECONDARY CHANNEL OPERATION

CROSS REFERENCES

The present application for patent is a Divisional of U.S. patent application Ser. No. 16/234,314 by PATIL et al., entitled "MECHANISMS TO SUPPORT SECONDARY CHANNEL OPERATION" filed Dec. 27, 2018, which claims the benefit of U.S. Provisional Patent Application No. 62/615,922 by PATIL et al., entitled "MECHANISMS TO SUPPORT SECONDARY CHANNEL OPERATION," filed Jan. 10, 2018, and to U.S. Provisional Patent Application No. 62/726,979 by PATIL et al., entitled "MECHANISMS TO SUPPORT SECONDARY CHANNEL OPERATION" filed Sep. 4, 2018, and to U.S. Provisional Patent Application No. 62/615,926 by PATIL et al., entitled "MULTIPLE BASIC SERVICE SETS SUPPORTING SECONDARY CHANNELS" filed Jan. 10, 2018, and to U.S. Provisional Patent Application No. 62/760,910 by PATIL et al., entitled "MECHANISMS TO SUPPORT SECONDARY CHANNEL OPERATION" filed Nov. 13, 2018, which are assigned to the assignee hereof, and expressly incorporated by reference herein.

BACKGROUND

The following relates generally to wireless communications, and more specifically to mechanisms to support secondary channel operations, including a station (STA) parked on a secondary channel and multiple basic service sets supporting secondary channels.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more STAs or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

Devices in a WLAN may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. The wireless connection between an AP and STA may be referred to as a channel or link. Users may access these radio frequency spectrum bands using various contention-based protocols (e.g., as specified by one or more versions of IEEE 802.11). Each band (e.g., the 5 GHz band) may contain multiple channels (e.g., each spanning 20 MHz in frequency, 40 MHz in frequency, 80 MHz in frequency, etc.), each of which may be usable by an AP or STA. A channel may support multiple connections (e.g., between multiple STAs and the AP) in a multiple access configuration (e.g., orthogonal frequency division multiple access (OFDMA)). In some cases, the load or demand on one channel (e.g., secondary channels of a 40 MHz total bandwidth, 80 MHz total bandwidth, etc.) may be low at a particular time or during a certain time duration, while the load or demand may be high on other channels (e.g., the primary channel of the total bandwidth) during or at such time. Improved methods for allocating wireless resources for STAs among channels of the total bandwidth may thus be desired.

SUMMARY

The described techniques relate to improved methods, systems, devices, or apparatuses that support a station (STA) parked on a secondary channel. Generally, the described techniques provide for mechanisms to convey information to STAs parked (e.g., camped, tuned to, monitoring, etc.) on the secondary channel. An access point (AP) may periodically transmit frames (e.g., broadcast frames, beacons, control frames, management frames, etc.) to enable any STAs within wireless range of the AP to establish (or maintain) a communication link with the AP. In some cases, such frames may be carried on a primary channel of the AP, where the primary channel may refer to a portion of a frequency spectrum across which the AP operates (e.g., a 20 MHz portion of spectrum, a 40 MHz portion of spectrum, etc.). In some examples, the AP may support data communications over a relatively broad channel (e.g., a 160 MHz channel, 320 MHz channel, 80+80 MHz channel, 160+160 MHz channel, etc.), but may transmit beacons (or other control information) on the primary channel (e.g., over a 20 MHz primary channel portion or 40 MHz primary channel portion of the 160 MHz total bandwidth). Because the primary channel may carry a large number of communications (e.g., beacons, management frames, group address frames, etc.), a STA that is tuned into the primary channel may be required to process a large number of signals, at least some of which may not be intended for the STA, for example because they may be intended for other STAs. Such processing may be problematic (e.g., for low power devices, such as internet of things or machine type communication devices) in terms of power consumption, wireless resource congestion, etc.

In accordance with the described techniques, a STA may be able to receive beacons (or other control or management information) from an AP over another channel, such as a secondary channel of the total AP bandwidth. Such techniques may provide for reduced power consumption at the STA, reduced communication load on the primary channel, and/or higher flexibility of resource allocation in the wireless system.

Mechanisms to support secondary channel operation, which may refer to any of one or more non-primary channels of an AP, may negotiate a target wake time (TWT) schedule, or another communication schedule (e.g., pre-configured, or negotiated between the AP and the STA) with the AP, where the TWT schedule is for the particular secondary channel. During the negotiation, the STA may indicate its preferred secondary channel (e.g., in addition to a wakeup schedule for the indicated channel). The AP may then coordinate communications with the STA such that the communications occur during a wakeup period (e.g., a service period) of the TWT schedule over the secondary channel. In some other cases, the STA may be capable of communicating with the AP over a wider bandwidth (i.e., more than one secondary channel). In such cases, the STA may transmit an indication of its communication capability to the AP. In some circumstances, the STA and AP may communicate using the wider bandwidth as long as one or more constraints are satisfied. For instance, the wider bandwidth comprising multiple secondary channels may be utilized as long as the indicated secondary channel (i.e., preferred secondary channel indicated by STA) is within the wider bandwidth. In some case, this wider bandwidth may be wider than the BSS bandwidth set up by the AP. For example, the AP may have established a 80 MHz bandwidth for a BSS, and the wider bandwidth may be 160 MHz. In some cases, the STA may monitor the primary channel of the AP for delivery traffic indication message (DTIM) beacons or other group addressed traffic. For example, the STA may monitor the primary channel in accordance with a DTIM target beacon transmission time (TBTT) of the AP. Additionally or alternatively, the STA may monitor for beacons (e.g., or other group addressed traffic) on its indicated secondary channel.

In some examples, the secondary channels may be non-contiguous, and one, more than one, or all the secondary channels may be on-contiguous with the primary channel, such that there may be a gap in frequency between adjacent channels of an AP bandwidth.

In some cases, the AP may assign a directed resource unit (RU) to the STA in the indicated secondary channel as part of a multi-user downlink data packet. In another example, the AP may define one or more new association identifiers (AIDs) to indicate a broadcast RU (e.g., an RU carrying information for one or more STAs) on the secondary channel. In some examples, each secondary channel may have a respective identifier (e.g., AID) indicating a broadcast RU for that channel. Additionally or alternatively, multiple secondary channels (e.g., each associated with the same AP) may share (e.g., in a time-division multiplexing fashion) an identifier (e.g., an AID) indicating a broadcast RU for a given secondary channel at a given time. In some cases, the AP may transmit the management frames (e.g., group-addressed frames) or any other critical announcements on the secondary channel in non-high throughput (non-HT) duplicate packets (e.g., duplicated in each channel across the total bandwidth with an explicit indication of the primary channel associated with the packet). In some examples, an AP may regulate random access RU assignment between the primary channel and the secondary channel(s).

In some examples, the STA may have strict latency requirements. In such cases, the AP may park the STA having the low latency traffic on a secondary channel (e.g., indicated secondary channel of the STA), while supporting one or more stations (e.g., Enhanced Distributed Channel Access (EDCA) stations) on the primary channel. In some cases, EDCA stations may be examples of client devices that are allowed to have unsolicited access (i.e., contention free access) to the medium. For instance, EDCA may provide for contention-free access to a channel for a certain period, which may be referred to as a transmission opportunity (TxOP). In some aspects, the AP may schedule the low latency client or STA on the secondary channel, which may serve to limit the interference or interruption the STA experiences from traffic originating from the one or more EDCA stations.

A method for wireless communication at a station is described. The method may include transmitting, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels, receiving a response to the transmitted request, the received response including an indication of whether at least one resource unit for the station will be transmitted in the indicated first set of two or more channels or in the second set of two or more channels, and determining, based on the indication in the received response, a primary channel for the station in the indicated first set of two or more channels or in the second set of two or more channels.

An apparatus for wireless communication at a station is described. The apparatus may include a processor, memory in electronic communication with the processor, and instructions stored in the memory. The instructions may be executable by the processor to cause the apparatus to transmit, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels, receive a response to the transmitted request, the received response including an indication of whether at least one resource unit for the station will be transmitted in the indicated first set of two or more channels or in the second set of two or more channels, and determine, based on the indication in the received response, a primary channel for the station in the indicated first set of two or more channels or in the second set of two or more channels.

Another apparatus for wireless communication at a station is described. The apparatus may include means for transmitting, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels, means for receiving a response to the transmitted request, the received response including an indication of whether at least one resource unit for the station will be transmitted in the indicated first set of two or more channels or in the second set of two or more channels, and means for determining, based on the indication in the received response, a primary channel for the station in the indicated first set of two or more channels or in the second set of two or more channels.

A non-transitory computer-readable medium storing code for wireless communication at a station is described. The code may include instructions executable by a processor to transmit, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels, receive a response to the transmitted request, the received response including an indication of whether at least one resource unit for the station will be transmitted in the indicated first set of two or more channels or in the second set of two or more channels, and determine, based on the indication in the received response, a primary channel for the station in the indicated first set of two or more channels or in the second set of two or more channels.

In some examples of the method, apparatuses, and non-transitory computer-readable medium described herein, determining the primary channel for the station may include operations, features, means, or instructions for identifying, in the received response, a set of two or more bits corresponding to the indicated first set of two or more channels or the second set of two or more bits, identifying one bit of the set of two or more bits as having a different value than a remaining one or more bits of the set of two or more bits, and determining the primary channel as corresponding to the identified one bit.

In some examples of the method, apparatuses, and non-transitory computer-readable medium described herein, the transmitted request includes a first set of two or more bits corresponding to the first set of two or more channels, each bit of the first set of two or more bits corresponding to one channel of the first set of two or more channels, and the response to the transmitted request includes at least one bit of the set of two or more bits having a same value as a corresponding bit of the first set of two or more bits.

Some examples of the method, apparatuses, and non-transitory computer-readable medium described herein may further include operations, features, means, or instructions for determining secondary channels of the first set of two or more channels corresponding to the at least one bit of the set of two or more bits having the same value as the corresponding bit of the first set of two or more bits.

In some examples of the method, apparatuses, and non-transitory computer-readable medium described herein, at least one channel separates, in frequency, the first set of two or more channels from the second set of two or more channels.

In some examples of the method, apparatuses, and non-transitory computer-readable medium described herein, the first set of two or more channels includes a first 80 MHz of a 80+80 MHz operating mode, and the second set of two or more channels includes a second 80 MHz of a 80+80 MHz operating mode.

In some examples of the method, apparatuses, and non-transitory computer-readable medium described herein, the first set of two or more channels may be adjacent the second set of two or more channels in frequency.

In some examples of the method, apparatuses, and non-transitory computer-readable medium described herein, the transmitted request includes a first TWT channel field that identifies the first set of two or more channels of the total bandwidth, and the response to the transmitted request includes a second TWT channel field that identifies the indicated first set of two or more channels or the second set of two or more channel to indicate whether at least one resource unit for the station will be transmitted in the indicated first set of two or more channels or in the second set of two or more channels.

In some examples of the method, apparatuses, and non-transitory computer-readable medium described herein, the received response to the transmitted request includes a TWT response.

Some examples of the method, apparatuses, and non-transitory computer-readable medium described herein may further include operations, features, means, or instructions for performing an association procedure with the access point, where the request may be transmitted to the access point after the association procedure may be performed.

Some examples of the method, apparatuses, and non-transitory computer-readable medium described herein may further include operations, features, means, or instructions for performing an association procedure with the access point after determining the primary channel for the station.

In some examples of the method, apparatuses, and non-transitory computer-readable medium described herein, performing the association procedure may include operations, features, means, or instructions for transmitting, to the access using the determined primary channel, a request to associate with the access point.

In some examples of the method, apparatuses, and non-transitory computer-readable medium described herein, the transmitted request includes a probe request, or a probe response, or an association request response, or a reassociation request response, or a TWT request, or a TWT response, or an action frame, or a combination thereof, and the received response includes a probe request, or a probe response, or an association request response, or a reassociation request response, or a TWT request, or a TWT response, or an action frame, or a combination thereof.

Some examples of the method, apparatuses, and non-transitory computer-readable medium described herein may further include operations, features, means, or instructions for receiving, from the access point, an operating mode indication identifying a second primary channel for the station; and, and switching, based on the received operating mode indication, to monitoring the second primary channel from monitoring the determined primary channel.

Some examples of the method, apparatuses, and non-transitory computer-readable medium described herein may further include operations, features, means, or instructions for transmitting, in a capability element, an indication that the station supports subchannel selective transmission, the request transmitted based on the capability element.

A method for wireless communication at an access point is described. The method may include receiving, from a station, a target wake time request that indicates a first set of two or more channels of a total bandwidth of the access point, the access point operating using a set of channels of the total bandwidth to communicate with a set of stations including the station, the set of channels including the first set of two or more channels and a second set of two or more channels, identifying, based on the received request, a primary channel for the station in the indicated first set of two or more channels or in the second set of two or more channels, and transmitting, to the station, a response to the received request, the transmitted response including an indication of whether at least one resource unit for the station will be transmitted in the indicated first set of two or more channels or in the second set of two or more channels, and indicated the identified primary channel of the station.

An apparatus for wireless communication at an access point is described. The apparatus may include a processor, memory in electronic communication with the processor, and instructions stored in the memory. The instructions may be executable by the processor to cause the apparatus to receive, from a station, a target wake time request that indicates a first set of two or more channels of a total bandwidth of the access point, the access point operating using a set of channels of the total bandwidth to communicate with a set of stations including the station, the set of channels including the first set of two or more channels and a second set of two or more channels, identify, based on the received request, a primary channel for the station in the indicated first set of two or more channels or in the second set of two or more channels, and transmit, to the station, a response to the received request, the transmitted response including an indication of whether at least one resource unit for the station will be transmitted in the indicated first set of two or more channels or in the second set of two or more channels, and indicated the identified primary channel of the station.

Another apparatus for wireless communication at an access point is described. The apparatus may include means for receiving, from a station, a target wake time request that indicates a first set of two or more channels of a total bandwidth of the access point, the access point operating using a set of channels of the total bandwidth to communicate with a set of stations including the station, the set of channels including the first set of two or more channels and a second set of two or more channels, means for identifying, based on the received request, a primary channel for the station in the indicated first set of two or more channels or in the second set of two or more channels, and means for transmitting, to the station, a response to the received request, the transmitted response including an indication of whether at least one resource unit for the station will be transmitted in the indicated first set of two or more channels or in the second set of two or more channels, and indicated the identified primary channel of the station.

A non-transitory computer-readable medium storing code for wireless communication at an access point is described. The code may include instructions executable by a processor to receive, from a station, a target wake time request that indicates a first set of two or more channels of a total bandwidth of the access point, the access point operating using a set of channels of the total bandwidth to communicate with a set of stations including the station, the set of channels including the first set of two or more channels and a second set of two or more channels, identify, based on the received request, a primary channel for the station in the indicated first set of two or more channels or in the second set of two or more channels, and transmit, to the station, a response to the received request, the transmitted response including an indication of whether at least one resource unit for the station will be transmitted in the indicated first set of two or more channels or in the second set of two or more channels, and indicated the identified primary channel of the station.

Some examples of the method, apparatuses, and non-transitory computer-readable medium described herein may further include operations, features, means, or instructions for transmitting the response to the received request includes transmitting a set of two or more bits corresponding to the indicated first set of two or more channels, where one bit of the set of two or more bits may have a different value than a remaining one or more bits of the set of two or more bits.

In some examples of the method, apparatuses, and non-transitory computer-readable medium described herein, the received request includes a first set of two or more bits corresponding to the first set of two or more channels, each bit of the first set of two or more bits corresponding to one channel of the first set of two or more channels, and the response to the received request includes at least one bit of the set of two or more bits having a same value as a corresponding bit of the first set of two or more bits to indicate secondary channel of the first set of two or more channels.

In some examples of the method, apparatuses, and non-transitory computer-readable medium described herein, at least one channel separates, in frequency, the first set of two or more channels from the second set of two or more channels.

In some examples of the method, apparatuses, and non-transitory computer-readable medium described herein, the first set of two or more channels includes a first 80 MHz of a 80+80 MHz operating mode, and the second set of two or more channels includes a second 80 MHz of a 80+80 MHz operating mode.

In some examples of the method, apparatuses, and non-transitory computer-readable medium described herein, the first set of two or more channels may be adjacent the second set of two or more channels in frequency.

In some examples of the method, apparatuses, and non-transitory computer-readable medium described herein, the received request includes a first TWT channel field that identifies the first set of two or more channels of the total bandwidth, and the response to the received request includes a second TWT channel field that identifies the indicated first set of two or more channels or the second set of two or more channel to indicate whether at least one resource unit for the station will be transmitted in the indicated first set of two or more channels or in the second set of two or more channels.

In some examples of the method, apparatuses, and non-transitory computer-readable medium described herein, the response to the received request includes a TWT response.

Some examples of the method, apparatuses, and non-transitory computer-readable medium described herein may further include operations, features, means, or instructions for performing an association procedure with the station, where the request may be received from the station after the association procedure may be performed.

Some examples of the method, apparatuses, and non-transitory computer-readable medium described herein may further include operations, features, means, or instructions for performing an association procedure with the station after transmitting the response to the received request.

In some examples of the method, apparatuses, and non-transitory computer-readable medium described herein, performing the association procedure may include operations, features, means, or instructions for receiving, from the station on the identified primary channel, a request to associate with the access point.

In some examples of the method, apparatuses, and non-transitory computer-readable medium described herein, the received request includes a probe request, or a probe response, or an association request response, or a reassociation request response, or a TWT request, or a TWT response, or an action frame, or a combination thereof, and the transmitted response includes a probe request, or a probe response, or an association request response, or a reassociation request response, or a TWT request, or a TWT response, or an action frame, or a combination thereof.

Some examples of the method, apparatuses, and non-transitory computer-readable medium described herein may further include operations, features, means, or instructions for transmitting, to the station, an operating mode indication identifying a second primary channel for the station, the station to switch, in response to the transmitted operating mode indication, to monitoring the second primary channel from monitoring the identified primary channel.

Some examples of the method, apparatuses, and non-transitory computer-readable medium described herein may further include operations, features, means, or instructions for receiving, in a capability element from the station, an indication that the station supports subchannel selective transmission, the TWT request received based on the capability element.

A method for wireless communication at a station is described. The method may include listening for transmissions from an access point on a primary channel of the access point, the access point operating using the primary channel and one or more secondary channels of a total bandwidth of the access point, receiving, from the access point on the primary channel, a communication addressed to one or more stations that includes the station, and exchanging, based on the received communication, one or more frames with the access point on one or more secondary channels, including at least a first secondary channel.

An apparatus for wireless communication at a station is described. The apparatus may include a processor, memory in electronic communication with the processor, and instructions stored in the memory. The instructions may be executable by the processor to cause the apparatus to listen for transmissions from an access point on a primary channel of the access point, the access point operating using the primary channel and one or more secondary channels of a total bandwidth of the access point, receive, from the access point on the primary channel, a communication addressed to one or more stations that includes the station, and exchange, based on the received communication, one or more frames with the access point on one or more secondary channels, including at least a first secondary channel.

Another apparatus for wireless communication at a station is described. The apparatus may include means for listening for transmissions from an access point on a primary channel of the access point, the access point operating using the primary channel and one or more secondary channels of a total bandwidth of the access point, means for receiving, from the access point on the primary channel, a communication addressed to one or more stations that includes the station, and means for exchanging, based on the received communication, one or more frames with the access point on one or more secondary channels, including at least a first secondary channel.

A non-transitory computer-readable medium storing code for wireless communication at a station is described. The code may include instructions executable by a processor to listen for transmissions from an access point on a primary channel of the access point, the access point operating using the primary channel and one or more secondary channels of a total bandwidth of the access point, receive, from the access point on the primary channel, a communication addressed to one or more stations that includes the station, and exchange, based on the received communication, one or more frames with the access point on one or more secondary channels, including at least a first secondary channel.

In some examples of the method, apparatuses, and non-transitory computer-readable medium described herein, receiving the communication may include operations, features, means, or instructions for receiving a set of beacons.

In some examples of the method, apparatuses, and non-transitory computer-readable medium described herein, at least one beacon of the set of beacons includes a delivery traffic indication map (DTIM).

In some examples of the method, apparatuses, and non-transitory computer-readable medium described herein, the DTIM may be addressed to a group of stations that includes the station.

In some examples of the method, apparatuses, and non-transitory computer-readable medium described herein, receiving the communication may include operations, features, means, or instructions for receiving a unicast communication addressed to the station.

In some examples of the method, apparatuses, and non-transitory computer-readable medium described herein, receiving the communication may include operations, features, means, or instructions for receiving a broadcast communication addressed to a group of stations.

Some examples of the method, apparatuses, and non-transitory computer-readable medium described herein may further include operations, features, means, or instructions for transmitting, on the primary channel, an indication that the station may be available to receive one or more frames on one or more secondary channels, including at least the first secondary channel.

Some examples of the method, apparatuses, and non-transitory computer-readable medium described herein may further include operations, features, means, or instructions for receiving, on the primary channel, a trigger frame from the access point, and identifying, based on the received trigger frame, a resource unit of the first secondary channel of the one or more secondary channels for the station to use to transmit uplink frames to the access point in response to the received trigger frame.

In some examples of the method, apparatuses, and non-transitory computer-readable medium described herein, listening for the transmissions from the access point may include operations, features, means, or instructions for listening for the transmissions from the access point during a set of target wake time (TWT) service periods (SPs) defined by a TWT schedule.

Some examples of the method, apparatuses, and non-transitory computer-readable medium described herein may further include operations, features, means, or instructions for transmitting a TWT request to the access point, receiving a TWT response from the access point, and identifying the TWT schedule based on the transmitted TWT request and the received TWT response.

In some examples of the method, apparatuses, and non-transitory computer-readable medium described herein, the TWT schedule may be identified for the first secondary channel.

In some examples of the method, apparatuses, and non-transitory computer-readable medium described herein, the TWT request may be transmitted to the access point on the primary channel, and the TWT response may be received from the access point on the primary channel.

In some examples of the method, apparatuses, and non-transitory computer-readable medium described herein, the set of beacons include a subset of all beacons transmitted by an access point on the primary channel.

In some examples of the method, apparatuses, and non-transitory computer-readable medium described herein, the station exchanges data frames with the access point on the first secondary channel exclusive of transmissions on the primary channel.

In some examples of the method, apparatuses, and non-transitory computer-readable medium described herein, a bandwidth of the primary channel may be 20 MHz, a bandwidth of the first secondary channel may be 20 MHz, and the total bandwidth of the access point may be an integer multiple of 20 MHz.

In some examples of the method, apparatuses, and non-transitory computer-readable medium described herein, the station may be configured to communicate with the access point using a latency below a threshold.

In some examples of the method, apparatuses, and non-transitory computer-readable medium described herein, the station may be configured to communicate with the access point according to an Enhanced Distributed Channel Access (EDCA) protocol.

In some examples of the method, apparatuses, and non-transitory computer-readable medium described herein, the station exchanges data frames with the access point on the primary channel.

Some examples of the method, apparatuses, and non-transitory computer-readable medium described herein may further include operations, features, means, or instructions for transmitting a Request to Send (RTS) to the access point to block a first set of one or more secondary channels of the total bandwidth of the access point, including the first secondary channel, and receiving a Clear to Send (CTS) message from the access point in response to the transmitted RTS, the CTS message blocking the total bandwidth.

A method for wireless communication at an access point is described. The method may include identifying that a station is associated with the access point on a first secondary channel of the access point, where the access point operates using a primary channel and one or more secondary channels, including the first secondary channel, of a total bandwidth of the access point to communicate with a set of stations including the station, receiving, from the station on the primary channel, an indication that the station is available to receive frames on one or more secondary channels, including at least the first secondary channel, identifying, in response to the received indication, one or more resource units of the one or more secondary channels, including at least a first resource unit of the first secondary channel for the access point to use to transmit frames to the station, and transmitting one or more frames using the one or more identified resource units of the one or more secondary channels, including at least the first resource unit of the first secondary channel.

An apparatus for wireless communication at an access point is described. The apparatus may include a processor, memory in electronic communication with the processor, and instructions stored in the memory. The instructions may be executable by the processor to cause the apparatus to identify that a station is associated with the access point on a first secondary channel of the access point, where the access point operates using a primary channel and one or more secondary channels, including the first secondary channel, of a total bandwidth of the access point to communicate with a set of stations including the station, receive, from the station on the primary channel, an indication that the station is available to receive frames on one or more secondary channels, including at least the first secondary channel, identify, in response to the received indication, one or more resource units of the one or more secondary channels, including at least a first resource unit of the first secondary channel for the access point to use to transmit frames to the station, and transmit one or more frames using the one or more identified resource units of the one or more secondary channels, including at least the first resource unit of the first secondary channel.

Another apparatus for wireless communication at an access point is described. The apparatus may include means for identifying that a station is associated with the access point on a first secondary channel of the access point, where the access point operates using a primary channel and one or more secondary channels, including the first secondary channel, of a total bandwidth of the access point to communicate with a set of stations including the station, means for receiving, from the station on the primary channel, an indication that the station is available to receive frames on one or more secondary channels, including at least the first secondary channel, means for identifying, in response to the received indication, one or more resource units of the one or more secondary channels, including at least a first resource unit of the first secondary channel for the access point to use to transmit frames to the station, and means for transmitting one or more frames using the one or more identified resource units of the one or more secondary channels, including at least the first resource unit of the first secondary channel.

A non-transitory computer-readable medium storing code for wireless communication at an access point is described. The code may include instructions executable by a processor to identify that a station is associated with the access point on a first secondary channel of the access point, where the access point operates using a primary channel and one or more secondary channels, including the first secondary channel, of a total bandwidth of the access point to communicate with a set of stations including the station, receive, from the station on the primary channel, an indication that the station is available to receive frames on one or more secondary channels, including at least the first secondary channel, identify, in response to the received indication, one or more resource units of the one or more secondary channels, including at least a first resource unit of the first secondary channel for the access point to use to transmit frames to the station, and transmit one or more frames using the one or more identified resource units of the one or more secondary channels, including at least the first resource unit of the first secondary channel.

Some examples of the method, apparatuses, and non-transitory computer-readable medium described herein may further include operations, features, means, or instructions for assigning the first resource unit of the first secondary channel to the station, where the first resource unit may be a directed resource unit for the station.

Some examples of the method, apparatuses, and non-transitory computer-readable medium described herein may further include operations, features, means, or instructions for identifying a unicast association identifier (AID) for the station, and transmitting an indication of the unicast AID for the station on the first secondary channel with the one or more frames.

Some examples of the method, apparatuses, and non-transitory computer-readable medium described herein may further include operations, features, means, or instructions for transmitting an aggregated media access control protocol data unit (A-MPDU) to the station, the A-MPDU including an indication of the unicast AID for the station.

In some examples of the method, apparatuses, and non-transitory computer-readable medium described herein, transmitting the one or more frames may include operations, features, means, or instructions for broadcasting one or more control frames or management frames for receipt by a set of stations, including the station, associated with the access point on the first secondary channel, where the identified first resource unit includes a broadcast resource unit.

Some examples of the method, apparatuses, and non-transitory computer-readable medium described herein may further include operations, features, means, or instructions for identifying a broadcast association identifier (AID) for a set of stations associated with the access point on the first secondary channel, including the station, and transmitting an indication of the broadcast AID for the set of stations with the one or more control frames or management frames.

Some examples of the method, apparatuses, and non-transitory computer-readable medium described herein may further include operations, features, means, or instructions for identifying an association identifier (AID) for the one or more secondary channels, where the AID applies to one or more secondary channels of a set of secondary channels for a set of time intervals based on a channel rotation schedule.

Some examples of the method, apparatuses, and non-transitory computer-readable medium described herein may further include operations, features, means, or instructions for transmitting an indication of the identified AID on the first secondary channel during a first time interval of the channel rotation schedule, and transmitting the indication of the identified AID on a second secondary channel during a second time interval of the channel rotation schedule.

In some examples of the method, apparatuses, and non-transitory computer-readable medium described herein, the one or more frames include a time synchronization function (TSF), or a traffic information, or a probe response, or a traffic indication map (TIM), or a combination thereof.

Some examples of the method, apparatuses, and non-transitory computer-readable medium described herein may further include operations, features, means, or instructions for receiving, from the station, a target wake time (TWT) request including an indication of the first secondary channel.

In some examples of the method, apparatuses, and non-transitory computer-readable medium described herein, the one or more frames include control frames or management frames.

Some examples of the method, apparatuses, and non-transitory computer-readable medium described herein may further include operations, features, means, or instructions for receiving, from the station, an indication of a latency threshold, identifying, in response to the received indication, one or more resource units of the primary channel, and transmitting, to one or more stations of the set of stations, excluding the station, one or more frames using the one or more identified resource units of the primary channel.

In some examples of the method, apparatuses, and non-transitory computer-readable medium described herein, the one or more stations of the set stations, excluding the station, may be configured to communicate with the access point according to an Enhanced Distributed Channel Access (EDCA) protocol.

Some examples of the method, apparatuses, and non-transitory computer-readable medium described herein may further include operations, features, means, or instructions for receiving, from the station, a Request to Send (RTS) message to block a first set of one or more secondary channels of the total bandwidth of the access point, including the first secondary channel, and transmitting, to the station, a Clear to Send (CTS) message, where the CTS message blocks the total bandwidth of the access point.

A method for wireless communication at a station is described. The method may include listening, on a primary channel of an access point, for transmissions from the access point during a set of target wake time (TWT) service periods (SPs) defined by a TWT schedule, the access point operating using the primary channel and one or more secondary channels of a total bandwidth of the access point, receiving, from the access point on the primary channel, a delivery traffic indication map (DTIM) addressed to a group of stations that includes the station, and exchanging, based on the received DTIM, one or more frames with the access point on a first secondary channel of the one or more secondary channels.

An apparatus for wireless communication at a station is described. The apparatus may include a processor, memory in electronic communication with the processor, and instructions stored in the memory. The instructions may be executable by the processor to cause the apparatus to listen, on a primary channel of an access point, for transmissions from the access point during a set of target wake time (TWT) service periods (SPs) defined by a TWT schedule, the access point operating using the primary channel and one or more secondary channels of a total bandwidth of the access point, receive, from the access point on the primary channel, a delivery traffic indication map (DTIM) addressed to a group of stations that includes the station, and exchange, based on the received DTIM, one or more frames with the access point on a first secondary channel of the one or more secondary channels.

Another apparatus for wireless communication at a station is described. The apparatus may include means for listening, on a primary channel of an access point, for transmissions from the access point during a set of target wake time (TWT) service periods (SPs) defined by a TWT schedule, the access point operating using the primary channel and one or more secondary channels of a total bandwidth of the access point, means for receiving, from the access point on the primary channel, a delivery traffic indication map (DTIM) addressed to a group of stations that includes the station, and means for exchanging, based on the received DTIM, one or more frames with the access point on a first secondary channel of the one or more secondary channels.

A non-transitory computer-readable medium storing code for wireless communication at a station is described. The code may include instructions executable by a processor to listen, on a primary channel of an access point, for transmissions from the access point during a set of target wake time (TWT) service periods (SPs) defined by a TWT schedule, the access point operating using the primary channel and one or more secondary channels of a total bandwidth of the access point, receive, from the access point on the primary channel, a delivery traffic indication map (DTIM) addressed to a group of stations that includes the station, and exchange, based on the received DTIM, one or more frames with the access point on a first secondary channel of the one or more secondary channels.

Some examples of the method, apparatuses, and non-transitory computer-readable medium described herein may further include operations, features, means, or instructions for transmitting, on the primary channel during one or more of the set of TWT SPs, an indication that the station may be available to receive one or more frames on the first secondary channel.

Some examples of the method, apparatuses, and non-transitory computer-readable medium described herein may further include operations, features, means, or instructions for receiving, on the primary channel, a trigger frame from the access point during a TWT SP of the set of TWT SPs, and identifying, based on the received trigger frame, a resource unit of the first secondary channel for the station to use to transmit uplink frames to the access point in response to the received trigger frame.

Some examples of the method, apparatuses, and non-transitory computer-readable medium described herein may further include operations, features, means, or instructions for transmitting a TWT request to the access point, receiving a TWT response from the access point, and identifying the TWT schedule based on the transmitted TWT request and the received TWT response.

In some examples of the method, apparatuses, and non-transitory computer-readable medium described herein, the TWT schedule may be identified for the first secondary channel.

In some examples of the method, apparatuses, and non-transitory computer-readable medium described herein, the TWT request may be transmitted to the access point on the primary channel, and the TWT response may be received from the access point on the primary channel.

In some examples of the method, apparatuses, and non-transitory computer-readable medium described herein, receiving the DTIM may include operations, features, means, or instructions for receiving a set of beacons from the access point on the primary channel, at least one of the set of beacons including the DTIM.

In some examples of the method, apparatuses, and non-transitory computer-readable medium described herein, the set of beacons include a subset of all beacons transmitted by an access point on the primary channel.

In some examples of the method, apparatuses, and non-transitory computer-readable medium described herein, the station exchanges data frames with the access point on the first secondary channel exclusive of transmissions on the primary channel.

In some examples of the method, apparatuses, and non-transitory computer-readable medium described herein, a bandwidth of the primary channel may be 20 MHz, a bandwidth of the first secondary channel may be 20 MHz, and the total bandwidth of the access point may be an integer multiple of 20 MHz.

In some examples of the method, apparatuses, and non-transitory computer-readable medium described herein, the DTIM addressed to the group of stations may be received during one or more of the set of TWT SPs.

A method for wireless communication at an access point is described. The method may include identifying that a station is associated with the access point on a first secondary channel of the access point, the access point operating using a primary channel and one or more secondary channels, including the first secondary channel, of a total bandwidth of the access point to communicate with a set of stations including the station, identifying a resource unit of the first secondary channel for the access point to use to transmit frames to the station, and transmitting one or more frames on the first secondary channel using the identified resource unit.

An apparatus for wireless communication at an access point is described. The apparatus may include a processor, memory in electronic communication with the processor, and instructions stored in the memory. The instructions may be executable by the processor to cause the apparatus to identify that a station is associated with the access point on a first secondary channel of the access point, the access point operating using a primary channel and one or more secondary channels, including the first secondary channel, of a total bandwidth of the access point to communicate with a set of stations including the station, identify a resource unit of the first secondary channel for the access point to use to transmit frames to the station, and transmit one or more frames on the first secondary channel using the identified resource unit.

Another apparatus for wireless communication at an access point is described. The apparatus may include means for identifying that a station is associated with the access point on a first secondary channel of the access point, the access point operating using a primary channel and one or more secondary channels, including the first secondary channel, of a total bandwidth of the access point to communicate with a set of stations including the station, means for identifying a resource unit of the first secondary channel for the access point to use to transmit frames to the station, and means for transmitting one or more frames on the first secondary channel using the identified resource unit.

A non-transitory computer-readable medium storing code for wireless communication at an access point is described. The code may include instructions executable by a processor to identify that a station is associated with the access point on a first secondary channel of the access point, the access point operating using a primary channel and one or more secondary channels, including the first secondary channel, of a total bandwidth of the access point to communicate with a set of stations including the station, identify a resource unit of the first secondary channel for the access point to use to transmit frames to the station, and transmit one or more frames on the first secondary channel using the identified resource unit.

Some examples of the method, apparatuses, and non-transitory computer-readable medium described herein may further include operations, features, means, or instructions for assigning the resource unit of the first secondary channel to the station, where the resource unit may be a directed resource unit for the station.

Some examples of the method, apparatuses, and non-transitory computer-readable medium described herein may further include operations, features, means, or instructions for identifying a unicast association identifier (AID) for the station, and transmitting an indication of the unicast AID for the station on the first secondary channel with the one or more frames.

Some examples of the method, apparatuses, and non-transitory computer-readable medium described herein may further include operations, features, means, or instructions for transmitting an aggregated media access control protocol data unit (A-MPDU) to the station, the A-MPDU including an indication of the unicast AID for the station.

In some examples of the method, apparatuses, and non-transitory computer-readable medium described herein, transmitting the one or more frames may include operations, features, means, or instructions for broadcasting one or more control frames or management frames for receipt by a set of stations associated with the access point on the first secondary channel, including the station, where the identified resource unit includes a broadcast resource unit.

Some examples of the method, apparatuses, and non-transitory computer-readable medium described herein may further include operations, features, means, or instructions for identifying a broadcast association identifier (AID) for a set of stations associated with the access point on the first secondary channel, including the station, and transmitting an indication of the broadcast AID for the set of stations with the one or more control frames or management frames.

Some examples of the method, apparatuses, and non-transitory computer-readable medium described herein may further include operations, features, means, or instructions for identifying an association identifier (AID) for the one or more secondary channels, where the AID applies to one of a set of secondary channels, including the one or more secondary channels, for a set of time intervals based on a channel rotation schedule.

Some examples of the method, apparatuses, and non-transitory computer-readable medium described herein may further include operations, features, means, or instructions for transmitting an indication of the identified AID on the first secondary channel during a first time interval of the channel rotation schedule, and transmitting the indication of the identified AID on a second secondary channel during a second time interval of the channel rotation schedule.

In some examples of the method, apparatuses, and non-transitory computer-readable medium described herein, the one or more frames include a time synchronization function (TSF), or a traffic information, or a probe response, or a traffic indication map (TIM), or a combination thereof.

Some examples of the method, apparatuses, and non-transitory computer-readable medium described herein may further include operations, features, means, or instructions for receiving, from the station, a target wake time (TWT) request including an indication of the first secondary channel.

In some examples of the method, apparatuses, and non-transitory computer-readable medium described herein, the one or more frames include control frames or management frames.

Some examples of the method, apparatuses, and non-transitory computer-readable medium described herein may further include operations, features, means, or instructions for transmitting, to the station, an indication of a second primary channel, the second primary channel for the station and different from the primary channel of the access point.

Some examples of the method, apparatuses, and non-transitory computer-readable medium described herein may further include operations, features, means, or instructions for transmitting the indication in an operating mode indication.

A method for wireless communication at an access point is described. The method may include identifying that a station is associated with the access point on a first secondary channel of the access point, the access point operating using a primary channel and one or more secondary channels, including the first secondary channel, of a total bandwidth of the access point to communicate with a set of stations including the station and transmitting, to the station, a first copy of a frame on the primary channel and a second copy of the frame on the first secondary channel, where the frame includes an indication of the primary channel of the access point.

An apparatus for wireless communication at an access point is described. The apparatus may include a processor, memory in electronic communication with the processor, and instructions stored in the memory. The instructions may be executable by the processor to cause the apparatus to identify that a station is associated with the access point on a first secondary channel of the access point, the access point operating using a primary channel and one or more secondary channels, including the first secondary channel, of a total bandwidth of the access point to communicate with a set of stations including the station and transmit, to the station, a first copy of a frame on the primary channel and a second copy of the frame on the first secondary channel, where the frame includes an indication of the primary channel of the access point.

Another apparatus for wireless communication at an access point is described. The apparatus may include means for identifying that a station is associated with the access point on a first secondary channel of the access point, the access point operating using a primary channel and one or more secondary channels, including the first secondary channel, of a total bandwidth of the access point to communicate with a set of stations including the station and means for transmitting, to the station, a first copy of a frame on the primary channel and a second copy of the frame on the first secondary channel, where the frame includes an indication of the primary channel of the access point.

A non-transitory computer-readable medium storing code for wireless communication at an access point is described. The code may include instructions executable by a processor to identify that a station is associated with the access point on a first secondary channel of the access point, the access point operating using a primary channel and one or more secondary channels, including the first secondary channel, of a total bandwidth of the access point to communicate with a set of stations including the station and transmit, to the station, a first copy of a frame on the primary channel and a second copy of the frame on the first secondary channel, where the frame includes an indication of the primary channel of the access point.

In some examples of the method, apparatuses, and non-transitory computer-readable medium described herein, transmitting the first copy of the frame and the second copy of the frame may include operations, features, means, or instructions for transmitting copies of the frame on each of the primary channel and the one or more secondary channels of the total bandwidth of the access point in parallel.

In some examples of the method, apparatuses, and non-transitory computer-readable medium described herein, the frame includes a non-high throughput (non-HT) duplicate physical data layer procedure (PLCP) protocol data unit (PPDU).

In some examples of the method, apparatuses, and non-transitory computer-readable medium described herein, the frame includes a control frame or a management frame.

Some examples of the method, apparatuses, and non-transitory computer-readable medium described herein may further include operations, features, means, or instructions for transmitting, to the station, an indication of a second primary channel, the second primary channel for the station and different from the primary channel of the access point.

Some examples of the method, apparatuses, and non-transitory computer-readable medium described herein may further include operations, features, means, or instructions for transmitting the indication in an operating mode indication.

A method for wireless communication at an access point is described. The method may include identifying that a station is associated with the access point on a first secondary channel of the access point, the access point operating using a primary channel and one or more secondary channels, including the first secondary channel, of a total bandwidth of the access point to communicate with a set of stations including the station, identifying one or more resource units of the first secondary channel for the station to use for random access to the access point, and transmitting, to the station, an indication of the one or more resource units for the station to use for random access.

An apparatus for wireless communication at an access point is described. The apparatus may include a processor, memory in electronic communication with the processor, and instructions stored in the memory. The instructions may be executable by the processor to cause the apparatus to identify that a station is associated with the access point on a first secondary channel of the access point, the access point operating using a primary channel and one or more secondary channels, including the first secondary channel, of a total bandwidth of the access point to communicate with a set of stations including the station, identify one or more resource units of the first secondary channel for the station to use for random access to the access point, and transmit, to the station, an indication of the one or more resource units for the station to use for random access.

Another apparatus for wireless communication at an access point is described. The apparatus may include means for identifying that a station is associated with the access point on a first secondary channel of the access point, the access point operating using a primary channel and one or more secondary channels, including the first secondary channel, of a total bandwidth of the access point to communicate with a set of stations including the station, means for identifying one or more resource units of the first secondary channel for the station to use for random access to the access point, and means for transmitting, to the station, an indication of the one or more resource units for the station to use for random access.

A non-transitory computer-readable medium storing code for wireless communication at an access point is described. The code may include instructions executable by a processor to identify that a station is associated with the access point on a first secondary channel of the access point, the access point operating using a primary channel and one or more secondary channels, including the first secondary channel, of a total bandwidth of the access point to communicate with a set of stations including the station, identify one or more resource units of the first secondary channel for the station to use for random access to the access point, and transmit, to the station, an indication of the one or more resource units for the station to use for random access.

In some examples of the method, apparatuses, and non-transitory computer-readable medium described herein, the transmitted indication includes an association identifier (AID) indicating that one of the one or more resource units may be to be used for random access transmissions by the station.

In some examples of the method, apparatuses, and non-transitory computer-readable medium described herein, each of the one or more resource units of the first secondary channel may be assigned an AID that may be unique within the first secondary channel.

In some examples of the method, apparatuses, and non-transitory computer-readable medium described herein, at least one of the one or more resource units of the first secondary channel may be assigned an AID that may be a same AID as an AID assigned to a second resource unit used for random access on a second secondary channel of the one or more secondary channels.

In some examples of the method, apparatuses, and non-transitory computer-readable medium described herein, the one or more resource units of the first secondary channel may be assigned AIDs different than an AID assigned to a second resource unit used for random access on a second secondary channel of the one or more secondary channels.

Some examples of the method, apparatuses, and non-transitory computer-readable medium described herein may further include operations, features, means, or instructions for receiving a transmission from the station on the one or more identified resource units.

DETAILED DESCRIPTION

Figure 1:
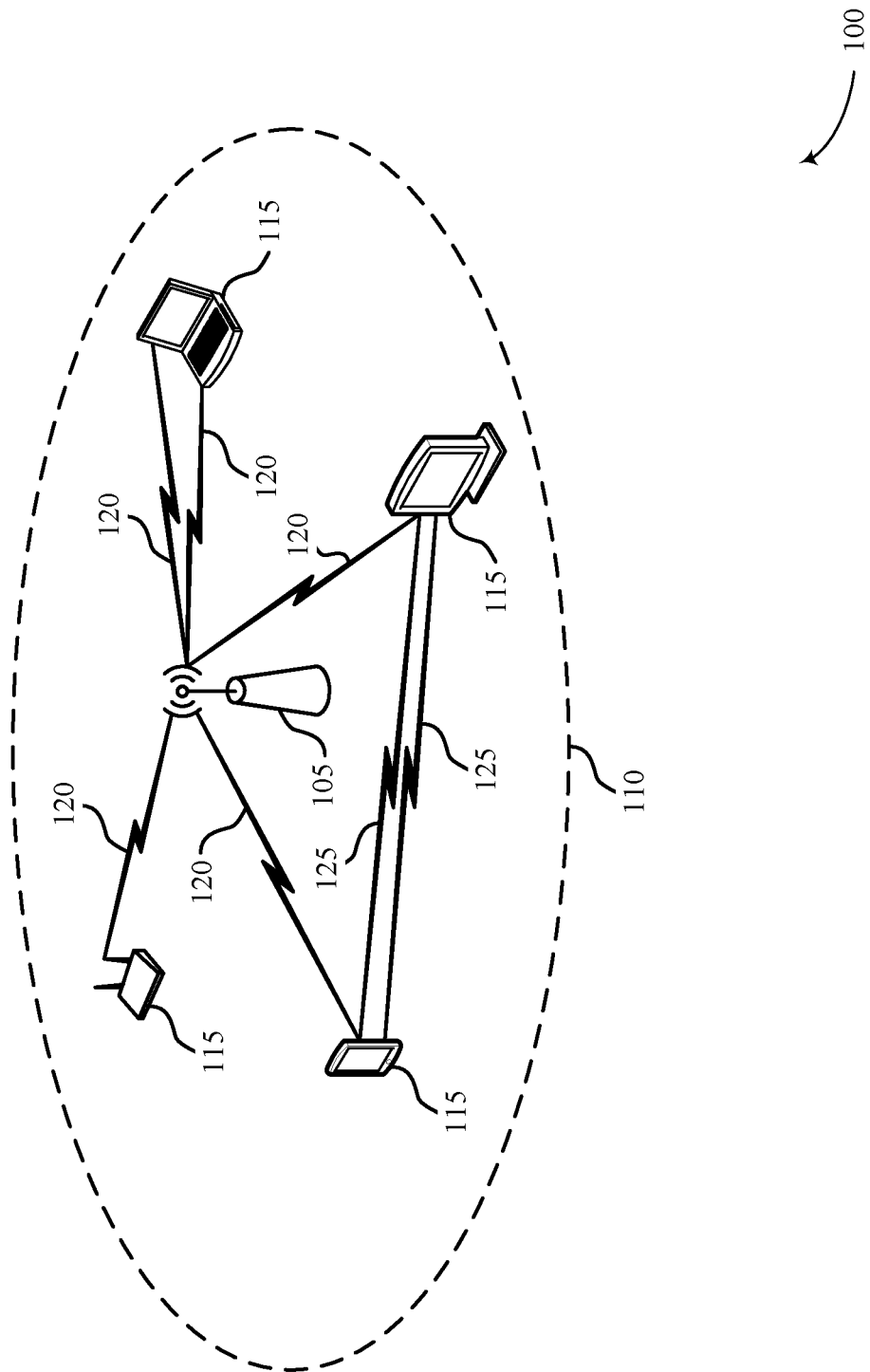
FIG. 1 illustrates an example of a WLAN that supports mechanisms to support secondary channel operation in accordance with aspects of the present disclosure.

Some wireless stations (STAs) and access points (APs) may support communication over a particular channel bandwidth. For example, some such STAs may be examples of "20 MHz-only" non-AP STAs, which restrict their communications to 20 MHz bandwidth channels (e.g., to conserve energy). Such STAs may indicate (e.g., in a channel width set subfield of a high efficiency (HE) physical (PHY) capabilities element) support for only 20 MHz channel width for the frequency band in which the AP is operating. Examples of such STAs may include Internet-of-Things (IoT) devices, Machine Type Communication (MTC) devices, smart metering devices, sensors, etc. Additionally or alternatively, such STAs may be examples of "20 MHz-operating" non-AP STAs, which are STAs that are capable of communicating over wider bandwidths but reduce their operating channel width to a reduced or narrower bandwidth (e.g., 20 MHz) to save energy (e.g., using an operating mode indication (OMI)). Though aspects of the following are described in the context of 20 MHz channels and operations, it is to be understood that the described techniques may be applicable to channels of various sizes (e.g., 5 MHz, 10 MHz, 40 MHz, 80 MHz, etc.), for either or both of the wider operating bandwidth and narrower operating channel bandwidth, without deviating from the scope of the present disclosure.

Some such STAs may operate on the primary 20 MHz channel of the AP. STAs operating in a 20 MHz mode (e.g., 20 MHz-only STAs, 20 MHz-operating STAs, etc.) may be associated with low power operations. That is, such a 20 MHz device may be a low power device (e.g., an IoT sensor) or a device that has switched to a low power mode. Accordingly, for some such STAs, power-saving may be an important operational constraint. By parking on a secondary channel in accordance with the described techniques, a STA may not have to wake up for every frame interaction that occurs on an APs primary channel. Instead, the AP may signal and wake the STA (e.g., over the secondary 20 MHz channel) to initiate a frame exchange.

Considerations for supporting mechanisms to support secondary channel operation are discussed below. Without the described techniques, mechanisms to support secondary channel operation may be unable to receive management frames or broadcast traffic (e.g., traffic which is sent on a primary channel of an AP) from the AP, which may cause the STA to lose synchronization (e.g., timing synchronization) with the AP, miss a channel change or other critical announcement from the AP, etc. Considerations for providing such information to STAs parked on a secondary channel are discussed below. In some examples, an AP may restrict resource unit (RU) allocation (e.g., for uplink or downlink data communications) to the secondary channel on which the STA is parked. In some cases, a trigger-based random access mechanism may utilize aspects of the present disclosure to limit access to certain RUs to STAs on a given secondary channel.

An AP may create support multiple BSSs, each having a unique BSSID. In some cases, each BSS (e.g., or subset of the multiple BSSs) may be associated with a virtual access point (VAP). In aspects of the following, an AP may support communications over a primary channel using a first VAP (e.g., having a first BSSID) and may support communications over one or more secondary channels using respective other VAPs (e.g., each having a respective BSSID). In some cases, the BSSID associated with the first VAP may be referred to as the transmitted BSSID (e.g., a TxBSSID), while the BSSIDs associated with the other VAPs may be referred to as non-transmitted BSSIDs (e.g., a non-TxBSSID). In some cases, each secondary channel supported by the AP (e.g., where a secondary channel may refer to a 20 MHz channel, a 40 MHz channel, etc.) may be associated with a respective VAP having a unique BSSID. Thus, while a VAP may refer to functionality provided by an AP while a BSS may refer to a group of STAs associated with the AP, in aspects of the following the two may be used interchangeably.

Aspects of the disclosure are initially described in the context of a wireless communications system. Aspects of the disclosure are then illustrated by and described with reference to channel diagrams and process flows. Aspects of the disclosure are further illustrated by and described with reference to apparatus diagrams, system diagrams, and flowcharts that relate to mechanisms to support mechanisms to support secondary channel operation and multiple basic service sets supporting secondary channels.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 (e.g., or a virtual AP (VAP)) and an associated set of STAs 115 may be referred to as a BSS. An ESS is a set of connected BSSs. Some APs 105 may support multiple BSSs. Although WLAN 100 is described as a basic service set (BSS), in other examples it may be an example of an independent basic service set (MSS), an ad-hoc network, or a peer-to-peer (P2P network).

A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11az, 802.11ba, etc. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

The AP 105 may be any suitable device that allows one or more wireless devices to connect to a network (such as a local area network (LAN), wide area network (WAN), metropolitan area network (MAN), or the Internet) via the AP 105 using wireless communications such as, for example, Wi-Fi, Bluetooth, and cellular communications. In some implementations, the AP 105 may include one or more transceivers, one or more processing resources, one or more memory resources, and a power source. The memory resources may include a non-transitory computer-readable medium (such as one or more nonvolatile memory elements, such as Flash memory, a hard drive, etc.) that stores instructions for performing operations described below.

WLAN 100 may be formed by a plurality of APs 105 that operate according to the IEEE 802.11 family of standards (e.g., or according to other suitable wireless protocols). Thus, although only one AP 105 is shown in WLAN 100 for simplicity, it is to be understood that WLAN 100 may be formed by any suitable number of APs 105. Each AP 105 may be assigned a unique media access control (MAC) address (e.g., which may be programmed by a manufacturer of the AP 105). Similarly, each STA 115 may be assigned a unique MAC address. In some cases, AP 105 may assign a unique identifier to each STA 115 (e.g., so that AP 105 may identify the STAs 115 using the assigned AID values). In some cases, the unique identifier is an association identifier (AID), a broadcast identifier, or another type of identifier.

In a system supporting multi-link aggregation (which may also be referred to as multi-channel aggregation), some of the traffic associated with a single STA 115 may be transmitted across multiple parallel communication links 120 (which may also be referred to as "links" or "wireless links" herein). Multi-link aggregation may thus provide a means to increase network capacity and maximize the utilization of available resources. In some cases, each communication link 120 for a given wireless device may be associated with a respective radio of the wireless device (e.g., where a radio comprises transmit/receive chains, physical antennas, signal processing components, etc.). Multi-link aggregation may be implemented in a number of ways. As a first example, the multi-link aggregation may be packet-based. In packet-based aggregation, frames of a single traffic flow (e.g., all traffic associated with a given traffic identifier (TID)) may be sent in parallel across multiple communication links 120 (e.g., on multiple channels). In some cases, the multiple communication links 120 may operate in the same radio frequency spectrum band (e.g., each link may be in the 5 GHz band, and use channels in the 5 GHz band). In other cases, the multiple communication links 120 may be in different radio frequency spectrum bands (e.g., one may be in the 2.4 GHz band while another is in the 5 GHz band). In aspects of the present disclosure, a primary channel between an AP 105 and a STA 115 may be carried over a first communication link 120 while a secondary channel between the AP 105 and STA 115 may be carried over a second communication link 120. In other examples, any combination of the primary channel plus zero or more secondary channels may be carried over the first communication link 120, while the remaining one or more secondary channels may be carried over the second communication link 120.

In some examples, WLAN 100 may allow for multiple-input, multiple-output (MIMO) communications between AP 105 and one or more STAs 115. The MIMO communications may include single-user MIMO (SU-MIMO) between a single STA 115 and AP 105 and multi-user MIMO (MU-MIMO) communications between multiple STAs 115 and AP 105. In some cases, WLAN 100 may utilize a multiple access mechanism such as orthogonal frequency division multiple access (OFDMA). Such multiple access mechanisms may be supported by resource partitions such as those described with reference to FIG. 3.

In accordance with the described techniques, AP 105 may support communications for a given BSS (e.g., associated with a particular VAP) over one (or more) channels, where each channel refers to a portion of a radio frequency spectrum (e.g., a 20 MHz portion, a 40 MHz portion, a 160 MHz portion, etc.) of a total frequency bandwidth used by the AP to communicate in the BSS. AP 105 may in some cases support multiple BSSs at the same time, and these BSSs may in some cases share channels with each other or with BSSs of another AP 105. Each BSS may be associated with a given primary channel of the total bandwidth (e.g., over which AP 105 transmits beacon information or other important control information to STAs 115 associated with the BSS). Some STAs 115 may benefit from receiving such control information over a secondary channel (e.g., another portion of the total frequency bandwidth over which the BSS operates). For example, the primary channel may be too broad for some devices (e.g., may be 40 MHz, which may be unsuitable for 20 MHz-only STAs) or may be too congested (e.g., which may cause power consumption issues for power-limited devices which have to wake up frequently to process signals on the primary channel). According to aspects of the present disclosure, AP 105 may communicate such important control information (e.g., beacons, management frames, etc.) to one or more STAs 115 using a secondary channel (e.g., in addition to or instead of providing such information over a primary channel). In some cases, the AP 105 may communicate with one STA 115 using both a primary channel and at least one secondary channel of the total bandwidth (e.g., as described above with reference to the multi-channel aggregation schemes).

Figure 2A:
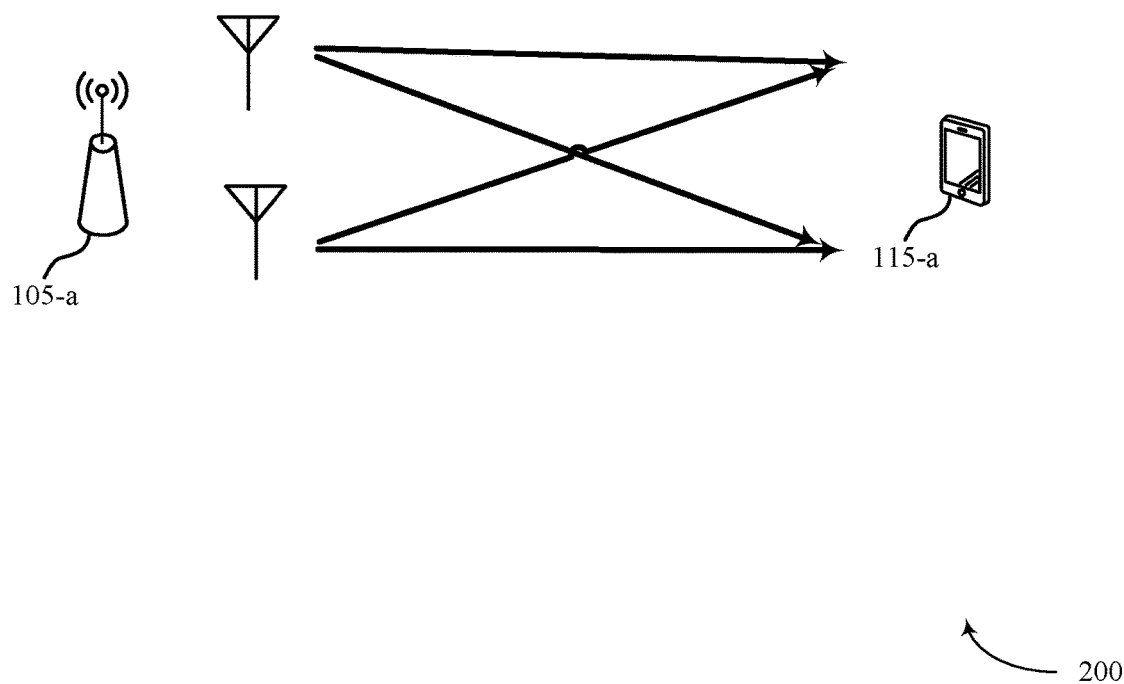
FIG. 2A illustrates an example of a WLAN that supports mechanisms to support secondary channel operation in accordance with aspects of the present disclosure.

FIG. 2A illustrates an example of a WLAN 200 that supports mechanisms to support secondary channel operation in accordance with aspects of the present disclosure. In some examples, WLAN 200 may implement aspects of WLAN 100. A wireless connection between AP 105-a and STA 115-a may be referred to as a link 205 or a communication link, and each link 205 may include one or more channels. As an example, WLAN 200 may support communications such that AP 105-a and STA 115-a may communicate over channel 220 via link 205-a while AP 105-a and STA 115-b communicate over secondary channel 215 via link 205-b.

Figure 2B:
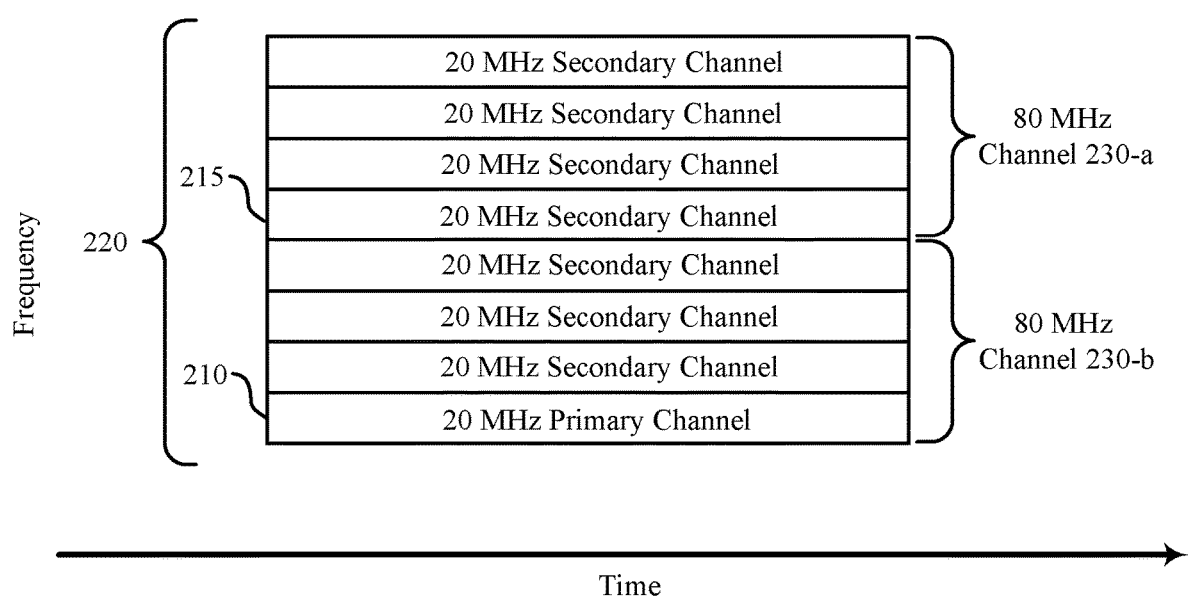
FIG. 2B illustrates an example of a channel layout that supports mechanisms to support secondary channel operation in accordance with aspects of the present disclosure.

FIG. 2B illustrates an example channel layout 250 that supports mechanisms to support secondary channel operation in accordance with aspects of the present disclosure. Channel layout 250 illustrates partitioning of channel 220 in frequency. Channel 220 may be an example of a 160 MHz channel (e.g., or an 80 MHz channel, a 320-MHz channel, etc.) associated with a given BSS of an AP. Channel 220 may reside (e.g., at least partially) in an unlicensed frequency band and may represent a contiguous portion of a frequency spectrum, or may be comprised of multiple non-contiguous chunks of the frequency spectrum. Thus, though shown as being contiguous channels, two or more of the secondary channels 215 within channel 220 may in some cases be non-contiguous (e.g., in an 80+80 MHz channel used in an 80+80 operation mode, 160+160 MHz channel used in an 160+160 operation mode, etc.), forming two or more non-contiguous groups of channels, the channels within the group being contiguous. In some cases, the non-contiguous or contiguous channels may be of different bandwidths. For example, the implementations described herein are applicable to 80+40, 160+40, 160+80 MHz combinations.

In some cases, the bandwidth of channel 220 may be a multiple of a certain bandwidth, such as 20 MHz, such that channel 220 may be subdivided into one or more partitions, for example a number of 20 MHz partitions. One such partition of channel 220 may be referred to as a primary channel 210. Primary channel 210 may carry group-addressed frames, beacons, or other management information for the BSS. In some cases, primary channel 210 may occupy a bandwidth greater than 20 MHz (e.g., 40 MHz). As described with reference to FIG. 1, some STAs 115 may be examples of low-power devices or may otherwise benefit from reduced bandwidth communications. Because power conservation may be a key performance indicator for such devices, techniques described herein may be used to support communications for such STAs 115 via a secondary channel 215. As illustrated, secondary channel 215 may occupy (or span) a 20 MHz portion of channel 220. As with primary channel 210, secondary channel 215 may in some cases occupy a bandwidth greater than 20 MHz (e.g., 40 MHz) without deviating from the scope of the present disclosure.

Referring back to WLAN 200, STA 115-b may be an example of a 20 MHz-only device such as an IoT sensor (e.g., or another 20 MHz-operating device). Accordingly, STA 115-b may communicate with AP 105-a via link 205-b using secondary channel 215. As described further below, STA 115-b may negotiate a TWT schedule with AP 105-a specific to secondary channel 215. For example, STA 115-b may indicate (e.g., during an association procedure), a preference for secondary channel 215 (e.g., or simply for 20 MHz communication), and AP 105-a may thereafter limit communication with STA 115-b to secondary channel 215. For example, AP 105-a may ensure that any communication with STA 115-b occurs during a negotiated TWT service period (SP) on the secondary channel. That is, AP 105-a may ensure that any RU assigned to STA 115-b in a trigger frame (for uplink communications) or in a MU downlink physical protocol data unit (PPDU) belongs to secondary channel 215. In some cases, such TWT schedule negotiations may be initiated by AP 105-a. In other cases, STA 115-b may initiate TWT schedule negotiations. Additionally or alternatively, the TWT SPs may be based at least in part on STA 115-b sending a frame to AP 105-a at the beginning of the TWT SP to signal its availability.

In some other cases, STA 115-*b* may indicate during the association procedure, a preference for secondary channel 215, as well as a wider bandwidth communication capability (i.e., ability to communicate using more than one secondary channel). In such cases, the AP 105-*a* may ensure that any communication with STA 115-*b* occurs during a negotiated TWT SP (or any other negotiated communication period), and using any bandwidth supported by the STA 115-*b*, as long as the indicated secondary channel is part of the wider bandwidth transmission. In some aspects, the indicated secondary channel may serve as a temporary primary channel for the STA 115-*b*.

In some circumstances, the STA 115-*b* may be an example of a low latency station having strict latency and/or reliability requirements. In such cases, the AP 105-*a* may park the STA 115-*b* having the low latency traffic on secondary channel 215 (i.e., indicated or preferred secondary channel of the STA 115-*b*), while supporting one or more other stations (e.g., Enhanced Distributed Channel Access (EDCA) stations) on the primary channel. In some cases, EDCA stations may be examples of client devices allowed to have unsolicited access to the medium. Further, EDCA may provide for contention-free access to a channel for a certain period, which may be referred to as a transmission opportunity (TxOP). In some aspects, the AP may schedule the low latency client or STA 115-*b* on the secondary channel 215, which may serve to limit the interference or interruptions experienced by STA 115-*b* from traffic originating from the one or more EDCA stations.

As an example, the AP 105-*a* may limit the stations supporting EDCA (or accessing the medium using EDCA) from performing EDCA transmissions on the secondary channel 215, or any channel other than the primary channel. In some aspects, restricting EDCA transmissions to the primary channel may assist in optimizing performance (i.e., meeting strict latency requirements) at the low latency STA 115-*b* by isolating its communications from those of the EDCA stations.

In some examples, a STA 115 that is not associated with AP 105-*a* may receive an allocation schedule from AP 105-*a* (e.g., for an SST allocation by AP 105-*a* to its associated stations, such as STA 115-*a* and STA 115-*b*). STA 115 receiving the allocation schedule may not be associated with AP 105-*a*, or be associated with another AP 105, or otherwise not be a part of the same network entity. Such STA 115 may then defer to the allocation schedule, for example by avoiding transmitting and/or soliciting frames at the times and/or frequencies indicated by the received allocation schedule.

In some other examples, the AP 105-*a* may be associated with stations supporting different bandwidths (e.g., low bandwidth, such as 160 MHz or lower, and high bandwidth, such as 320 MHz). In some cases, the AP 105-*a* may park the stations supporting higher bandwidths on an upper portion (e.g., upper 160 MHz) of the total AP bandwidth, and those supporting lower bandwidths on a lower portion of the total AP bandwidth. In some aspects, the AP 105-*a* may now be able to simultaneously schedule the higher bandwidth STAs, while servicing or communicating with the lower bandwidth STAs. For instance, if a low bandwidth STA sends a Request to Send (RTS) to the AP 105-*a* to block an 80 MHz channel, the AP may respond with a Clear to Send (CTS) to block the entire 320 MHz (e.g., both upper and lower 160 MHz). In some cases, blocking the entire 320 MHz may allow the AP 105-*a* to service the STA on the 80 MHz channel, and schedule the high bandwidth capable stations on the remainder of the bandwidth (e.g., 240 MHz), or the upper portion of the bandwidth (i.e., 160 MHz).

In some cases, the AP 105-*a* associated with low bandwidth and high bandwidth stations may assign SST channels (e.g., using individual addressed frames) based on the supported bandwidth of the station. For instance, AP 105-*a* may assign the SST channel for a low bandwidth station (e.g., 160 MHz or lower) within a lower portion (e.g., lower 160 MHz) of the total AP bandwidth. Further, the SST channel for a high bandwidth station (e.g., 320 MHz) may be assigned within a portion of the total AP bandwidth that lies outside the lower 160 MHz portion. It should be noted that if the negotiation occurs via broadcast frames, for instance, if the SST schedule provided by the AP arrives in broadcast frames (e.g., via beacons), the AP 105-*a* may assign the SST channel to the lower portion of the bandwidth. Additionally or alternatively, the AP 105-*a* may also restrict transmissions to the lower 160 MHz of the total AP bandwidth. In some cases, the AP 105-*a* may specify the BSS bandwidth for the low bandwidth stations (i.e., high throughput (HT) stations) via a HT operation element, and for the higher bandwidth stations (i.e., enhanced (or extremely) high throughput (EHT) stations) via an EHT operation element. Further, in some cases, one or more of HT and EHT operation elements may assist the high bandwidth station in determining that its SST channel is in a different portion of the total AP bandwidth than low bandwidth stations.

In some examples, the AP 105-*a* may provide or include group addressed transmissions using broadcast frames over the SST channel, or a subset of channels in the selected PPDU transmission. In such cases, the AP 105-*a* may convey the information (or a portion of the information) included in the primary channel using the SST channel, allowing the STA to limit monitoring of the primary channel.

In the described examples, where a TWT SP is described, a SST SP may be used instead. And, where a SST SP is described, a TWT SP may be used instead. In some cases the SST SP is a frequency selection mechanism, while the TWT SP is a time selection mechanism, such that where a frequency selection mechanism is described, the same features may be similarly applied to a time selection mechanism. Likewise, where a time selection mechanism is described, the same features may be similarly applied to a frequency selection mechanism.

In some cases, STAs 115 and the AP 105 may support communication via wide bandwidths that include multiple 20 MHz channels. For example, the STA 115 may support communication with AP 105 via a 80 MHz channel 230, which includes four 20 MHz channels. As described, the channel 220 may include 160 MHz of contiguous 20 MHz channels, 320 MHz of contiguous 20 MHz channels, or the channel 220 may include 80+80 MHz channels that are non-contiguous or 160+160 MHz channels that are non-contiguous. In some cases, the non-contiguous or contiguous channels may be of different bandwidths. For example, the implementations described herein are applicable to 80+40, 160+40, 160+80 MHz combinations. In other words, channel 230-*a* may be non-contiguous with channel 230-*b*. During a procedure of associating with a particular sub-channel (within an operating bandwidth), STA 115 may be joining the BSS of the AP 105 (and is part of the association frames) or after the STA 115 has joined the BSS (via other signaling such as OMI control, TWT frames, or other action frames), AP 105 and STA 115 may indicate channel preferences and assignments using an eight bit field (e.g., bitmap) where each bit corresponds to one minimum width channel for the band. In an example where AP 105-*a* has 80 MHz operating bandwidth, the channel 220 includes a primary 80 MHz and a secondary 80 MHz. In such cases, the secondary 80 MHz may include a 20 MHz channel for performing operations similar to the ones performed on the primary channel of the BSS (e.g., medium access related decisions and operations, setting the network allocation vector (NAV), checking for NAV before transmission, etc.) within the 80 MHz secondary channel segment. Such a primary channel within a secondary channel bandwidth may be referred to as a "pseudo-primary channel." The STA 115-a may transmit a request to AP 105-a, and the request may include a field with up to eight bits that indicate a preference for the secondary 80 MHz (e.g., channel field=00001111). The AP 105-a may respond or indicate to the STA 115-a where the STA 115-a should communicate by responding with a channel field including eight bits. If the AP 105-a permits communication on the requested secondary channel 80 MHz channel, the AP 105-a may also indicate the 20 MHz channel for primary channel operations within the 80 MHz secondary channel (the pseudo-primary channel) by including a "0" bit corresponding to the dedicated channel within the secondary channel. In the above described example, the AP 105-a may respond or indicate to the STA 115-a that the STA 115-a is permitted to communicate via the 80 MHz secondary channel by transmitting a channel field including "00001101," where "1101" indicates the 80 MHz secondary channel and the "0" within "1101" indicates the dedicated 20 MHz channel for primary channel procedures (e.g., the pseudo-primary channel).

In cases where including a bit set to 0 indicates the primary channel within a secondary channel (e.g., the pseudo-primary channel), bit value of the bits corresponding to the primary channel may not be indicative any additional information. Thus, the AP 105-a may indicate permission to communicate in the secondary channel by including a "0" within the field of bits that indicates the preferred pseudo-primary within the secondary 80 MHz segment by setting the channel field to 11111101. Thus, the STA-a is informed that the "0" in the last four bits corresponds to the primary channel within the secondary channel (e.g., the pseudo-primary channel) in a scenario were the channel field is 11111101 or the channel field is 00001101. In some cases, the STA 115 may infer permission to communicate in the secondary channel by receiving the indication of the pseudo-primary channel within the secondary channel.

If no bits are set to 0 by the AP 105-a, then the STA 115 may default to setting the primary channel of the secondary 80 MHz to the same location as the corresponding one in the primary channel of the primary 80 MHz. In the example illustrated in FIG. 2, the primary 80 MHz channel is 230-b and the secondary 80 MHz channel is 230-a. If no bits are set to 0 by an AP 105-a, then the STA 115 may default to setting the primary channel within the secondary 80 MHz channel to correspond to the 20 MHz primary channel 210 within the 80 MHz primary channel 230-b. Thus, secondary channel 215 may be selected as the primary channel within the 80 MHz secondary channel 230-a.

Further, STA 115 may request a secondary channel and a preference for a primary (which may be referred to as a pseudo-primary) channel within the secondary channel by using the above described techniques. For example, the STA 115-a transmits a preference for the secondary 80 MHz channel and a preference pseudo-primary 20 MHz channel by transmitting a channel field set to 00001101, such that the "1101" indicates a preference for the secondary 80 MHz channel and the "0" within "1101" indicates a preference of the corresponding 20 MHz channel for the pseudo primary channel. The AP 105-a may respond by accepting the request (e.g., channel field="00001101") by indicating a preference for another pseudo-primary channel (e.g., channel field="00001011"), or by indicating a preference for using the primary channel (e.g., channel field="11110000"). The pseudo-channel request/acceptance technique describe may utilize eight bits, within one bit set to 0 to indicate the pseudo-primary channel (e.g., channel field="11111011") or may utilize four bits, with one bit set to 0 to indicate the pseudo-primary channel (e.g., channel field="00001011").

The above described technique to indicate the primary channel within the secondary channel may be applicable to other operating bandwidths such as a contiguous 320 MHz, 160 MHz, 80 MHz, or 40 MHz channel or a non-contiguous 320 MHz channel (e.g., 160+160). In some cases, the non-contiguous or contiguous channels may be of different bandwidths. For example, the implementations described herein are applicable to 80+40, 160+40, 160+80 MHz combinations. In one example—the eight bit field may correspond to four 40 MHz operating bandwidths. Accordingly, STA 115-a may indicate a preference for a 40 MHz operating channel by transmitting a channel field set to "00001100" where the "11" corresponds to the preferred 40 MHz operating channel. The AP 105-a may indicate permission to communicate in the request 40 MHz channel as well as indicate the pseudo primary channel within the 40 MHz channel by transmitting a channel field set to "00001000" or"11111011."

Channel indication techniques may further be utilized to signal the pseudo-primary channel within a secondary channel to a STA 115 after the STA 115 is parked on the secondary channel. In other words, the STA 115 is utilizing a secondary channel, and the AP 105 may indicate (e.g., OMI control signaling or other control signaling) to the STA 115 the pseudo-primary channel within the secondary channel for primary channel operations and procedures. These techniques may further be used to change the pseudo-primary channel within the secondary channel.

In some cases a management frame may carry a TWT element (with the channel field) to indicate the desired preference. For example, a management frame may carry a request, such as a TWT request that indicates the preferred 40 MHz (or other bandwidth). The management frame may be a probe request, or a probe response, or an association request response, or a reassociation request response, or a TWT request, or a TWT response, or an action frame.

Figure 3:
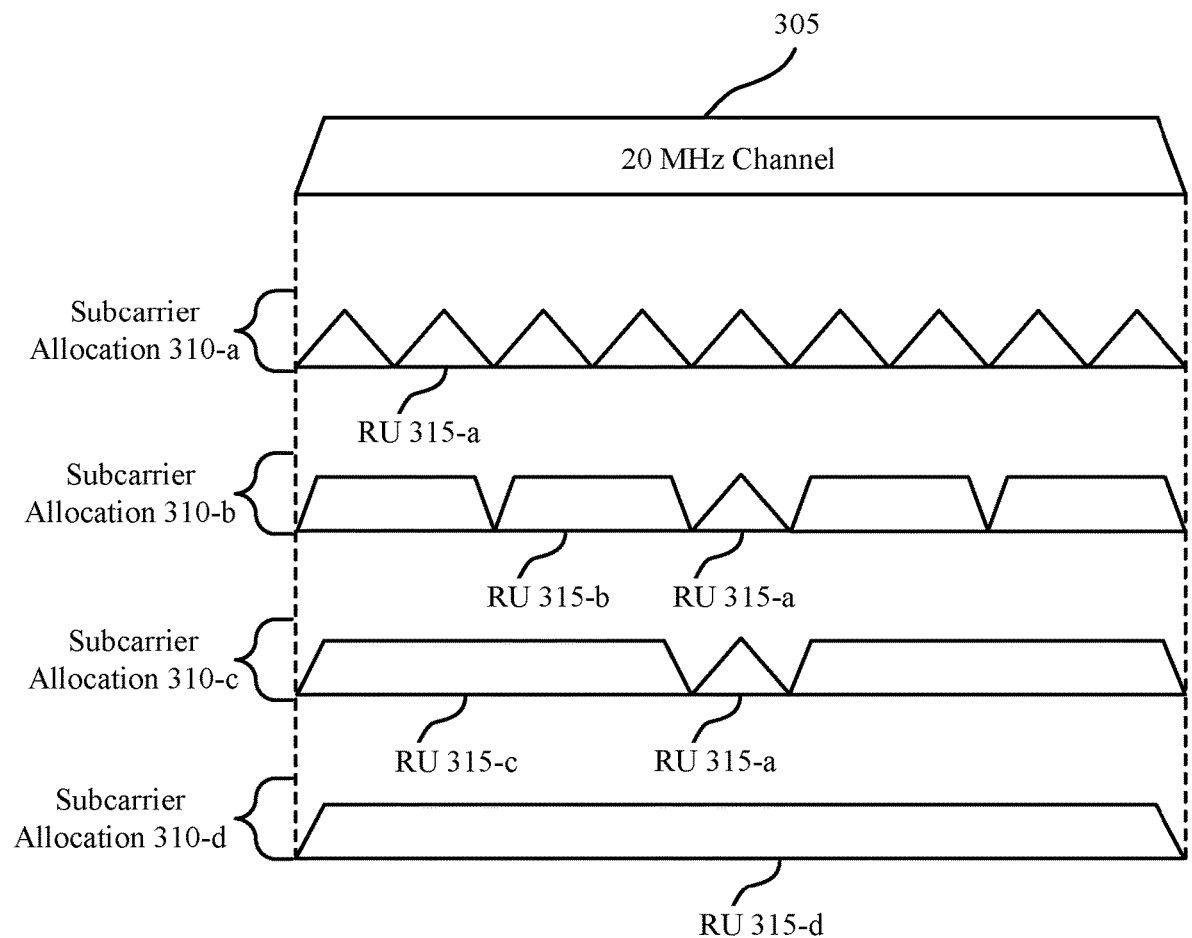
FIG. 3 illustrates an example of a channel diagram that supports mechanisms to support secondary channel operation in accordance with aspects of the present disclosure.

FIG. 3 illustrates an example channel diagram 300 that supports a STA (e.g., a 20 MHz STA) parked on a secondary channel in accordance with aspects of the present disclosure. Though described in the context of a 20 MHz channel 305, it is to be understood that channel diagram 300 may apply to (e.g., or be scaled to apply to) channels of any suitable bandwidth, for example a wider bandwidth, such as 40 MHz, or a narrower bandwidth, such as 15 MHz. As shown in channel diagram 300, a 20 MHz bandwidth may be divided into a number of RUs 315, and each RU may include a number of subcarriers. In some examples, a first subcarrier allocation 310-a may include nine (9) RUs 315-a each including twenty-six (26) subcarriers. A second subcarrier allocation 310-b may include four (4) RUs 315-b each including fifty-two (52) subcarriers and one RU 315-a. A third subcarrier allocation 310-c may include two (2) RUs 315-c each including 106 subcarriers and one RU 315-a. A fourth subcarrier allocation 310-d may include one (1) RU including 242 subcarriers. For each subcarrier allocation 310, adjacent RUs 315 may in some cases be separated by a null subcarrier (e.g., to reduce leakage between adjacent RUs 315). Other subcarrier allocations 310 (e.g., achieved by modifying or combining aspects of subcarrier allocations 310-a, 310-b, 310-c, and 310-d) are considered within the scope of the present disclosure.

An AP may allocate specific or dedicated RUs to a number of associated STAs using a trigger frame. In some cases, the trigger frame may identify a number of STAs associated with the AP, and may solicit uplink data transmissions from the identified STAs using their allocated RUs. The trigger frame may in some cases use AID values or other types of unique identifiers, assigned by the AP to its associated STAs, to identify which STAs are to transmit uplink data to the AP in response to the trigger frame. In some cases, the trigger frame may indicate the RU size and location, the modulation and coding scheme (MCS), and the power level for uplink transmissions to be used by each of the STAs identified in the trigger frame. As used herein, the RU size may indicate the bandwidth of the RU, and the RU location may indicate which frequency subcarriers are allocated to the RU. A trigger frame that allocates dedicated RUs to a number of associated STAs identified in the trigger frame may be referred to herein as a directed trigger frame.

In some cases, an AP may allocate different RUs based on types of transmissions. For example, each RU may support a given type of transmission (e.g., SU transmissions, MU transmissions, broadcast transmissions, random access transmissions, etc.). RUs which support SU (or MU) transmissions may in some cases be referred to as directed or dedicated RUs. As described above, the RU allocation may be indicated based at least in part on AIDs associated with intended STAs. Thus, a MU transmission over a given channel may be based on an association or mapping between AIDs (or other types of identifiers) of the multi-user group and one or more RUs of the given channel. For example, the association (e.g., a corresponding AID) may be indicated in a trigger frame, a preamble of a frame, etc., to identify the RU.

Figure 4:
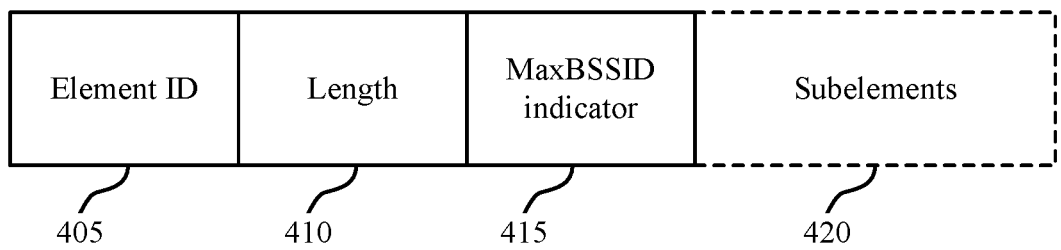
FIG. 4 illustrates an example of a frame that supports multiple basic service sets supporting secondary channels in accordance with aspects of the present disclosure.

FIG. 4 illustrates an example of an element 400 that supports multiple basic service sets supporting secondary channels in accordance with various aspects of the present disclosure. Element 400 may be an example of a multiple BSSID element. In some cases, element 400 may be used by an AP 105 to indicate that the AP 105 belongs to a Multiple BSSID set. As illustrated, element 400 includes an element ID field 405, a length field 410, a MaxBSSID indicator field 415, and an optional subelements field 420. The element ID field 405 may store a value indicating the element type (e.g., a Multiple BSSID element). The length field 410 may store a value indicating a length of the element 400. The MaxBSSID indicator field 415 may store a value indicating the maximum possible number of BSSIDs in a particular multiple BSSID set. In some cases, the actual number of BSSIDs in the multiple BSSID set may not be explicitly signaled. The MaxBSSID indicator field 415 may store a value of "n" to indicate a maximum number 2' of BSSIDs supported by and AP 105. In some cases, a beacon frame may include more than one multiple BSSID element (e.g., more than one version of element 400). Alternatively or additional, element 400, or multiple elements 400, may be communicated in other types of frames, such as in a trigger frame.

The optional subelements field 420 may store zero or more additional subelements. For example, subelements field 420 may include a non-transmitted BSSID profile (e.g., a list of elements for one or more VAPs associated with the non-transmitted BSSIDs). For example, subelements field 420 may contain a set of identifiers (e.g., AIDs), wherein each identifier indicates broadcast traffic for one (or more) VAPs.

Figure 5A:
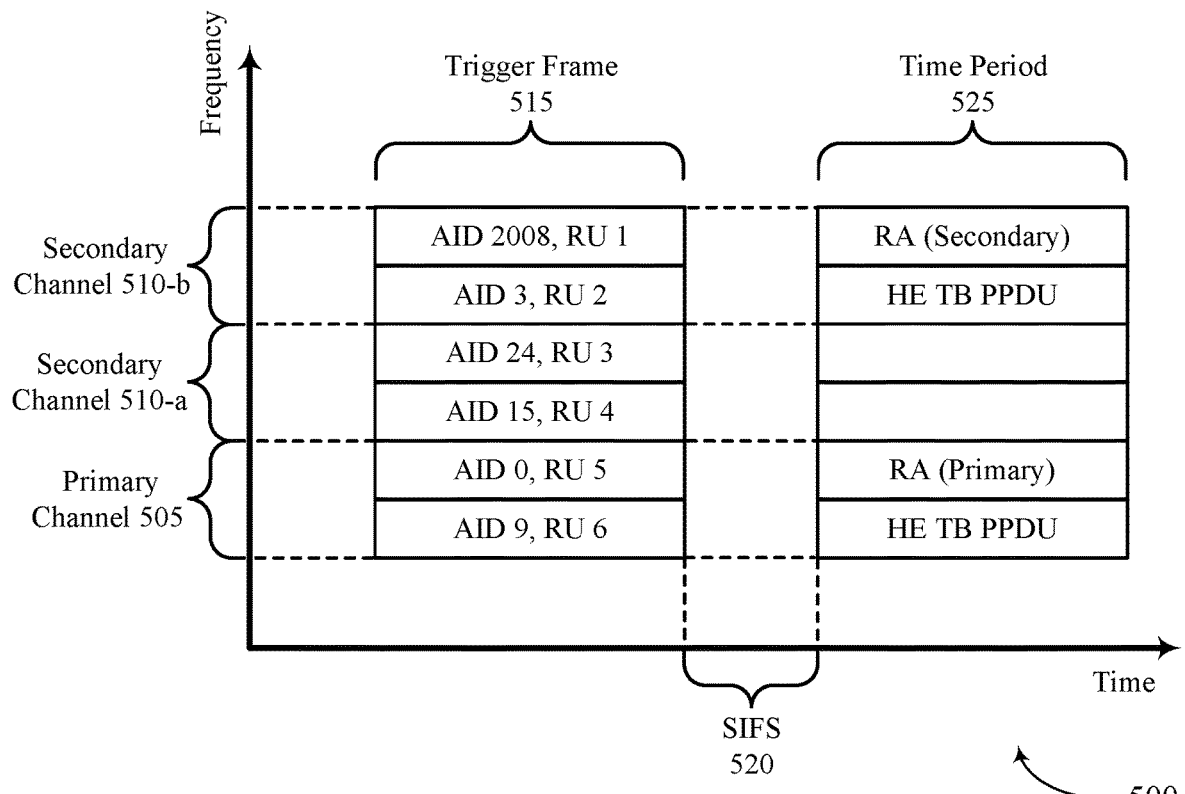
FIGS. 5A and 5B illustrate example channel diagrams that support multiple basic service sets supporting secondary channels in accordance with aspects of the present disclosure.

FIG. 5A illustrates an example channel diagram 500 that supports multiple basic service sets supporting secondary channels in accordance with aspects of the present disclosure. Aspects of channel diagram 500 may support random access RU assignment. Channel diagram includes a primary channel 505, a secondary channel 510-a, and a secondary channel 510-b. Each of these may be an example of the corresponding features described with reference to FIG. 2B. Accordingly, each of these channels may have a bandwidth of 20 MHz, though other bandwidths may also be used (e.g., 4 MHz, 1.25 MHz, 40 MHz, etc.). Each of these channels may additionally be associated with communications between a single AP 105 and a respective groups of STAs 115. Various implementations are described with respect to association identifiers (AIDs), but it should be understood that other types of identifiers may be utilizes.

Channel diagram 500 contains a trigger frame 515, which may allocate RUs to STAs 115 (e.g., for uplink communications). As illustrated, trigger frame 515 may include RU allocation information similar to that contained in the preamble 1305 of packet 1300 described with reference to FIG. 13. By way of example, trigger frame 515 may contain RU allocation information for primary channel 505 and secondary channels 510-a and 510-b (e.g., as well as other secondary channels 510). In some cases, the secondary channels 510 may not be contiguous in frequency. After a short interframe space (SIFS) 520 following trigger frame 515, one or more STAs 115 indicated in trigger frame 515 may begin transmitting. By way of example, trigger frame 515 may contain RU allocation information specifying AID 0 for RU 5, which falls in primary channel 505. Accordingly, STAs 115 associated with the AP 105 via primary channel 505 may determine that RU 5 is available for random access during time period 525. Additionally, trigger frame 515 may contain RU allocation information specifying AID 9 for RU 6, which also falls in primary channel 505. Accordingly, the STA 115 having AID 9 may in some cases transmit to the AP 105 over RU 6 during time period 525.

Similarly, trigger frame 515 may contain RU allocation information specifying AID 3 for RU 2, which falls in secondary channel 510-b. Accordingly, the STA 115 having AID 3 may in some cases transmit to the AP 105 over RU 2 during time period 525. In some cases, AIDs may be shared across channels (e.g., such that AID 3 applies to a STA 115 parked on secondary channel 510-b but is not reused for another STA 115 associated with primary channel 505). Trigger frame 515 may also contain RU allocation information indicating random access RU(s) for secondary channel 510-b. By way of example, the RU allocation information may include AID 2008 for RU 1, which may indicate to STAs 115 parked on secondary channel 510-b that RU 1 is available for random access transmissions. In some examples, STAs 115 associated with primary channel 505 may not consider RU 1 as available for random access transmissions. Thus, trigger frame 515 may be an example of a TxBSSID transmission (e.g., a transmission from a VAP operating on a primary channel of the AP 105).

Figure 5B:
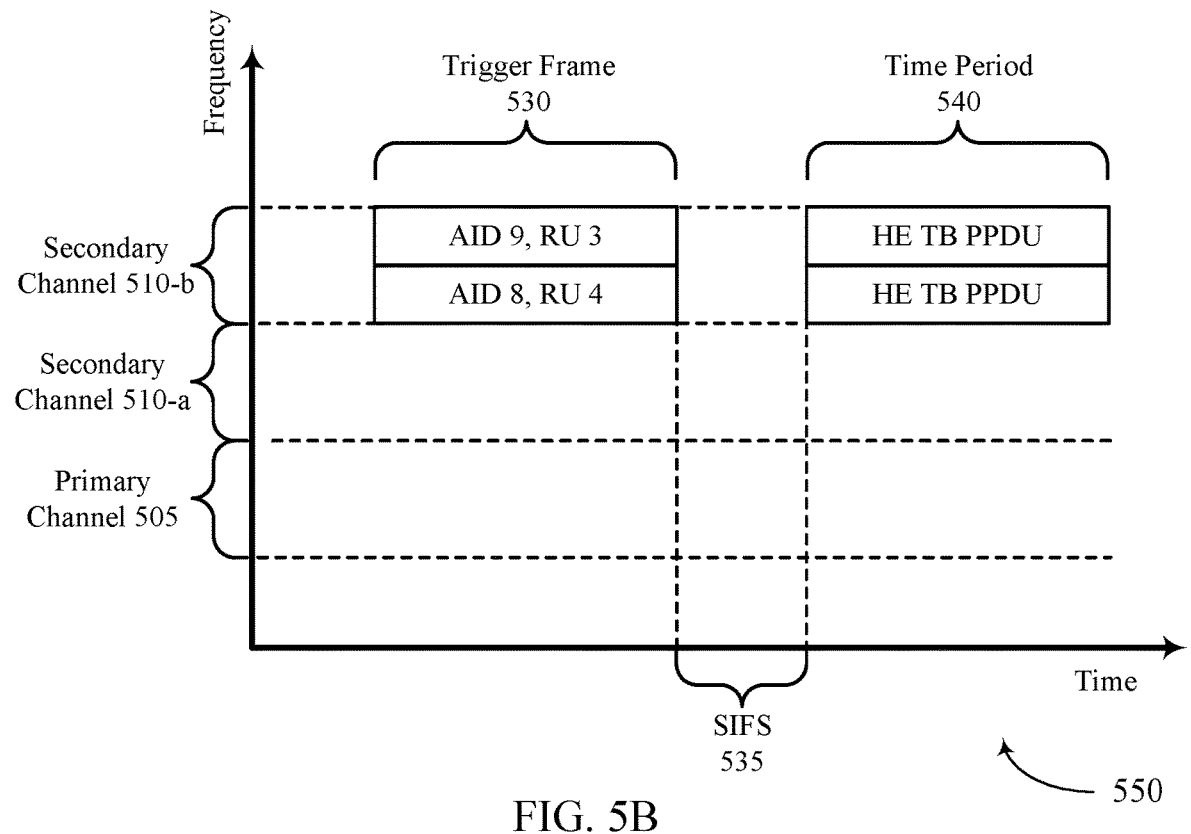

FIG. 5B illustrates an example channel diagram 550 that supports multiple basic service sets supporting secondary channels in accordance with aspects of the present disclosure. Channel diagram includes a primary channel 505, a secondary channel 510-a, and a secondary channel 510-b. Each of these may be an example of the corresponding features described with reference to FIGS. 2B and 5A.

Accordingly, each of these channels may have a bandwidth of 20 MHz, though other bandwidths may also be used (e.g., 4 MHz, 1.25 MHz, 40 MHz, etc.). Each of these channels may additionally be associated with communications between a single AP 105 and a respective groups of STAs 115.

Channel diagram 550 includes a trigger frame 530, which may be an example of a non-Tx-BSSID transmission (e.g., a transmission from a VAP operating on a secondary channel of the AP 105). Trigger frame 530 may include RU allocation information for secondary channel 510-b (e.g., but not for secondary channel 510-a or primary channel 505). After a SIFS 535 following trigger frame 530, one or more STAs 115 indicated in trigger frame 530 may begin transmitting. By way of example, trigger frame 530 may contain RU allocation information specifying AID 9 for RU 3 (e.g., which may be different from the RU 3 described with reference to FIG. 5A), which falls in secondary channel 510-b. Accordingly, the STA 115 having AID 9 may transmit a HE TB PPDU to the VAP corresponding to the non-TxBSSID via RU 3 in time period 540. Similarly, trigger frame 530 contains RU allocation information specifying AID 8 for RU 4 (e.g., which may be different from RU 4 described with reference to FIG. 5A). Accordingly, the STA 115 having AID 8 may transmit a HE TB PPDU to the VAP corresponding to the non-TxBSSID via RU 4 in time period 540.

Figure 6:
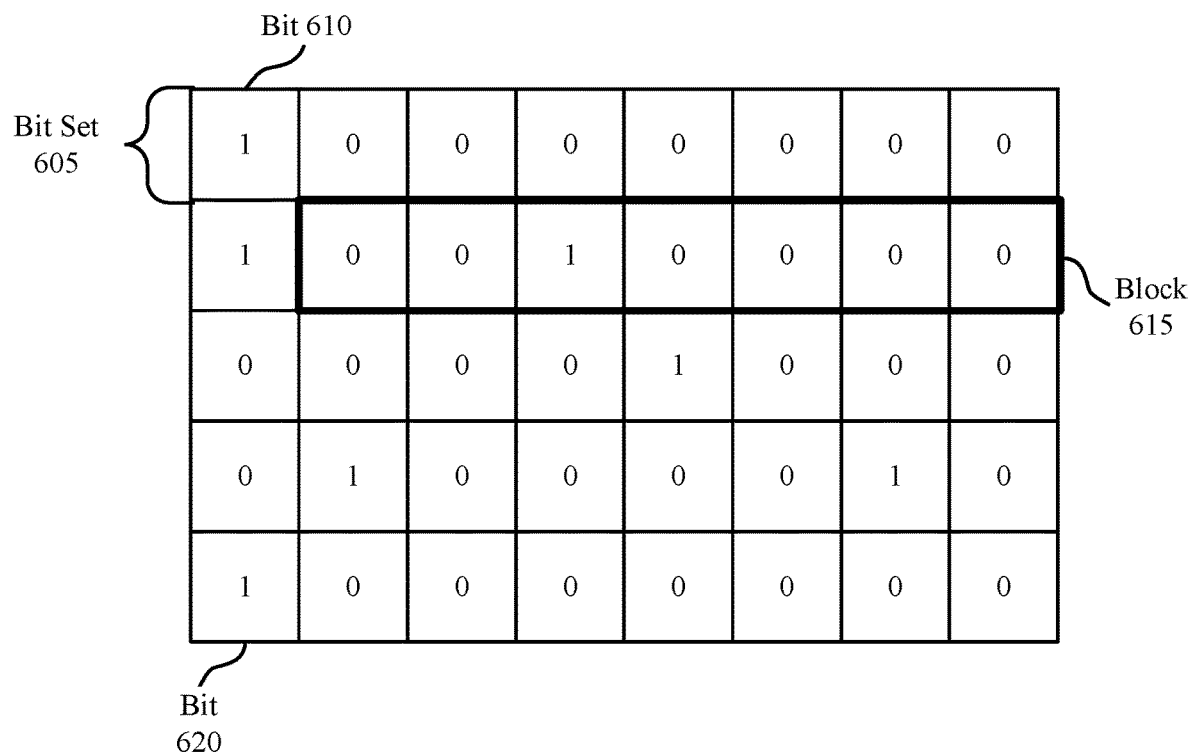
FIG. 6 illustrates an example of a bitmap that supports multiple basic service sets supporting secondary channels in accordance with aspects of the present disclosure.

FIG. 6 illustrates an example of a bitmap 600 that supports multiple basic service sets supporting secondary channels in accordance with various aspects of the present disclosure. For example, bitmap 600 may define a group-address AID (broadcast identifier) mapping that may indicate the presence or absence of traffic to be delivered to all stations associated with the transmitted BSSID and any of the non-transmitted BSSIDs. More specifically, the bitmap 600 may include a number of octets of the traffic indication virtual bitmap of the traffic indication map (TIM) element of a beacon frame transmitted from a Tx BSSID. The maximum possible number of supported BSSIDs may be denoted as $2^n$, and an integer "k" may indicate the number of actually supported non-transmitted BSSIDs, where $k \leq (2^n-1)$. The group-address AID mapping in the TIM element of a beacon frame may be referenced to (or indexed from) the VAP that transmits the beacon frame. For example, an AID value of 0 may represent group address traffic in the VAP that transmitted the beacon frame. Bits 1 through k of bitmap 600 (e.g., illustrated as the eight bits in bit set 605) may be used to indicate whether one or more group addressed frames are buffered for each of the VAPs corresponding to a non-transmitted BSSID. Thus, AID values between 1 and k may in some cases not be allocated to any STA 115. AID values from (k+1) to $(2^n-1)$ may be reserved and may be set to 0.

When the DTIM count field in a beacon frame is 0 for a BSS that has a non-transmitted BSSID, and one or more group addressed frames are buffered at the AP 105 for the BSS, bits 1 through k of bitmap 600 may each be set to '1' (e.g., to indicate the presence of queued multicast traffic in the non-transmitted BSSIDs). Each bit starting from bit position $2^n$ in bitmap 600 may indicate whether there is unicast data (such as queued downlink (DL) data) buffered for a corresponding STA 115 (as identified by its AID value) within any BSS corresponding to a transmitted BSSID or a non-transmitted BSSID.

For example, referring to bitmap 600, the first bit of the bitmap field (e.g., which may be a field in a beacon) may indicate whether the AP (or VAP) corresponding to BSSID1 has multicast traffic for its STAs 115, the second bit of the bitmap field may indicate whether the AP (or VAP) corresponding to BSSID2 has multicast traffic for its STAs 115, and so on. When a STA 115 receives a beacon frame containing a bitmap 600, the STA 115 may in some cases examine two bits of bitmap 600. The first monitored bit may correspond to the AID of the STA 115 and may indicate whether the associated AP (or VAP) has broadcast traffic for the STA 115. The second monitored bit may correspond to the non-transmitted BSSID's TIM element and indicate whether a VAP operating over a secondary channel has multicast traffic for the STA 115. For example, if a STA 115 has an AID value of 6, then the STA 115 may examine the fifth bit of bitmap 600 to determine whether its VAP has broadcast traffic for the STA 115, and may examine the twenty-fourth bit to determine whether the non-transmitted BSSID (such as the VAP corresponding to another BSS) has broadcast traffic for the STA.

As depicted, bitmap 600 indicates that the Tx BSSID has queued DL multicast data to be delivered (e.g., based on bit 610), and that the non-transmitted BSSID having an index value of 3 has queued downlink multicast data to be delivered (e.g., based on the third bit in the non-transmitted BSSID group-addressed traffic indication outlined by block 615. Bitmap 600 also indicates that the AP 105 has queued downlink data for the STAs 115 having AID values of 12, 17, 22, and 24 (e.g., based on bit 620).

Figure 7:
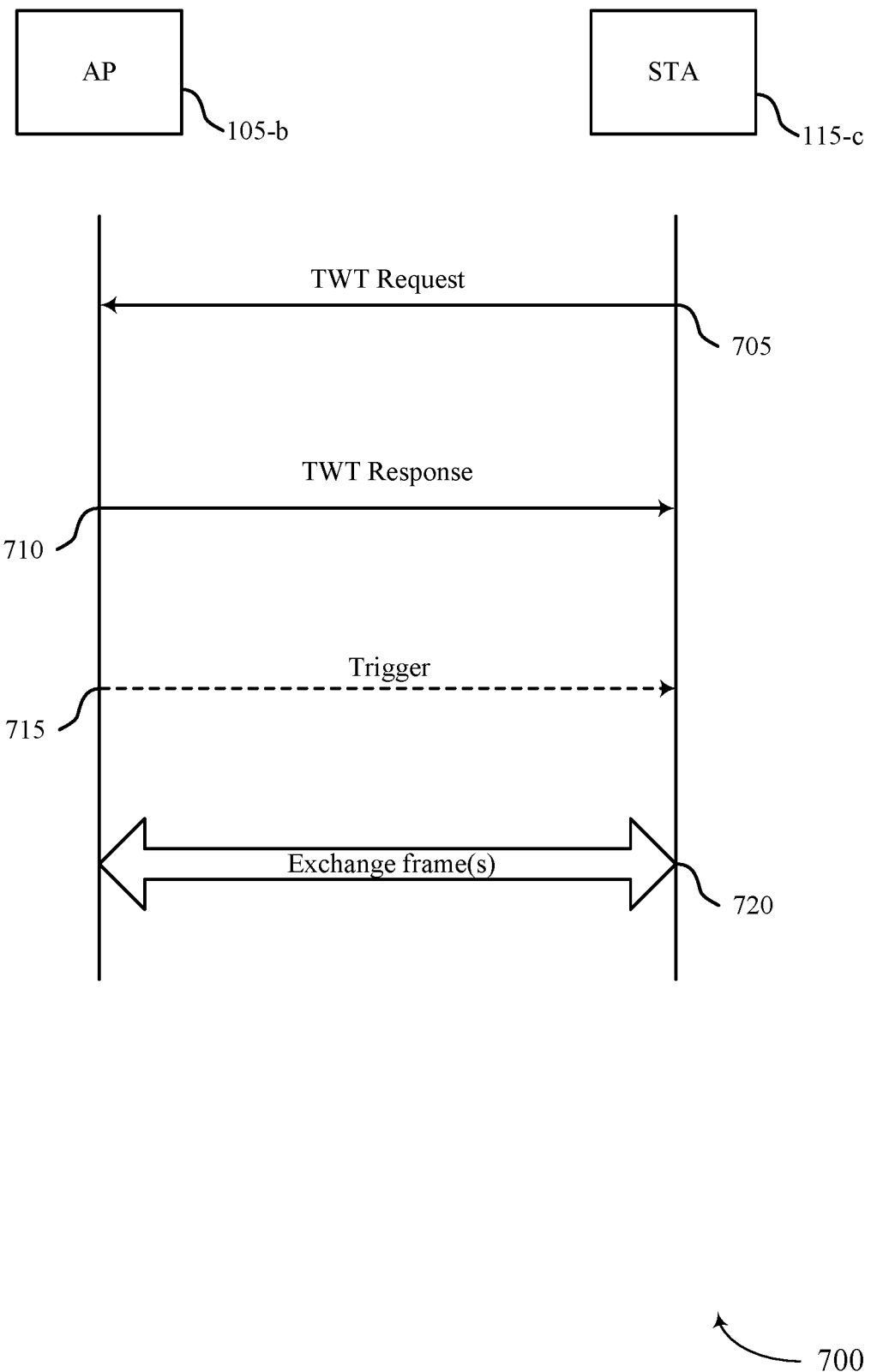
FIGS. 7 through 12 illustrate example process flows that support mechanisms to support secondary channel operation in accordance with aspects of the present disclosure.

FIG. 7 illustrates an example process flow 700 that supports mechanisms to support secondary channel operation in accordance with aspects of the present disclosure. Process flow 700 includes AP 105-b and STA 115-c, each of which may be an example of the corresponding devices described above (e.g., with reference to FIGS. 1 and 2). For example, STA 115-c may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 70 MHz, 80 MHz, etc.) are explicitly contemplated. Aspects of process flow 700 may support negotiation of a TWT schedule between AP 105-b and STA 115-c (e.g., for a secondary channel).

At 705, STA 115-c may transmit a TWT request to AP 105-b. In some cases, the TWT request may be transmitted on a secondary channel on which STA 115-c is parked. Additionally or alternatively, the TWT request may be transmitted on a primary channel of AP 105-b. For example, STA 115-c may set one bit in a TWT channel field of the TWT request to '1' to request operating in a 20 MHz secondary channel. In some cases, STA 115-c may indicate a wider bandwidth capability to the AP 105-b, in addition to the indicated secondary channel.

At 710, AP 105-b may transmit a TWT response. In the TWT response, AP 105-b may set one bit in the TWT channel field to '1' to indicate that the 20 MHz secondary channel indicated in the TWT request is available (e.g., for trigger-enabled TWT SPs and using the same bit as the request). In some cases, the TWT response may be transmitted on a secondary channel on which STA 115-c is parked. Additionally or alternatively, the TWT response may be transmitted on a primary channel of AP 105-b.

In some cases, the operations of 705 and 710 may together be referred to as a TWT negotiation. In some examples of the TWT negotiation, STA 115-c and/or AP 105-b may set the subchannel selective transmission (SST) support field to '1' in the high efficiency (HE) capabilities element it transmits. In some cases, the TWT negotiation may be performed on a per-STA 115 basis (e.g., a unicast TWT for each STA 115), or may be performed for a group of STAs 115 (e.g., a broadcast TWT). STA 115-*c* may identify a TWT schedule (e.g., indicating a plurality of TWT SPs) based at least in part on the TWT negotiation. In some cases, the TWT schedule may apply to the primary channel, the secondary channel, or a combination thereof. In some cases, if the STA 115-*c* is assigned an SST channel (i.e., indicated channel) via individual addressed frames (i.e., unicast TWT request/TWT response frames), the AP 105-*b* may transmit frames to the STA 115-*c* using any portion of the wider bandwidth that is supported by the STA 115-*c*, provided that the SST channel is within the PPDU transmission. In some aspects, the SST channel may serve as a temporary primary channel for the STA 115-*c* (i.e., bandwidth of the PPDU may follow the same channelization mapping of the basic service set (BSS)).

In some other cases, a group of STAs 115 may be assigned an SST channel via broadcast frames (i.e., broadcast TWT element). In such cases, the AP 105-*b* may only send frames to the STAs 115 that are limited to the SST channel indicated to the STAs. In some aspects, knowledge of the individual negotiation may be limited to the STA 115-*c* and AP 105-*b*, whereas broadcast negotiations may be decoded by one or more neighboring APs 105. In some cases, information pertaining to the broadcast negotiations may be utilized by one or more neighboring APs for transmissions over unused resources.

At 715, AP 105-*b* may optionally transmit a trigger frame during one of the negotiated TWT SPs over the secondary channel (e.g., to solicit a response from STA 115-*c* or to poll STA 115-*c* for uplink data). In some cases, STA 115-*c* may identify, based on the trigger frame, a RU of the secondary channel to use to transmit uplink frames to AP 105-*b* in response to the trigger frame. Additionally or alternatively, STA 115-*c* may transmit (e.g., on the primary channel during one or more of the plurality of TWT SPs) an indication that it is available to receive one or more frames on the secondary channel. That is, in some cases STA 115-*c* may initiate the exchange of frames (e.g., instead of AP 105-*b* initiating the exchange of frames with the trigger frame).

At 720, AP 105-*b* and STA 115-*c* may exchange frames (e.g., control frames, management frames carrying critical updates, data frames etc.) over the indicated secondary channel, and one or more other secondary channels (i.e., if the STA 115-*c* has indicated a wider bandwidth capability) during one of the TWT SPs. For example, the exchange of frames may be achieved using one or more RUs in the secondary channel. For example, the RUs may be assigned to STA 115-*c* in the trigger frame at 715. Additionally or alternatively, the RUs may be part of a MU downlink PPDU.

As described above, in some circumstances, the STA 115-*c* may be an example of a low latency station having strict latency and/or reliability requirements. In such cases, the AP 105-*b* may park the STA 115-*c* on the indicated or preferred secondary channel, and may support one or more other stations (e.g., stations supporting EDCA protocols, also referred to as EDCA stations, or any other stations supporting contention free access) on the primary channel. Thus, in some aspects, the AP 105-*b* may exchange frames with the STA 115-*c* over the indicated secondary channel, which may serve to limit the interference experienced by the STA 115-*c* from traffic originating from the one or more EDCA stations.

In one example, the AP 105-*b* may limit the stations supporting EDCA (or accessing the medium using EDCA) from performing transmissions on the indicated (or preferred) secondary channel of STA 115-*c*. Additionally or alternatively, the AP 105-*b* may limit the EDCA stations to the primary channel. In some aspects, restricting EDCA transmissions over the primary channel may allow the STA 115-*c* to meet its latency requirements (i.e., by isolating its communications from those of the EDCA stations).

Thus, broadly, the AP 105-*b* may support a flexible RU allocation scheme over the primary channel, and one or more secondary channels, which may be based in part on the different requirements (e.g., latency, reliability, etc.) and capabilities (e.g., supported bandwidth) of the client devices (or stations) that are parked on one or more channels of the total AP bandwidth.

In some cases, the AP 105-*b* may also support puncturing of one or more subchannels in the PPDU transmissions. For instance, for a 160 MHz PPDU, the RU allocation and transmissions may occur over the 20 MHz primary channel, a secondary 70 MHz, and so on. In this instance, a 20 MHz secondary channel may have been nulled out (i.e., not included) for transmissions by the AP 105-*b*. Thus, in some cases, the transmission may not use a contiguous set of subchannels for the PPDU transmission, because once or more subchannels may be nulled or punctured out.

As described above, the AP 105-*b* and the STA 115-*c* may support operating bandwidths that include multiple minimum width channels, such as 70 MHz (two 20 MHz channels) and 80 MHz (four 20 MHz channels). When operating in wider bandwidths, the AP 105-*b* and the STA 115-*c* may negotiate communication in a primary or secondary channel (e.g., 80 MHz primary and 80 MHz secondary channel) and may further negotiate a primary minimal bandwidth channel (e.g., 20 MHz) within the secondary channel for primary channel operations and procedures.

In FIG. 7, the request 705 may include a channel field that indicates a preference for a secondary 80 MHz channel (e.g., 00001111). In some cases, the request 705 may include a further preference for the pseudo-primary channel within the secondary 80 MHz by setting the channel field to 00001101, where the "0" within "1101" indicates the pseudo-channel preference. The response 710 transmitted by the AP 105-*b* may indicate acceptance of the requested secondary 80 MHz channel and pseudo-primary channel by transmitting the corresponding channel field (e.g., 00001101) or may indicate another preferred pseudo-primary channel (e.g., 00001011). As described above, the pseudo-channel request/acceptance technique describe may utilize up to eight bits, within one bit set to 0 to indicate the pseudo-primary channel (e.g., channel field="11111011") or may utilize four bits, with one bit set to 0 to indicate the pseudo-primary channel (e.g., channel field="00001011").

Figure 8:
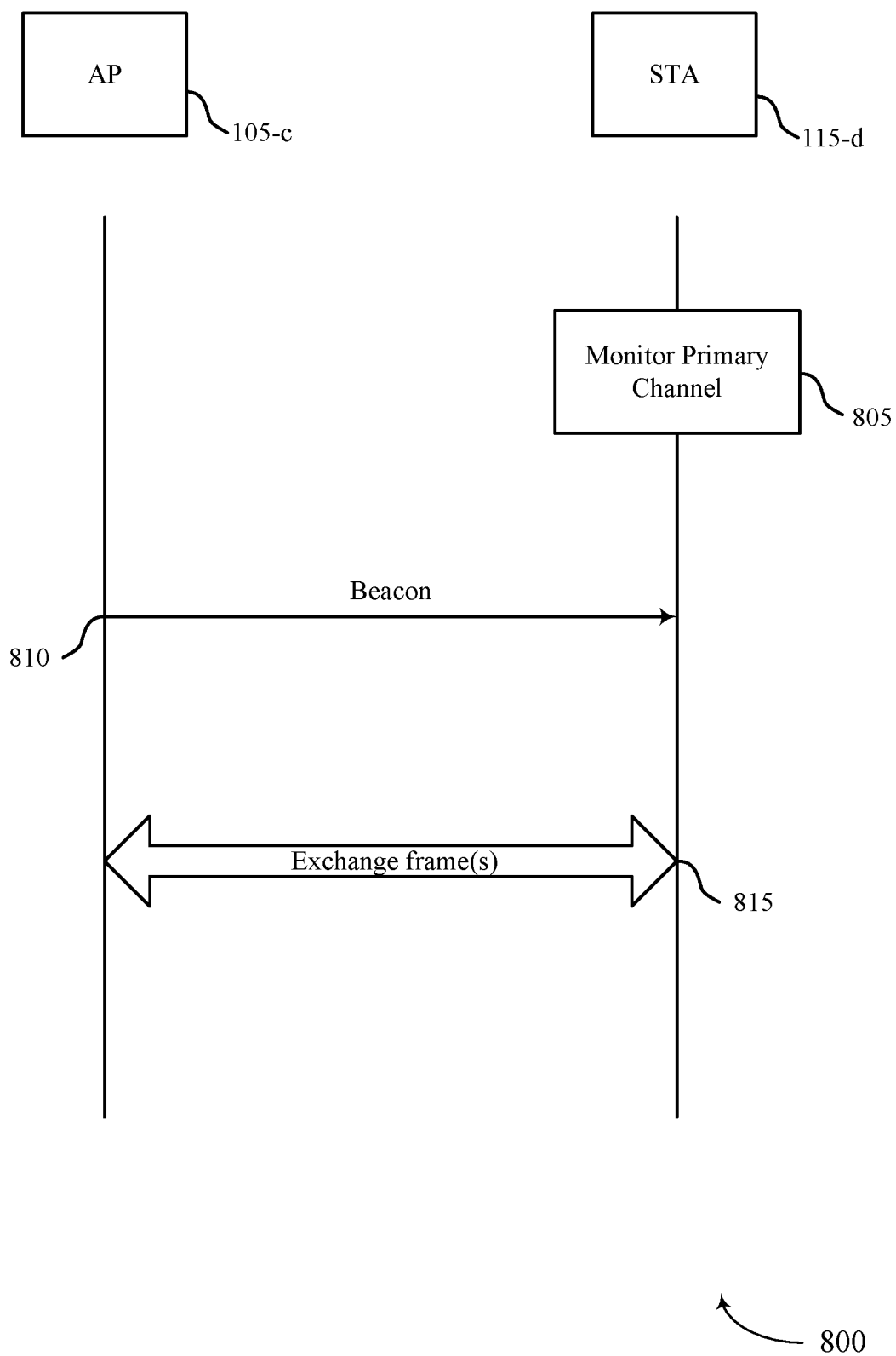

FIG. 8 illustrates an example process flow 800 that supports mechanisms to support secondary channel operation in accordance with aspects of the present disclosure. Process flow 800 includes AP 105-*c* and STA 115-*d*, each of which may be an example of any of the corresponding devices described above (e.g., with reference to FIGS. 1 and 2). For example, STA 115-*d* may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 40 MHz, 80 MHz, etc.) are explicitly contemplated. Aspects of process flow 800 may support exchange of management frames and group-address traffic between AP 105-*c* and STA 115-*d*.

At 805, STA 115-d may monitor a primary channel of AP 105-c for DTIM beacons. AP 105-c may operate using the primary channel and one or more secondary channels of a total bandwidth of AP 105-c. That is, in some examples STA 115-d, which may be parked on a secondary channel of AP 105-c, may continue to tune into the primary channel of AP 105-c for management frames and group-address traffic. For example, STA 115-d may monitor during all (e.g., or a subset of) DTIM TBTTs associated with the primary channel.

At 810, AP 105-c may transmit (and STA 115-d may receive) a beacon (e.g., a DTIM) over the primary channel. For example, the DTIM may carry a traffic indication map (TIM) element (e.g., which may carry traffic information). Additionally or alternatively, the DTIM may in some cases carry a time synchronization function (TSF). In some cases, the DTIM may be addressed to a group of STAs 115 (e.g., including STA 115-d). In some cases, the DTIM may be received during one or more of a plurality of TWT SPs (e.g., which may be negotiated according to process flow 700). In some cases, STA 115-d may receive a set of beacons from AP 105-c on the primary channel, where at least one of the plurality of beacons includes the DTIM. In some cases, the plurality of beacons may include a subset of all beacons transmitted by AP 105-c on the primary channel.

At 815, AP 105-c and STA 115-d may exchange one or more frames over the secondary channel based at least in part on the DTIM exchanged over the primary channel. Thus, STA 115-d may in some cases switch (e.g., rapidly or otherwise) between communications over the primary channel and secondary channel. In some cases, AP 105-c and STA 115-d may exchange the one or more frames on the secondary channel exclusive of transmissions on the primary channel.

Figure 9:
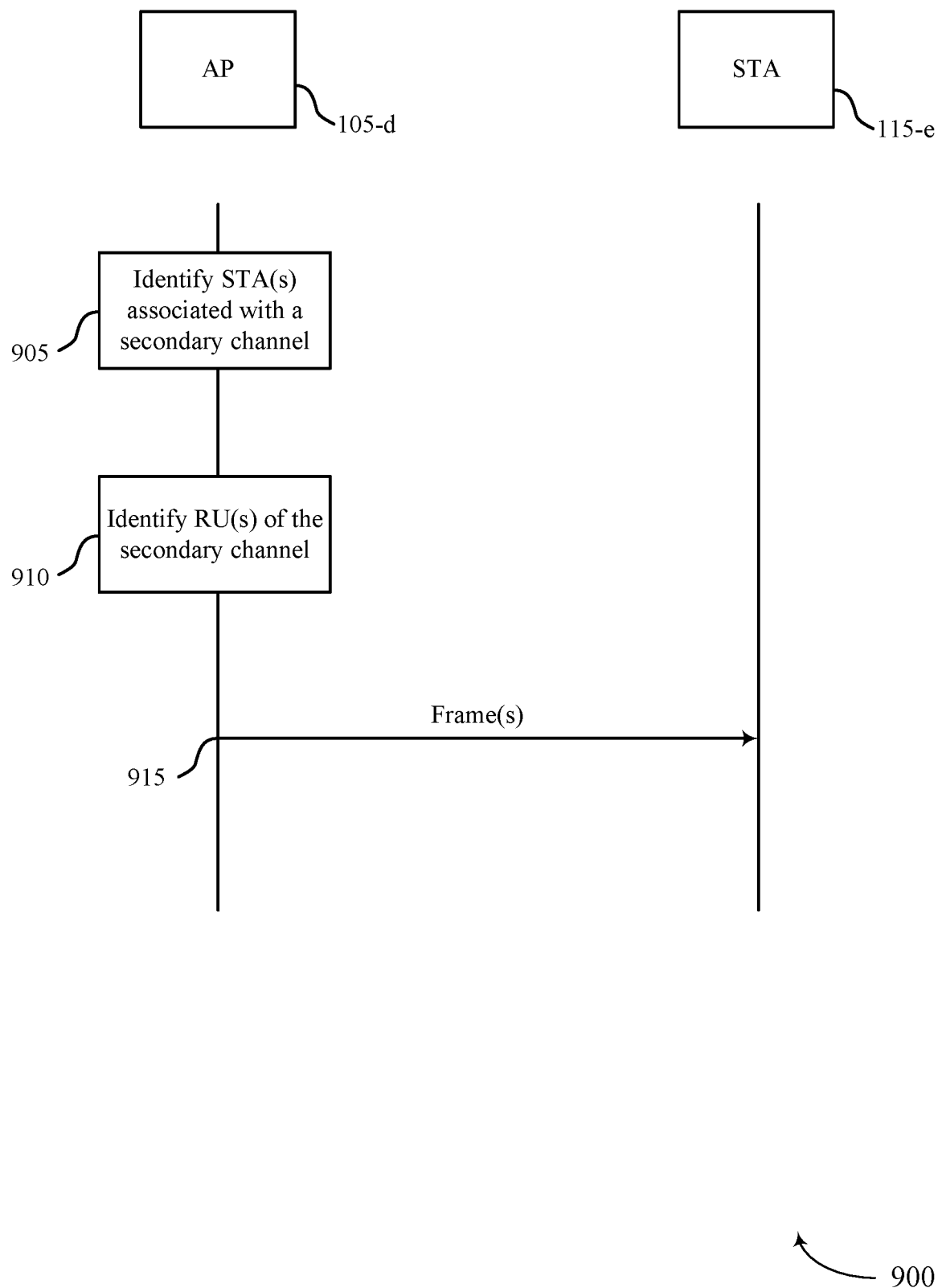

FIG. 9 illustrates an example process flow 900 that supports mechanisms to support secondary channel operation in accordance with aspects of the present disclosure. Process flow 900 includes AP 105-d and STA 115-e, each of which may be an example of any of the corresponding devices described above (e.g., with reference to FIGS. 1 and 2). For example, STA 115-e may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 40 MHz, 80 MHz, etc.) are explicitly contemplated. Aspects of process flow 900 may support exchange of management frames and group-address traffic between AP 105-d and STA 115-e.

At 905, AP 105-d may identify one or more STAs 115 (e.g., including STA 115-e) associated with an indicated secondary channel. For example, AP 105-d may identify each of the one or more STAs 115 based on a respective AID. In some cases, the STAs 115 (including STA 115-e) may be associated with the indicated secondary channel based at least in part on a TWT negotiation (e.g., as described with reference to process flow 700). AP 105-d may operate using the primary channel and one or more secondary channels of a total bandwidth of AP 105-d.

At 910, AP 105-d may identify one or more RUs of the indicated secondary channel available to transmit frames to STA 115-e. In some cases, AP 105-d may assign the identified RU(s) to STA 115-e (e.g., such that the RU(s) may be referred to directed or unicast RU(s) for STA 115-e).

At 915, AP 105-d may transmit (e.g., and STA 115-e may receive) one or more frames (e.g., control frames, management frames, etc.) on the indicated secondary channel using the RU(s) identified at 910. In some cases, the one or more frames may include a TSF, traffic information, a probe response, a TIM, or a combination thereof. In some examples, transmitting the one or more frames includes broadcasting one or more control or management frames for receipt by a group of STAs 115 (including STA 115-e) associated with AP 105-d on the indicated secondary channel. In such cases, the RU(s) identified at 910 may be examples of broadcast RU(s).

In some examples, AP 105-d may identify a unicast AID for STA 115-e and may transmit an indication of the unicast AID on the secondary channel with the one or more frames at 915. In some cases, the AP 105-d may transmit an aggregated media access control protocol data unit (A-MPDU) to STA 115-e, where the A-MPDU includes an indication of the unicast AID for STA 115-e. For example, the A-MPDU may aggregate unicast data (e.g., for one or more STAs 115) with broadcast information (e.g., management frames, control frames, etc.). In some cases, AP 105-d may transmit beacons (or other group addressed traffic) on its primary channel. Additionally, AP 105-d may assign a directed RU to a STA 115 (e.g., STA 115-e) in that secondary channel of STA 115 in a MU downlink PPDU.

In some cases, AP 105-d may use the directed RU to transmit any management or group addressed frames to STA 115-e. Management frames such as probe responses and TIM frames may carry TSF information and/or traffic information, enabling STA 115-e to maintain synchronization with AP 105-d (e.g., and also to receive the latest operating parameters for the BSS). Further, any critical announcements (e.g., channel change) may be carried in (A)MPDUs contained in a directed RU for STA 115-e. In some examples, STA 115-e may be exempt from listening to DTIM beacons, or receiving broadcast traffic sent on the primary channel of AP 105-d.

In other examples, AP 105-d may identify a broadcast AID (e.g., a STA ID value) for a group of STAs 115 (including STA 115-e) associated with the secondary channel and may transmit an indication of the broadcast AID for the plurality of STAs 115 with the one or more control or management frames at 915. That is, AP 105-d (e.g., or some other network entity) may define one or more broadcast AIDs to indicate a broadcast RU on the secondary channel. AP 105-d may use the broadcast RU to transmit any management frames, group-addressed frames, or critical announcements to all STAs 115 parked on that secondary channel. By way of example, AID 0 may be used to indicate broadcast RUs on the primary channel of AP 105-d, AID 2008 may be used to indicate broadcast RUs on one secondary channel of AP 105-d, and AID 2009 may be used to indicate broadcast RUs on another secondary channel of AP 105-d. Thus, in some cases, AP 105-d (e.g., or the other network entity) may define seven (7) new AIDs if AP 105-d is operating on a 160 MHz channel (e.g., for the seven (7) secondary channels), fifteen (15) new AIDs if AP 105-d is operating on a 320 MHz channel (e.g., for the fifteen (15) secondary channels), etc. In some cases, STA 115-e may be exempt from listening to DTIM beacons or receiving broadcast traffic sent on the primary channel of AP 105-d.

In some cases, AP 105-d may identify an AID that applies to one of a group of secondary channels (including a given secondary channel) for a set of time intervals based at least in part on a channel rotation schedule. AP 105-d may transmit an indication of the identified AID on the given secondary channel during a first time interval of the channel rotation schedule and may transmit the indication of the identified AID on another secondary channel during a second time interval of the channel rotation schedule. That is, AP 105-*d* (e.g., or some other network entity) may define one (1) new AID value and round-robin the new broadcast RU allocation between all (or a subset of) supported channels (e.g., may time-division multiplex the broadcast RU allocation to each supported secondary channel). In some such examples, STA 115-*e* may be exempt from listening to DTIM beacons or receiving broadcast traffic sent on the primary channel of AP 105-*d*.

Figure 10:
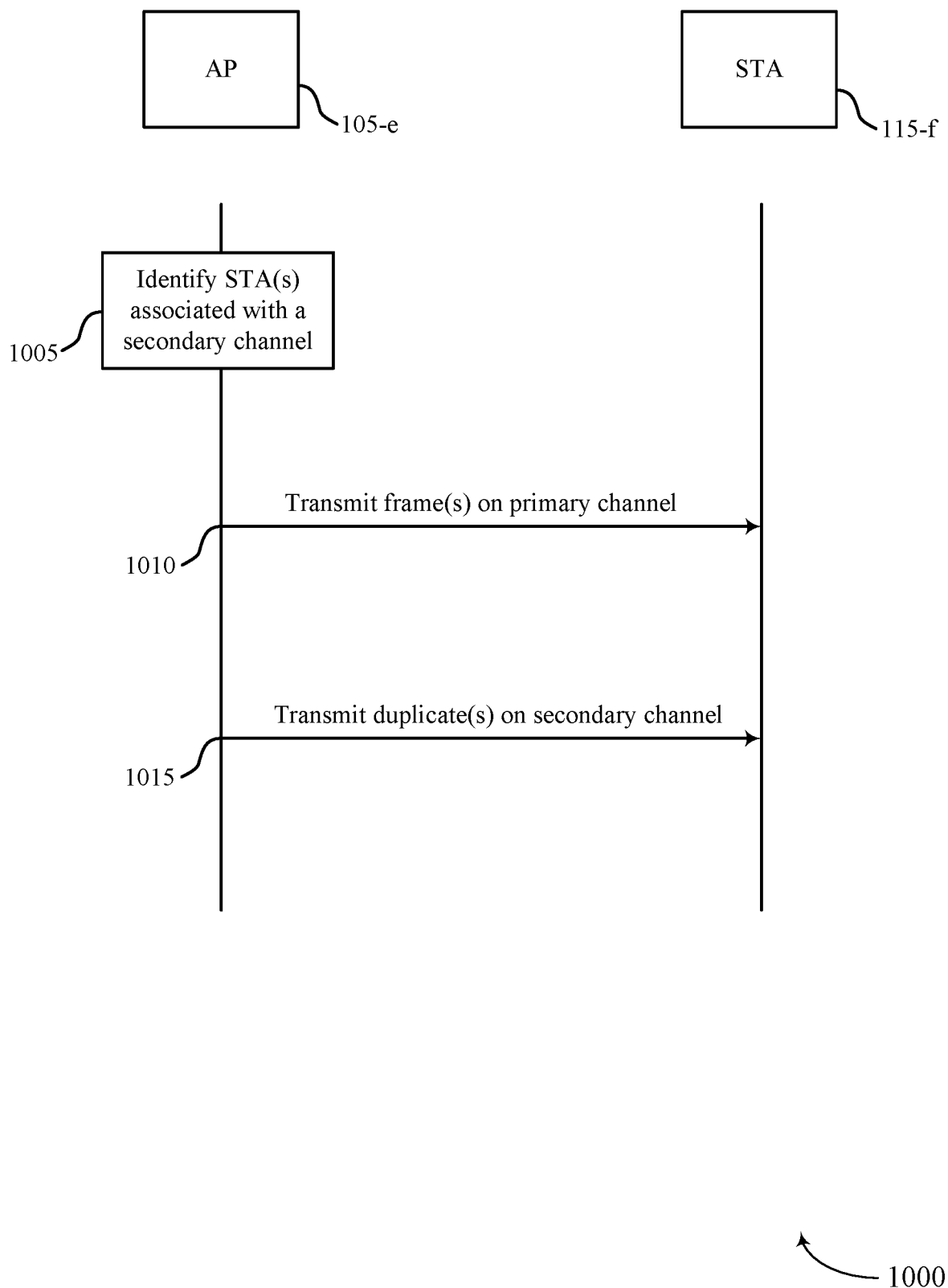

FIG. 10 illustrates an example of process flow 1000 that supports mechanisms to support secondary channel operation in accordance with aspects of the present disclosure. Process flow 1000 includes AP 105-*e* and STA 115-*f*, which may be examples of any of the corresponding devices described above (e.g., with reference to FIGS. 1 and 2). For example, STA 115-*f* may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 40 MHz, 80 MHz, etc.) are explicitly contemplated. Aspects of process flow 1000 may support exchange of management frames and group-address traffic between AP 105-*e* and STA 115-*f*.

At 1005, AP 105-*e* may identify one or more STAs 115 (e.g., including STA 115-*f*) associated with a secondary channel. For example, AP 105-*e* may identify each of the one or more STAs 115 based on a respective AID. AP 105-*e* may operate using the primary channel and one or more secondary channels of a total bandwidth of AP 105-*e*.

At 1010, AP 105-*e* may transmit, to STA 115-*f*, a first copy of a frame on the primary channel. In some cases, the frame may be a control frame or a management frame.

At 1015, AP 105-*e* may transmit, to STA 115-*f*, a second copy of a frame on the secondary channel, where the second copy of the frame includes an indication of the primary channel. In some cases, the second copy of the frame comprises a non-HT (high-throughput) duplicate PPDU. In some examples, the operations at 1010 and 1015 may be performed in parallel. That is, the first copy may be transmitted across the primary channel simultaneously to (e.g., or otherwise independently of) the second copy being transmitted on the secondary channel (or third, or fourth copies, etc., on each of the multiple secondary channels, if applicable). Thus, in some cases, AP 105-*e* may carry management frames or group addressed frames (or other critical announcements) in a non-HT duplicate PPDU with an explicit indication of the primary channel associated with the packet.

Figure 11:
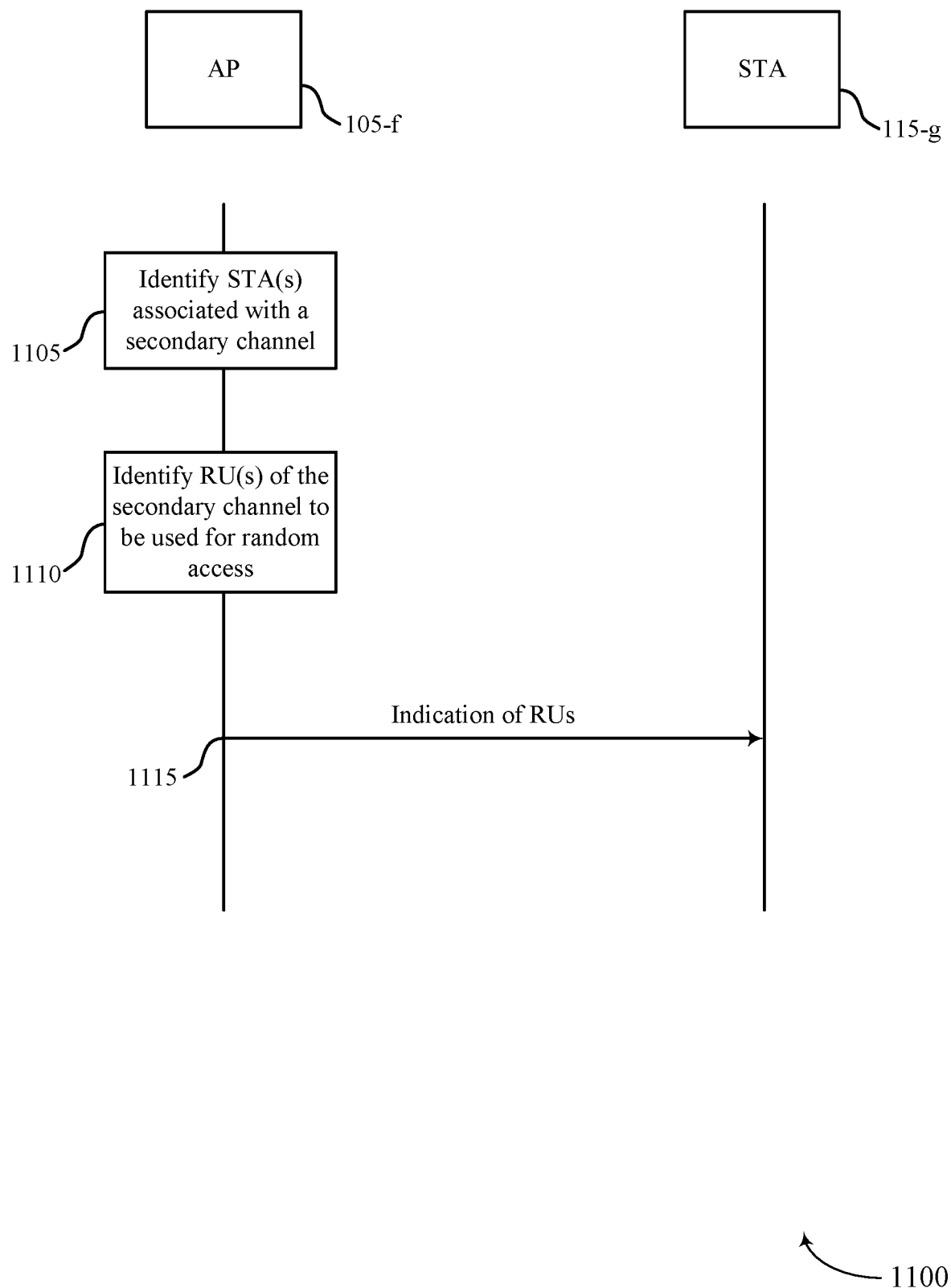

FIG. 11 illustrates an example of a process flow 1100 that supports mechanisms to support secondary channel operation in accordance with aspects of the present disclosure. Process flow 1100 includes AP 105-*f* and STA 115-*g*, which may be examples of any of the corresponding devices described above (e.g., with reference to FIGS. 1 and 2). For example, STA 115-*g* may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 40 MHz, 110 MHz, etc.) are explicitly contemplated.

At 1105, AP 105-*f* may identify one or more STAs 115 (e.g., including STA 115-*g*) associated with a secondary channel. For example, AP 105-*f* may identify each of the one or more STAs 115 based on a respective AID. AP 105-*f* may operate using the primary channel and one or more secondary channels of a total bandwidth of AP 105-*f*.

At 1110, AP 105-*f* may identify one or more RUs of the secondary channel for STA 115-*g* to use for random access to AP 105-*f*. In some cases, each of the one or more RUs of the secondary channel is assigned an AID that is unique within the secondary channel. In some cases, at least one RU of the secondary channel is assigned an AID that is a same AID as an AID assigned to a second RU used for random access on another secondary channel of AP 105-*f*. Alternatively, the one or more RUs of the secondary channel may be assigned AIDs different than an AID assigned to a second RU used for random access on a second secondary channel of the one or more secondary channels.

At 1115, AP 105-*f* may transmit an indication of the one or more RUs identified at 1110 to the STA 115-*g*. In some cases, the transmitted indication includes an AID indicating that one of the one or more RUs is to be used for random access transmissions by STA 115-*g*. In some cases, AP 105-*f* may receive a transmission from STA 115-*g* on an RU identified at 1110.

Thus, in order to regulate random access RU assignment between its primary and secondary channels, AP 105-*f* may use one or more reserved AID values to assign RA-RUs falling in certain secondary channels to only make them available for the STAs 115 parked on those secondary channels. In some aspects, STAs 115 operating on the primary channel may not consider such RUs as being available for random access. In some cases, the reserved AID values may be the same as the new AIDs defined in accordance with aspects of process flow 900.

Figure 12:
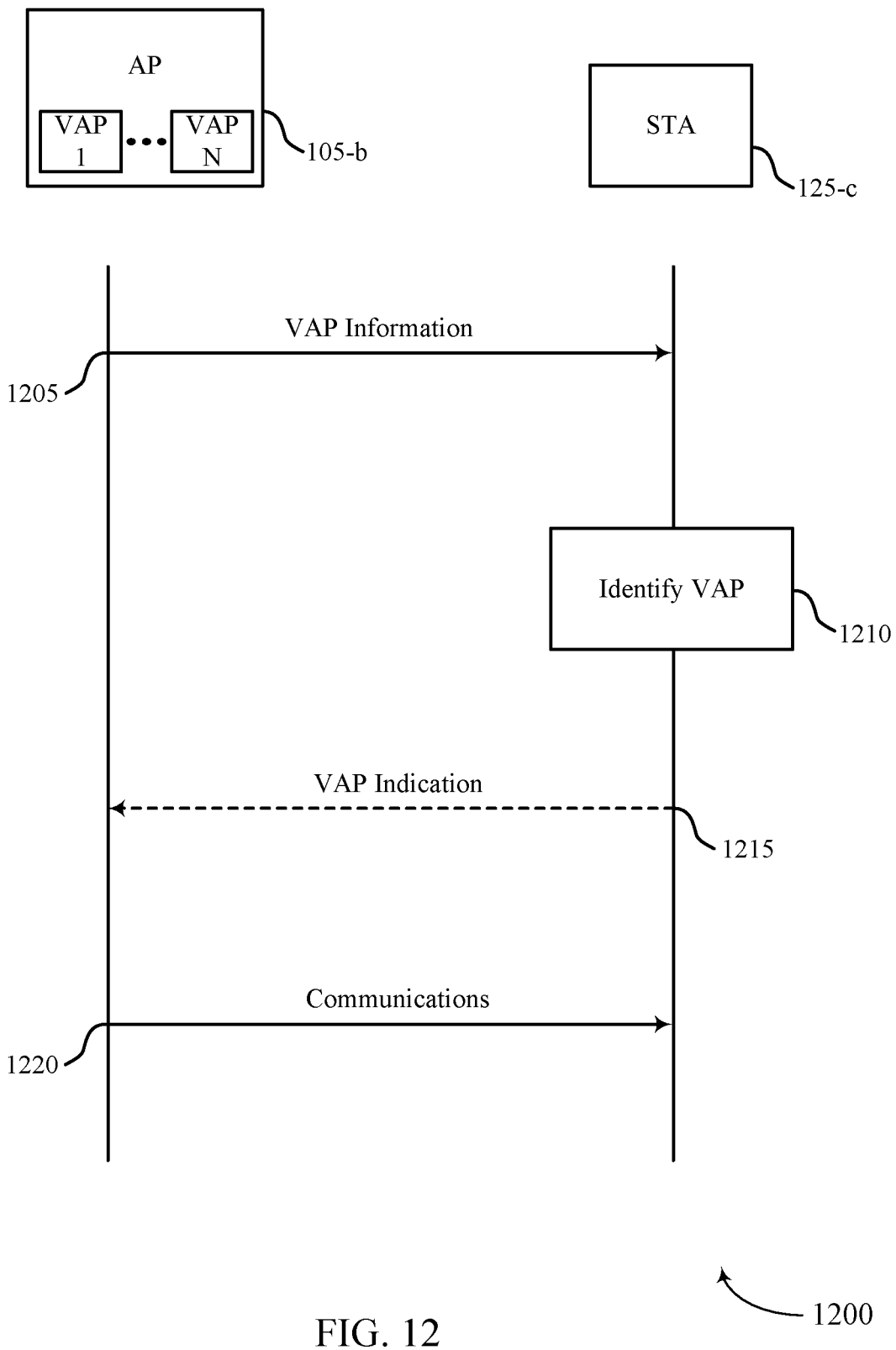

FIG. 12 illustrates an example of a process flow 1200 that supports multiple basic service sets supporting secondary channels in accordance with various aspects of the present disclosure. In some examples, process flow 1200 may implement aspects of WLAN 100. Process flow 1200 includes AP 105-*b* and STA 115-*c*, each of which may be an example of any of the corresponding devices described above (e.g., with reference to FIGS. 1 and 2). For example, STA 115-*c* may be an example of a 20 MHz-only STA 115 or a 20 MHz-operating STA 115. Though aspects of the following are described with reference to 20 MHz operation, it is to be understood that this bandwidth is included for the sake of illustration and is not limiting of scope. Channels having other bandwidths (e.g., 40 MHz, 80 MHz, etc.) are explicitly contemplated. AP 105-*b* may support multiple VAPs (e.g., illustrated as VAPs 1 through N). In some cases, each VAP may be associated with a respective channel.

At 1205, AP 105-*b* may transmit (e.g., and STA 115-*c* may receive) information identifying a plurality of VAPs supported by the access point, where a first VAP of the plurality of VAPs operates using the primary channel and at least one secondary channel of AP 105-*b*, and where at least one second VAP of the plurality of VAPs operates using a secondary channel of the at least one secondary channel. In some cases, AP 105-*b* may transmit and STA 115-*c* may receive a multiple BSSID element in a beacon, the multiple BSSID element including the information identifying the plurality of VAPs. For example, the multiple BSSID element may include an indication that a primary channel for the at least one second VAP is shifted in frequency with reference to the primary channel transmitted from the access point, or the first VAP, or a combination thereof. Additionally or alternatively, the multiple BSSID element may include an indication of a center frequency for the at least one second VAP with reference to a center frequency of the primary channel transmitted from the access point, or the first VAP, or a combination thereof. In some cases, receiving the information about the VAPs (e.g., by STA 115-*c*) includes receiving a plurality of AIDs, where the plurality of VAPs is associated with the plurality of AIDs to indicate broadcast traffic.

At 1210, STA 115-*c* may identify, based at least in part on the information received at 1205, a VAP of the at least one second VAP for the station to use to communicate with the access point.

At 1215, STA 115-*c* may optionally transmit (e.g., and AP 105-*b* may receive) an indication of the identified VAP. In some cases, the indication may be transmitted on the primary channel. Additionally or alternatively, the indication may be transmitted on the secondary channel.

At 1220, AP 105-*b* may transmit (e.g., and STA 115-*c* may receive) communications on the secondary channel corresponding to the identified VAP. In some cases, the communications may be based at least in part on the indication transmitted at 1215. In some cases, AP 105-*b* may transmit and STA 115-*c* may receive an indication of a resource unit directed to STA 115-*c* on the secondary channel. For example, the indication of the resource unit may be received by STA 115-*c* in a trigger frame from AP 105-*b*. In some such cases, STA 115-*c* may transmit an uplink frame to AP 105-*b* on the secondary channel based at least in part on receiving the trigger frame. In some cases, the indication of the resource unit directed to STA 115-*c* may be received in a MU downlink frame from AP 105-*b*. Additionally or alternatively, STA 115-*c* may receive, on the secondary channel, an indication of a resource unit of the identified VAP to be use for random access to AP 105-*b*. For example, the indication may include a broadcast AID for the identified VAP.

In some cases, STA 115-*c* and/or AP 105-*b* may identify a broadcast resource unit of the secondary channel corresponding to the identified VAP and may listen on the broadcast resource unit for management frames, group-addressed frames, announcements, or a combination thereof transmitted by AP 105-*b*.

In some cases, STA 115-*c* and AP 105-*b* may negotiate a target wake time (TWT) service period (SP) schedule for the secondary channel corresponding to the identified VAP, and the station listens for transmissions from the access point based at least in part on the TWT SP schedule. In some examples of the TWT negotiation, STA 115-*c* and/or AP 105-*b* may set the subchannel selective transmission (SST) support field to '1' in the high efficiency (HE) capabilities element it transmits. In some cases, the TWT negotiation may be performed on a per-STA 115 basis (e.g., a unicast TWT for each STA 115) or may be performed for a group of STAs 115 (e.g., a broadcast TWT). STA 115-*c* may identify a TWT schedule (e.g., indicating a plurality of TWT SPs) based at least in part on the TWT negotiation. In some cases, the TWT schedule may apply to the primary channel, the secondary channel, or a combination thereof.

Thus, the described techniques provide for extension of multiple BSSID features. For example, some wireless systems (e.g., IEEE 802.11ax) may extent the multiple BSSID feature to control frames such that STAs 115 belonging to different VAPs may be addressed in the same control frame (e.g., a trigger frame sent by a transmitted BSSID (TxBSSID) addressing STAs 115 belonging to different VAPs of the multiple BSSID set). In some cases, support for receiving multi-BSS control frames (e.g., by a STA 115) may be optional.

In such an extended scheme, the BSS corresponding to the TxBSSID may operate on the primary channel of AP 105-*b* (e.g., which may be a 20 MHz primary channel) and may occupy the entire channel bandwidth of AP 105-*b*. All STAs 115 associated with AP 105-*b* (except the 20 MHz STAs 115 parked on the one or more secondary channels of AP 105-*b*) may be associated with and tuned into the VAP corresponding to the TxBSSID. The 20 MHz STAs 115 may be parked on a secondary channel and may be tuned into (or associated with) their respective non-transmitted BSSID VAPs. That is, each non-transmitted BSSID may correspond to a 20 MHz (e.g., or other bandwidth) secondary channel. Each VAP in this scheme may have a distinct AID associated with it (e.g., to indicate broadcast traffic). The AID assigned to each VAP may be extended to regular random access resource units for STAs 115 belonging to that VAP. AP 105-*b* may in some cases ensure that any directed communication with a STA 115 (e.g., STA 115-*c*) falls within the appropriate secondary channel.

Operational details of such a scheme may include considerations for management frames, groupcast transmissions, critical information, etc. AP 105-*b* may transmit beacons (or other group-addressed traffic) on its primary channel. AP 105-*b* may use a broadcast resource unit (RU) corresponding to each 20 MHz VAP to transmit any management frames, group-addressed frames, or critical announcements to all STAs 115 parked on the secondary channel associated with the VAP. In some cases, the operational details may include considerations for trigger-based random access. For example, a broadcast AID of each VAP may be used to indicate random access RUs for STAs 115 belonging to that VAP. AP 105-*b* may assign random access RUs to fall in appropriate secondary channels (e.g., to make them only available for STAs 115 parked on those secondary channels). STAs 115 operating on the primary channel may not consider such RUs for random access.

For directed traffic, AP 105-*b* may ensure that any RU assigned to a STA 115 in a trigger frame (for uplink) or in a MU downlink PPDU falls in the secondary channel on which the STA 115 is parked. 20 MHz operation may be associated with low power modes (or may be the preferred power mode for IoT-like devices). Some 20 MHz STAs 115 may setup TWT SPs with AP 105-*b*, which may in turn ensure that any directed communication with a given STA 115 occurs during the negotiated TWT SPs. The TWT SPs may in some cases be trigger-enabled (where AP 105-*b* triggers a STA to solicit a response). Alternatively, the TWT SPs couple be announced (or unannounced) TWTs in which the STA 115 sends a frame to AP 105-*b* at the beginning of the TWT SP to signal its availability (e.g., or AP 105-*b* assumes the STA 115 is awake or available during the negotiated TWT SPs).

Such operations may, in accordance with aspects of the present disclosure, be supported through extending the definition of multiple BSSID. For example, the multiple BSSID may include a field to indicate the presence of extended multi-BSS and that VAP has a primary channel shifted with respect to the primary channel of the TxBSSID. Such indications may include offset values (for example in units of frequency) for the primary channel of the VAP relative to the primary channel of the TxBSSID. Additionally or alternatively, the multiple BSSID may include an indicator of the position of the center frequency for each VAP with respect to the primary channel of the TxBSSID, for example the indicator being a frequency of the center frequency value.

Such operations may additionally or alternatively be supported through the introduction of a BSSID-like feature (e.g., which may inherit capabilities of the multiple BSSID concept). For example, a single beacon for advertisement of all VAPs with a bit or a field indicating that the primary channel for each VAP resides on a secondary 20 MHz channel with respect to the primary channel of the TxBSSID. For example, the first subset of bits of a TIM bitmap may be reserved for the indication of group-addressed frames for the transmitted and all non-transmitted BSSIDs. For example, a STA 115 that is associated with a virtual BSS may be expected to know which bit represents broadcast information for its (virtual) BSS. AP 105-*b* may advertise such extended multiple BSSID capability via a field or a bit or an element carried in its management frames (e.g., a bit in a high efficiency capabilities element). Similarly, STAs 115 may indicate support for this feature via a field or a bit carried in management frames that transmitted by the STAs.

Figure 13:
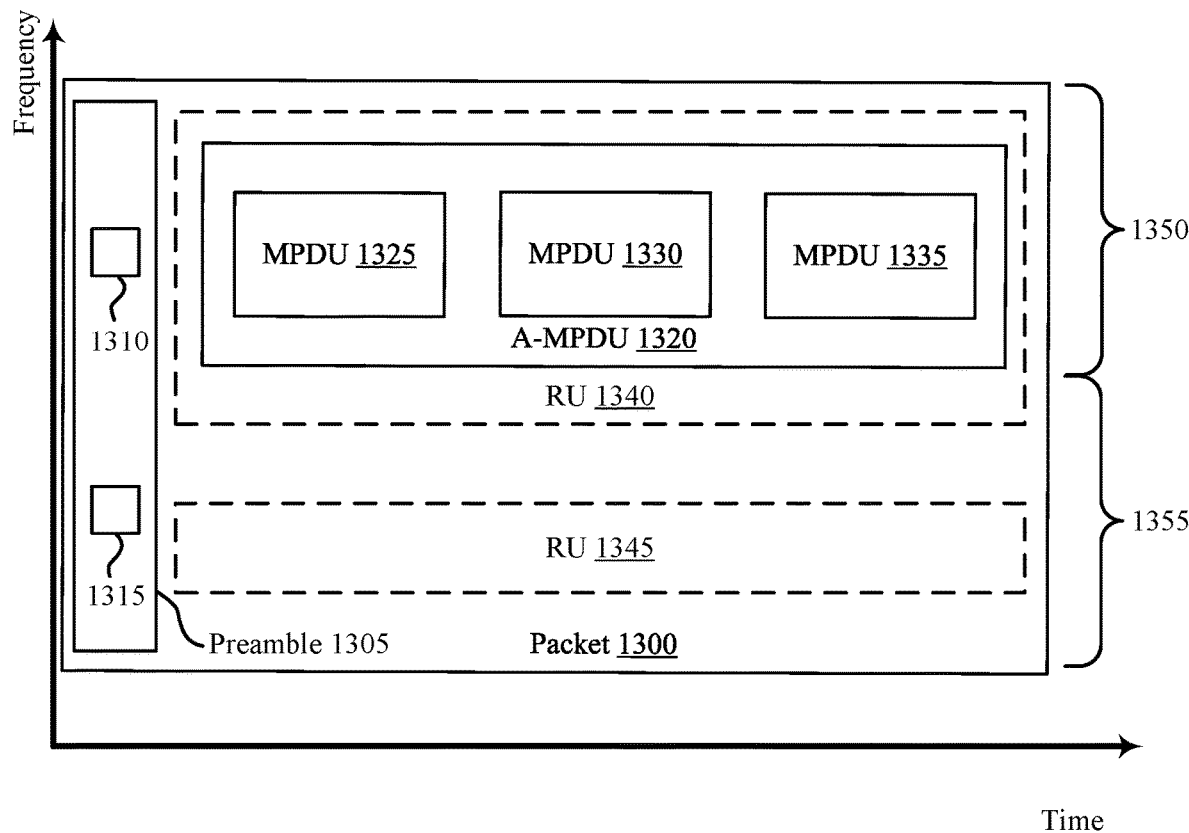
FIG. 13 illustrates an example of a packet that supports mechanisms to support secondary channel operation in accordance with aspects of the present disclosure.

FIG. 13 illustrates an example packet 1300 that supports mechanisms to support secondary channel operation in accordance with aspects of the present disclosure. Packet 1300 may be an example of a MU downlink PPDU. Packet 1300 may include a preamble 1305 (e.g., a PHY header) which contains first RU allocation information 1310 and second RU allocation information 1315. The RU allocation information 1310 may indicate a first AID for one or more RUs, and the RU allocation information 1315 may indicate a second AID for another one or more RUs. That is, the RU allocation information 1310 and 1315 may carry the mapping for RUs in packet 1300 as well as a corresponding AID. RU allocation information for more than two RUs may be included in preamble 1305. Based on the RU allocation information 1310 and 1315, a STA 115 may determine which RUs to monitor for data in the MU DL PPDU. For example, a STA 115 whose AID was included in the RU allocation information 1310 or 1315 and that is associated with a primary channel 1350 of an AP 105 may know to monitor RU 1340 (e.g., which may be contained at least partially within primary channel 1350 as illustrated). As an example, RU 1340 may carry multiple MPDUs 1325, 1330, and 1335 of an A-MPDU 1320.

In accordance with aspects of the present disclosure, an AP 105 may ensure that any RUs allocated to STAs 115 parked on a secondary channel 1355 fall (e.g., completely) within a bandwidth of the secondary channel 1355. An example of such an RU is illustrated with respect to RU 1345. Accordingly, any RU allocation information for a STA 115 (e.g., as illustrated by RU allocation information 1315) camped on secondary channel 1355 may identify RUs falling within secondary channel 1355, exclusive of primary channel 1350.

Figure 14:
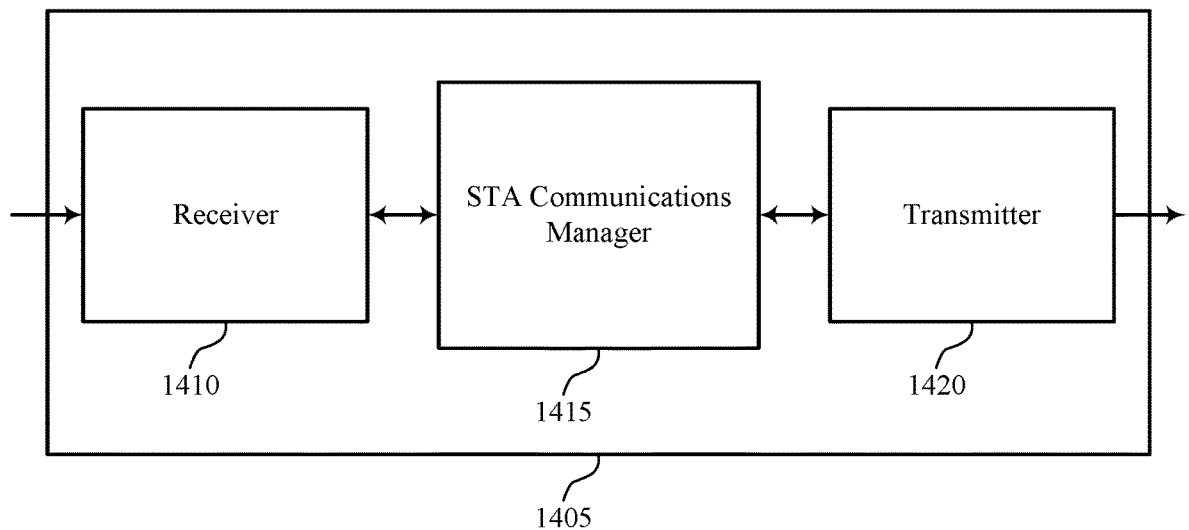
FIGS. 14 through 20 show block diagrams of a device that supports a station parked on a secondary channel in accordance with aspects of the present disclosure.

FIG. 14 shows a block diagram 1400 of a wireless device 1405 that supports mechanisms to support mechanisms to support secondary channel operation in accordance with aspects of the present disclosure. Wireless device 1405 may be an example of aspects of a STA 115 as described herein. Wireless device 1405 may include receiver 1410, STA communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to mechanisms to support mechanisms to support secondary channel operation, etc.). Information may be passed on to other components of the device. The receiver 1410 may be an example of aspects of the transceiver 2135 described with reference to FIG. 21. The receiver 1410 may utilize a single antenna or a set of antennas.

STA communications manager 1415 may be an example of aspects of the STA communications manager 2115 described with reference to FIG. 21. STA communications manager 1415 and/or at least some of its various sub-components may be implemented in hardware, software executed by a processor, firmware, or any combination thereof. If implemented in software executed by a processor, the functions of the STA communications manager 1415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The STA communications manager 1415 and/or at least some of its various sub-components may be physically located at various positions, including being distributed such that portions of functions are implemented at different physical locations by one or more physical devices. In some examples, STA communications manager 1415 and/or at least some of its various sub-components may be a separate and distinct component in accordance with various aspects of the present disclosure. In other examples, STA communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, STA communications manager 1415 may listen for transmissions from an access point on a primary channel and one or more secondary channels of a total bandwidth of the access point, receive, from the access point on the primary channel, a DTIM addressed to a group of stations that includes the station, and exchange, based on the received DTIM one or more frames with the access point on a first secondary channel of the one or more secondary channels.

Additionally or alternatively, STA communications manager 1415 may listen, on a primary channel of an access point, for transmissions from the access point during a plurality of TWT SPs defined by a TWT schedule, the access point operating using the primary channel and one or more secondary channels of a total bandwidth of the access point, receive, from the access point on the primary channel, a communication addressed to one or more stations that includes the station, and exchange, based at least in part on the received communication, one or more frames with the access point on one or more secondary channels, including at least a first secondary channel.

Additionally or alternatively, STA communications manager 1415 may transmit, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels, receive a response to the transmitted request, the received response including an indication of whether at least one resource unit for the station will be transmitted in the indicated first set of two or more channels or in the second set of two or more channels, and determine, based on the indication in the received response, a primary channel for the station in the indicated first set of two or more channels or in the second set of two or more channels.

Additionally or alternatively, STA communications manager 1415 STA communications manager 1415 may receive, on a primary channel transmitted from an access point, information identifying a set of VAPs supported by the access point, where a first VAP of the set of VAPs operates using the primary channel and at least one secondary channel of the access point, and where at least one second VAP of the set of VAPs operates using a secondary channel of the at least one secondary channel. STA communications manager 1415 may identify, based on the received information, a VAP of the at least one second VAP for the station to use to communicate with the access point. STA communications manager 1415 may receive communications from the access point on the secondary channel corresponding to the identified VAP.

Transmitter 1420 may transmit signals generated by other components of the device. In some examples, the transmitter 1420 may be collocated with a receiver 1410 in a transceiver module. For example, the transmitter 1420 may be an example of aspects of the transceiver 2135 described with reference to FIG. 21. The transmitter 1420 may utilize a single antenna or a set of antennas.

Figure 15:
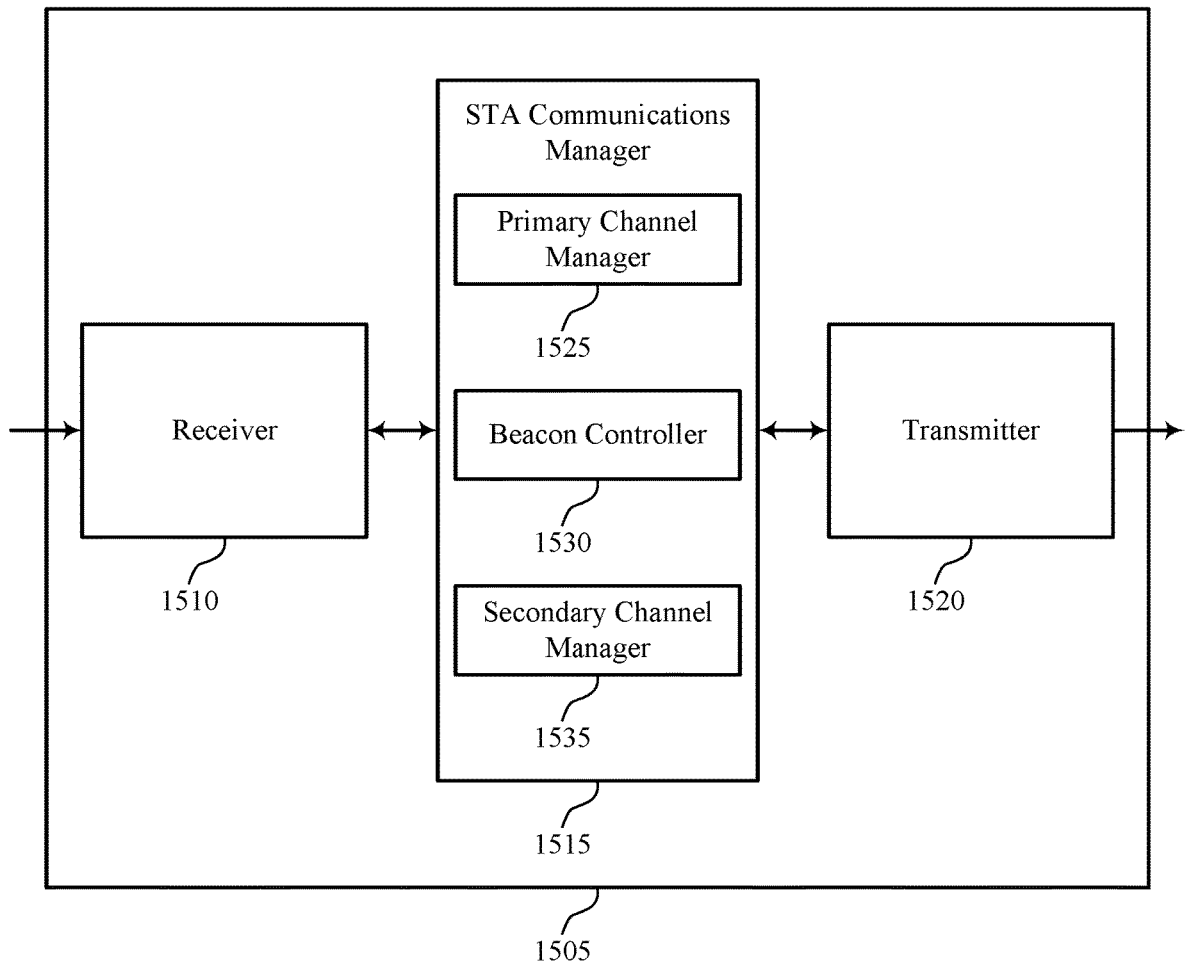

FIG. 15 shows a block diagram 1500 of a wireless device 1505 that supports mechanisms to support mechanisms to support secondary channel operation in accordance with aspects of the present disclosure. Wireless device 1505 may be an example of aspects of a wireless device 1105 or a STA 115 as described with reference to FIG. 11. Wireless device 1505 may include receiver 1510, STA communications manager 1515, and transmitter 1520. Wireless device 1505 may also include a processor. Each of these components may be in communication with one another (e.g., via one or more buses). STA communications manager 1515 may be an example of aspects of the STA communications manager 2115 described with reference to FIG. 21. STA communications manager 1515 may also include primary channel manager 1525, beacon controller 1530, and secondary channel manager 1535.

Receiver 1510 may receive information such as packets, user data, or control information associated with various information channels (e.g., control channels, data channels, and information related to mechanisms to support mechanisms to support secondary channel operation, etc.). Information may be passed on to other components of the device. The receiver 1510 may be an example of aspects of the transceiver 2135 described with reference to FIG. 21. The receiver 1510 may utilize a single antenna or a set of antennas.

Primary channel manager 1525 may listen for transmissions from an access point on a primary channel of the access point, the access point operating using the primary channel and one or more secondary channels of a total bandwidth of the access point. Primary channel manager 1525 may transmit, on the primary channel during one or more of the set of TWT SPs, an indication that the station is available to receive one or more frames on the first secondary channel.

In some cases, primary channel manager 1525 may listen, on a primary channel of an access point, for transmissions from the access point during a plurality of TWT SPs defined by a TWT schedule, the access point operating using the primary channel and one or more secondary channels of a total bandwidth of the access point. In some cases, the transmissions may comprise one of unicast transmissions or broadcast transmissions. Primary channel manager 1525 may transmit, on the primary channel during one or more of the plurality of TWT SPs, an indication that the station is available to receive one or more frames on one or more secondary channels, including at least the first secondary channel. In some cases, primary channel manager 1525 may receive, on the primary channel, a trigger frame from the access point during a TWT SP of the plurality of TWT SPs.

In some cases, primary channel manager 1525 may transmit a RTS to the access point to block a first set of one or more secondary channels of the total bandwidth of the access point, including the first secondary channel, and receive a CTS message from the access point, the CTS message blocking the total bandwidth.

Beacon controller 1530 may receive, from the access point on the primary channel, a DTIM addressed to a group of stations that includes the station. In some cases, receiving the DTIM includes receiving a set of beacons from the access point on the primary channel, at least one of the set of beacons including the DTIM. In some cases, the set of beacons include a subset of all beacons transmitted by an access point on the primary channel. In some cases, the DTIM addressed to the group of stations is received during one or more of the set of TWT SPs. In some other cases, the DTIM is addressed to a group of stations that includes the station.

Beacon controller 1530 may receive, from the access point on the primary channel, a communication addressed to one or more stations that includes the station. In some cases, receiving the communication comprises receiving a plurality of beacons. In some cases, at least one beacon of the set of beacons includes a DTIM. Further, the DTIM addressed to a group of stations that includes the station is received during one or more of the plurality of TWT SPs. In some cases, the plurality of beacons comprise a subset of all beacons transmitted by an access point on the primary channel. In some cases, receiving the communication comprises receiving a unicast communication addressed to the station, and/or a broadcast communication addressed to a group of stations.

Secondary channel manager 1535 may exchange, based at least in part on the received communication, one or more frames with the access point on one or more secondary channels, including at least a first secondary channel. In some other cases, secondary channel manager 1535 may exchange, based on the received DTIM, one or more frames with the access point on a first secondary channel of the one or more secondary channels. Secondary channel manager 1535 may identify, based on the received trigger frame, a resource unit of the first secondary channel of the one or more secondary channels for the station to use to transmit uplink frames to the access point in response to the received trigger frame. In some cases, the station exchanges data frames with the access point on the first secondary channel exclusive of transmissions on the primary channel. In some cases, a bandwidth of the primary channel is 20 MHz, a bandwidth of the first secondary channel is 20 MHz, and the total bandwidth of the access point is an integer multiple of 20 MHz.

In some cases, the wireless device 1505 may be configured to communicate with the access point using a latency below a threshold. In some other cases, the station may be configured for communications with the access point according to an EDCA protocol. In some cases, the station (or wireless device 1505) may exchange data frames with the access point on the primary channel (e.g., based on the station using EDCA protocols).

Transmitter 1520 may transmit signals generated by other components of the device. In some examples, the transmitter 1520 may be collocated with a receiver 1510 in a transceiver module. For example, the transmitter 1520 may be an example of aspects of the transceiver 2135 described with reference to FIG. 21. The transmitter 1520 may utilize a single antenna or a set of antennas.

Figure 16:
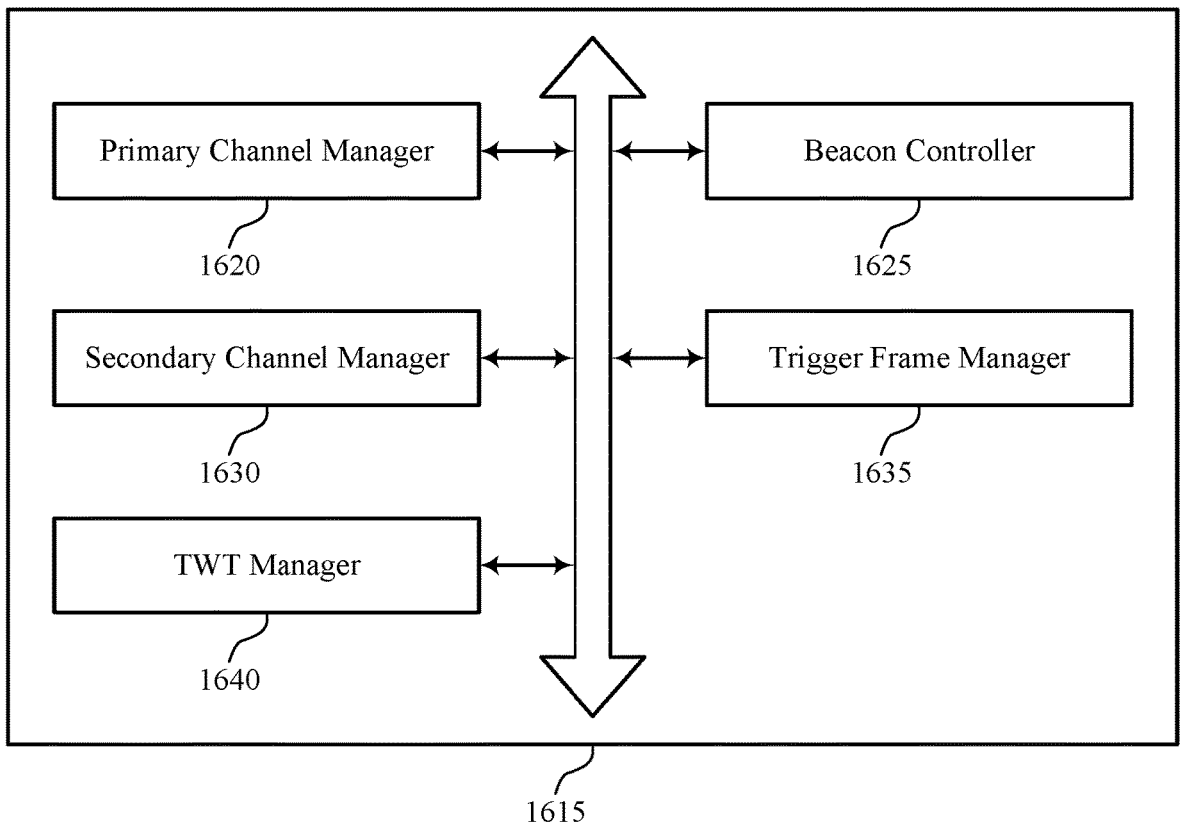

FIG. 16 shows a block diagram 1600 of a STA communications manager 1615 that supports mechanisms to support mechanisms to support secondary channel operation in accordance with aspects of the present disclosure. The STA communications manager 1615 may be an example of aspects of a STA communications manager 1415, a STA communications manager 1515, or a STA communications manager 2115 described with reference to FIGS. 14, 15, and 21. The STA communications manager 1615 may include primary channel manager 1620, beacon controller 1625, secondary channel manager 1630, trigger frame manager 1635, and TWT manager 1640. Each of these modules may communicate, directly or indirectly, with one another (e.g., via one or more buses).

Primary channel manager 1620 may listen, on a primary channel of an access point, for transmissions from the access point during a plurality of TWT SPs defined by a TWT schedule, the access point operating using the primary channel and one or more secondary channels of a total bandwidth of the access point. In some cases, the transmissions may comprise one of unicast transmissions or broadcast transmissions. Primary channel manager 1620 may transmit, on the primary channel during one or more of the plurality of TWT SPs, an indication that the station is available to receive one or more frames on one or more secondary channels, including at least the first secondary channel. In some cases, primary channel manager 1620 may receive, on the primary channel, a trigger frame from the access point during a TWT SP of the plurality of TWT SPs.

In some cases, primary channel manager 1620 may transmit a RTS to the access point to block a first set of one or more secondary channels of the total bandwidth of the access point, including the first secondary channel, and receive a CTS message from the access point, the CTS message blocking the total bandwidth.

Beacon controller 1625 may receive, from the access point on the primary channel, a DTIM addressed to a group of stations that includes the station. In some cases, receiving the DTIM includes receiving a set of beacons from the access point on the primary channel, at least one of the set of beacons including the DTIM.

In some cases, beacon controller 1625 may receive, from the access point on the primary channel, a communication addressed to one or more stations that includes the station. In some cases, receiving the communication comprises receiving a plurality of beacons. In some cases, at least one beacon of the plurality of beacons includes a DTIM. Further, the DTIM addressed to a group of stations that includes the station is received during one or more of the plurality of TWT SPs. In some cases, the plurality of beacons comprise a subset of all beacons transmitted by an access point on the primary channel. In some cases, receiving the communication comprises receiving a unicast communication addressed to the station, and/or a broadcast communication addressed to a group of stations.

Secondary channel manager 1630 may exchange, based on the received DTIM, one or more frames with the access point on a first secondary channel of the one or more secondary channels. In some cases, secondary channel manager 1630 may exchange, based at least in part on a beacon from the set (or plurality) of beacons, one or more frames with the access point on one or more secondary channels, including at least a first secondary channel. Secondary channel manager 1630 may identify, based on the received trigger frame, a resource unit of the first secondary channel of the one or more secondary channels for the station to use to transmit uplink frames to the access point in response to the received trigger frame. In some cases, the station exchanges data frames with the access point on the first secondary channel exclusive of transmissions on the primary channel. In some cases, a bandwidth of the primary channel is 20 MHz, a bandwidth of the first secondary channel is 20 MHz, and the total bandwidth of the access point is an integer multiple of 20 MHz.

In some cases, the station may be configured to communicate with the access point using a latency below a threshold. In some other cases, the station may be configured to communicate with the access point according to an EDCA protocol. In some cases, the station (or wireless device) may exchange data frames with the access point on the primary channel (e.g., based on the station using EDCA protocols).

Trigger frame manager 1635 may receive, on the primary channel, a trigger frame from the access point during a TWT SP of the set of TWT SPs.

TWT manager 1640 may transmit a TWT request to the access point, receive a TWT response from the access point, and identify the TWT schedule based on the transmitted TWT request and the received TWT response. In some cases, the TWT schedule is identified for the first secondary channel. In some cases, the TWT request is transmitted to the access point on the primary channel. In some cases, the TWT response is received from the access point on the primary channel.

Figure 17:
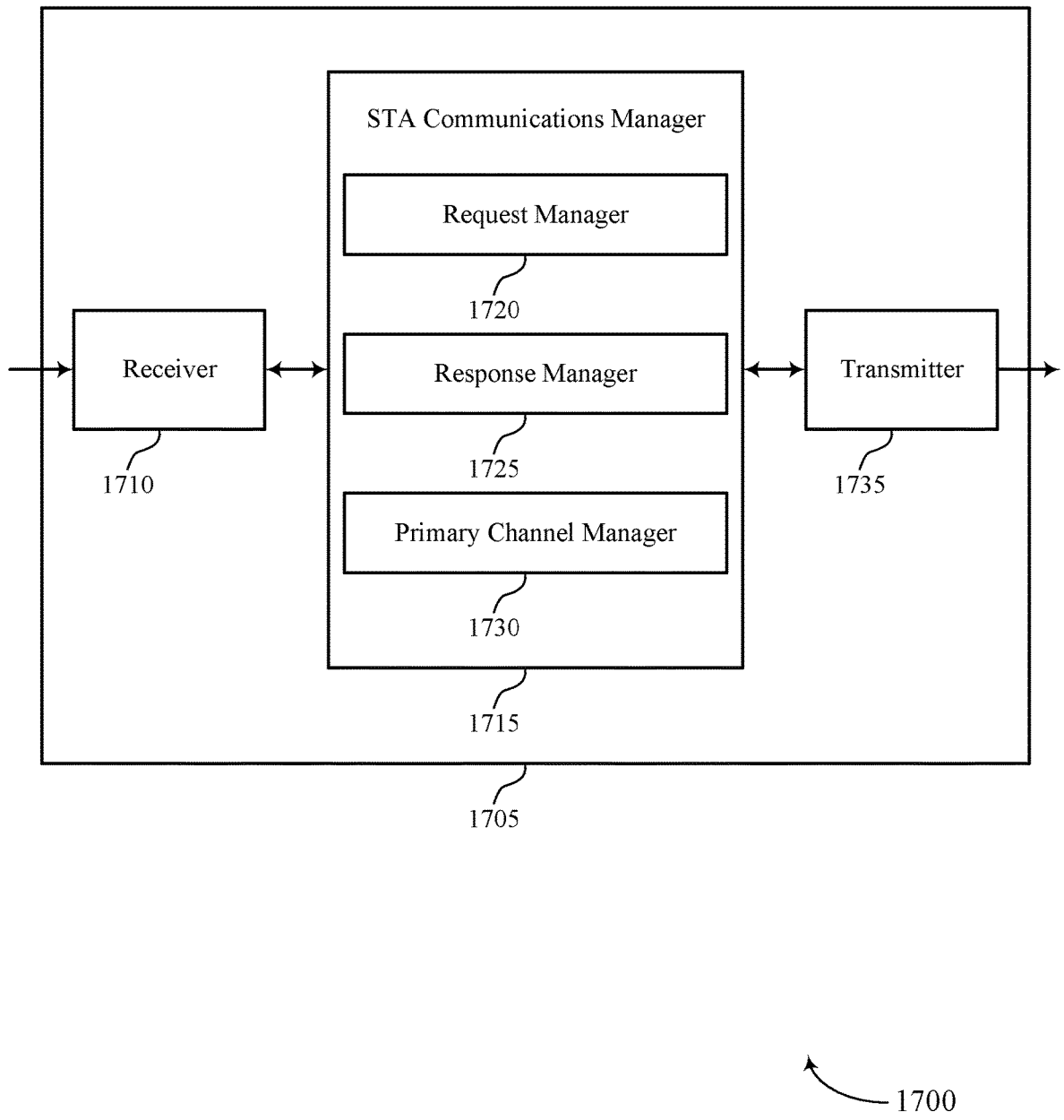

FIG. 17 shows a block diagram 1700 of a wireless device 1705 that supports mechanisms to support a 20 MHz station parked on a secondary channel in accordance with aspects of the present disclosure. The wireless device 1705 may be an example of aspects of a wireless device 1405 or a STA 115 as described herein. The wireless device 1705 may include a receiver 1710, an STA communications manager 1715, and a transmitter 1735. The wireless device 1705 may also include a processor. Each of these components may be in communication with one another (e.g., via one or more buses).

Receiver 1710 may receive information such as packets, user data, or control information associated with various information channels (e.g., control channels, data channels, and information related to mechanisms to support a 20 MHz station parked on a secondary channel, etc.). Information may be passed on to other components of the device. The receiver 1710 may be an example of aspects of the transceiver 2135 described with reference to FIG. 21. The receiver 1710 may utilize a single antenna or a set of antennas.

The STA communications manager 1715 may be an example of aspects of the STA communications manager 1415 as described herein. The STA communications manager 1715 may include a request manager 1720, a response manager 1725, and a primary channel manager 1730.

The request manager 1720 may transmit, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels.

The response manager 1725 may receive a response to the transmitted request, the received response including an indication of whether at least one resource unit for the station will be transmitted in the indicated first set of two or more channels or in the second set of two or more channels.

The primary channel manager 1730 may determine, based on the indication in the received response, a primary channel for the station in the indicated first set of two or more channels or in the second set of two or more channels.

Transmitter 1735 may transmit signals generated by other components of the device. In some examples, the transmitter 1735 may be collocated with a receiver 1710 in a transceiver module. For example, the transmitter 1735 may be an example of aspects of the transceiver 2135 described with reference to FIG. 21. The transmitter 1735 may utilize a single antenna or a set of antennas.

Figure 18:
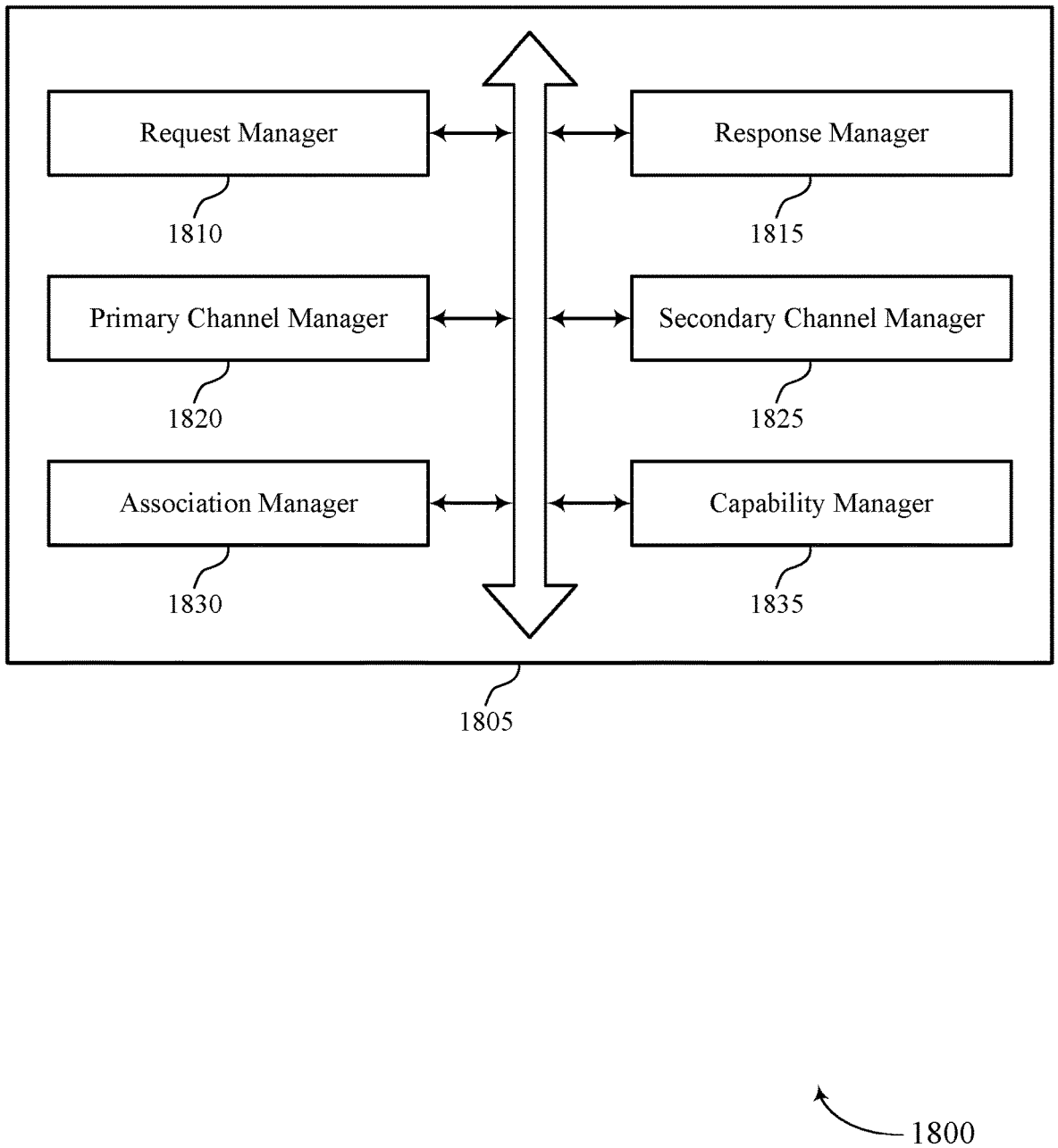

FIG. 18 shows a block diagram 1800 of a STA communications manager 1805 that supports mechanisms to support a 20 MHz station parked on a secondary channel in accordance with aspects of the present disclosure. The STA communications manager 1805 may be an example of aspects of a STA communications manager 1415, a STA communications manager 1515, a STA communications manager 1615, a STA communications manager 1715, or a STA communications manager 2115 described herein. The STA communications manager 1805 may include a request manager 1810, a response manager 1815, a primary channel manager 1820, a secondary channel manager 1825, an association manager 1830, and a capability manager 1835. Each of these modules may communicate, directly or indirectly, with one another (e.g., via one or more buses).

The request manager 1810 may transmit, to an access point, a request that indicates a first set of two or more channels of a total bandwidth of the access point, the access point operating using a set of channels of the total bandwidth to communicate with a set of stations including the station, the set of channels including the first set of two or more channels and a second set of two or more channels. In some cases, the transmitted request includes a first set of two or more bits corresponding to the first set of two or more channels, each bit of the first set of two or more bits corresponding to one channel of the first set of two or more channels. In some cases, the transmitted request includes a first TWT channel field that identifies the first set of two or more channels of the total bandwidth. In some cases, the transmitted request includes a probe request, or a probe response, or an association request response, or a reassociation request response, or a TWT request, or a TWT response, or an action frame, or a combination thereof.

The response manager 1815 may receive a response to the transmitted request, the received response including an indication of whether at least one resource unit for the station will be transmitted in the indicated first set of two or more channels or in the second set of two or more channels.

In some examples, the response manager 1815 may identify, in the received response, a set of two or more bits corresponding to the indicated first set of two or more channels or the second set of two or more bits.

In some examples, the response manager 1815 may identify one bit of the set of two or more bits as having a different value than a remaining one or more bits of the set of two or more bits.

In some examples, the response manager 1815 may determine the primary channel as corresponding to the identified one bit.

In some cases, the response to the transmitted request includes at least one bit of the set of two or more bits having a same value as a corresponding bit of the first set of two or more bits. In some cases, the response to the transmitted request includes a second TWT channel field that identifies the indicated first set of two or more channels or the second set of two or more channel to indicate whether at least one resource unit for the station will be transmitted in the indicated first set of two or more channels or in the second set of two or more channels. In some cases, the received response to the transmitted request includes a TWT response. In some cases, the received response includes a probe request, or a probe response, or an association request response, or a reassociation request response, or a TWT request, or a TWT response, or an action frame, or a combination thereof.

The primary channel manager 1820 may determine, based on the indication in the received response, a primary channel for the station in the indicated first set of two or more channels or in the second set of two or more channels.

In some examples, the primary channel manager 1820 may receive, from the access point, an operating mode indication identifying a second primary channel for the station; and.

In some examples, the primary channel manager 1820 may switch, based on the received operating mode indication, to monitoring the second primary channel from monitoring the determined primary channel.

The secondary channel manager 1825 may determine secondary channels of the first set of two or more channels corresponding to the at least one bit of the set of two or more bits having the same value as the corresponding bit of the first set of two or more bits.

The association manager 1830 may perform an association procedure with the access point, where the request is transmitted to the access point after the association procedure is performed.

In some examples, the association manager 1830 may perform an association procedure with the access point after determining the primary channel for the station.

In some examples, the association manager 1830 may transmit, to the access using the determined primary channel, a request to associate with the access point.

The capability manager 1835 may transmit, in a capability element, an indication that the station supports subchannel selective transmission, the request transmitted based on the capability element.

Figure 19:
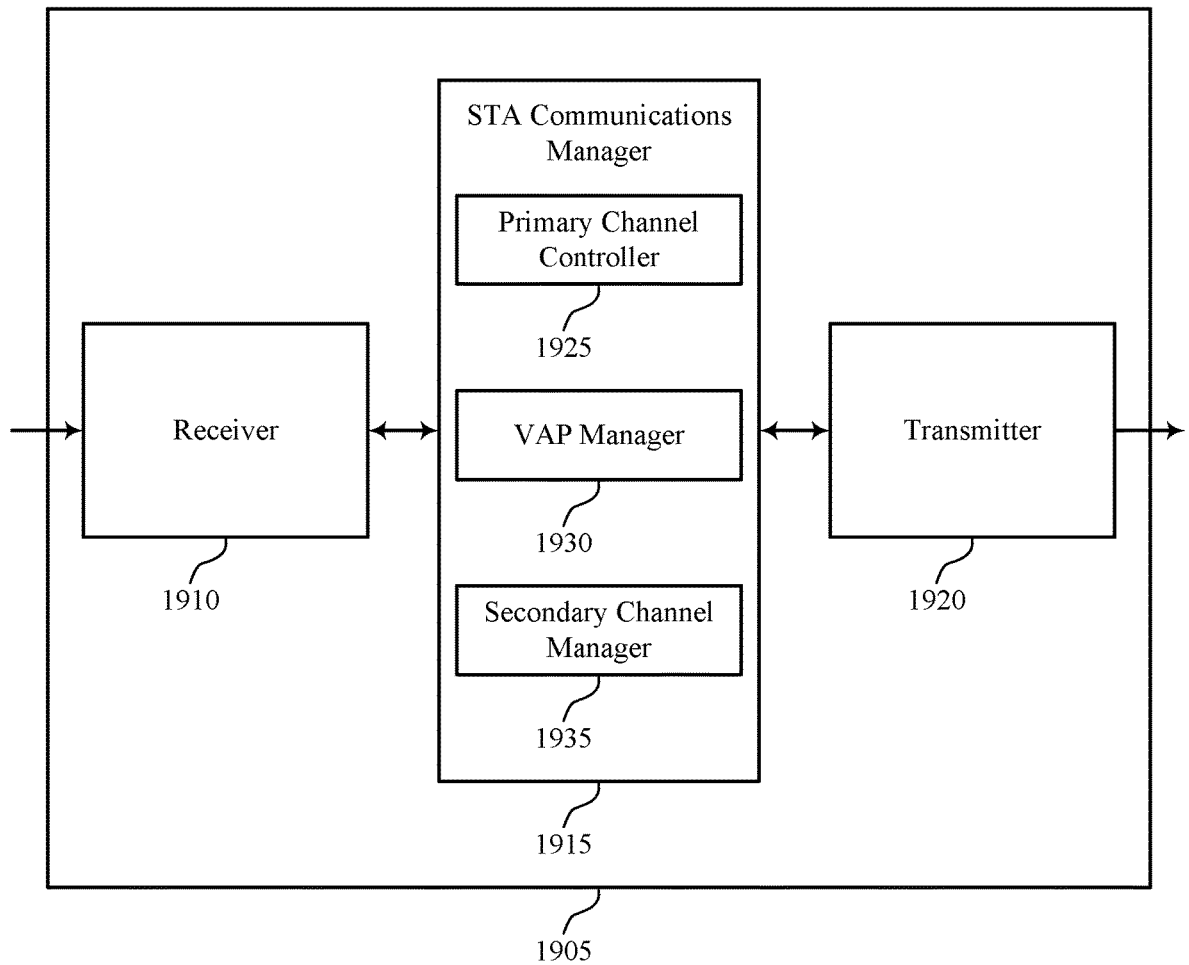

FIG. 19 shows a block diagram 1900 of a wireless device 1905 that supports multiple basic service sets supporting secondary channels in accordance with aspects of the present disclosure. Wireless device 1905 may be an example of aspects of a wireless device 1505 or a STA 115 as described with reference to FIG. 14. Wireless device 1905 may include receiver 1910, STA communications manager 1915, and transmitter 1920. Wireless device 1905 may also include a processor. Each of these components may be in communication with one another (e.g., via one or more buses). STA communications manager 1915 may be an example of aspects of the STA communications managers described with reference to FIGS. 14-21. STA communications manager 1915 may also include primary channel controller 1925, VAP manager 1930, and secondary channel manager 1935.

Receiver 1910 may receive information such as packets, user data, or control information associated with various information channels (e.g., control channels, data channels, and information related to multiple basic service sets supporting secondary channels, etc.). Information may be passed on to other components of the device. The receiver 1910 may be an example of aspects of the transceiver 2135 described with reference to FIG. 21. The receiver 1910 may utilize a single antenna or a set of antennas.

Primary channel controller 1925 may receive, on a primary channel transmitted from an access point, information identifying a set of VAPs supported by the access point, where a first VAP of the set of VAPs operates using the primary channel and at least one secondary channel of the access point, and where at least one second VAP of the set of VAPs operates using a secondary channel of the at least one secondary channel. In some cases, receiving the information identifying the set of VAPs supported by the access point includes receiving a multiple BSSID element in a beacon, the multiple BSSID element including the information identifying the set of VAPs supported by the access point. In some cases, the multiple BSSID element includes an indication that a primary channel for the at least one second VAP is shifted in frequency with reference to the primary channel transmitted from the access point, or the first VAP, or a combination thereof. In some cases, the multiple BSSID element includes an indication of a center frequency for the at least one second VAP with reference to a center frequency of the primary channel transmitted from the access point, or the first VAP, or a combination thereof. In some cases, receiving the information identifying the set of VAPs includes receiving a set of AIDs, the set of VAPs associated with the set of AIDs to indicate broadcast traffic.

VAP manager 1930 may identify, based on the received information, a VAP of the at least one second VAP for the station to use to communicate with the access point. VAP manager 1930 may transmit an indication of the identified VAP to the access point, the communications received from the access point based on the transmitted indication of the identified VAP.

Secondary channel manager 1935 may receive communications from the access point on the secondary channel corresponding to the identified VAP. Secondary channel manager 1935 may receive, on the secondary channel, an indication of a resource unit directed to the station, transmit an uplink frame to the access point on the secondary channel based on receiving the trigger frame. Secondary channel manager 1935 may negotiate, with the access point, a TWT SP schedule for the secondary channel corresponding to the identified VAP, where the station listens for transmissions from the access point based on the TWT SP schedule. In some cases, the indication of the resource unit directed to the station is received in a multi-user downlink frame from the access point. In some cases, the at least one secondary channel includes a set of secondary channels that are associated with the set of VAPs.

Transmitter 1920 may transmit signals generated by other components of the device. In some examples, the transmitter 1920 may be collocated with a receiver 1910 in a transceiver module. For example, the transmitter 1920 may be an example of aspects of the transceiver 2135 described with reference to FIG. 21. The transmitter 1920 may utilize a single antenna or a set of antennas.

Figure 20:
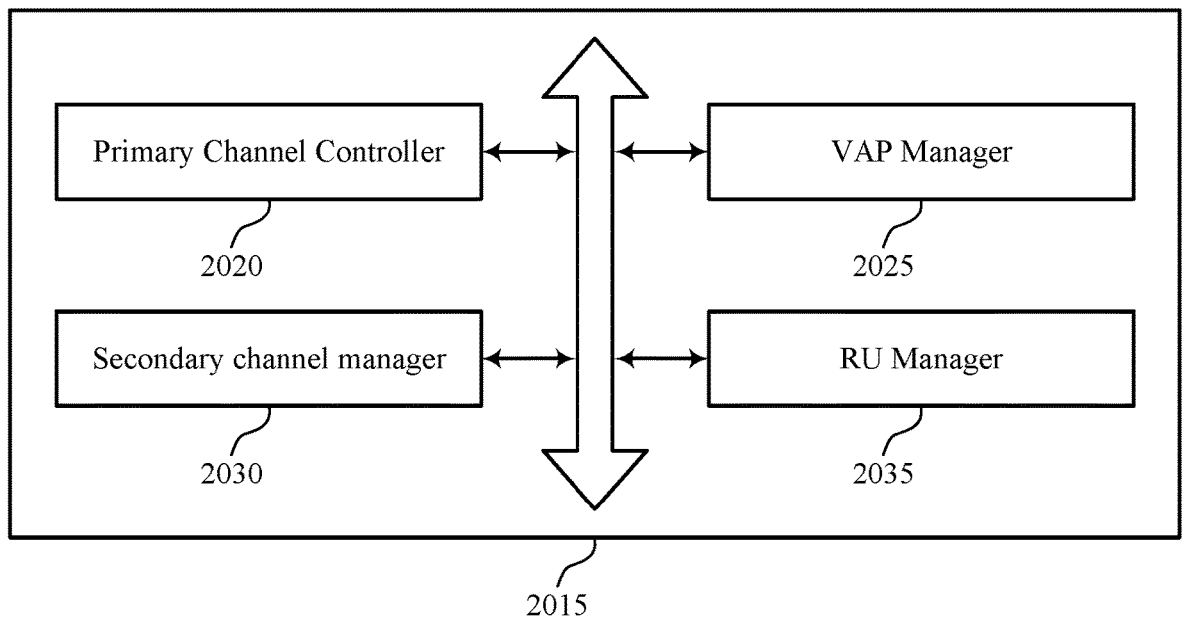

FIG. 20 shows a block diagram 2000 of a STA communications manager 2015 that supports multiple basic service sets supporting secondary channels in accordance with aspects of the present disclosure. The STA communications manager 2015 may be an example of aspects of a STA communications described with reference to FIGS. 14-21. The STA communications manager 2015 may include primary channel controller 2020, VAP manager 2025, second-ary channel manager 2030, and RU manager 2035. Each of these modules may communicate, directly or indirectly, with one another (e.g., via one or more buses).

Primary channel controller 2020 may receive, on a primary channel transmitted from an access point, information identifying a set of VAPs supported by the access point, where a first VAP of the set of VAPs operates using the primary channel and at least one secondary channel of the access point, and where at least one second VAP of the set of VAPs operates using a secondary channel of the at least one secondary channel. In some cases, receiving the information identifying the set of VAPs supported by the access point includes receiving a multiple BSSID element in a beacon, the multiple BSSID element including the information identifying the set of VAPs supported by the access point. In some cases, the multiple BSSID element includes an indication that a primary channel for the at least one second VAP is shifted in frequency with reference to the primary channel transmitted from the access point, or the first VAP, or a combination thereof. In some cases, the multiple BSSID element includes an indication of a center frequency for the at least one second VAP with reference to a center frequency of the primary channel transmitted from the access point, or the first VAP, or a combination thereof. In some cases, receiving the information identifying the set of VAPs includes receiving a set of AIDs, the set of VAPs associated with the set of AIDs to indicate broadcast traffic.

VAP manager 2025 may identify, based on the received information, a VAP of the at least one second VAP for the station to use to communicate with the access point. VAP manager 2025 may transmit an indication of the identified VAP to the access point, the communications received from the access point based on the transmitted indication of the identified VAP.

Secondary channel manager 2030 may receive communications from the access point on the secondary channel corresponding to the identified VAP. Secondary channel manager 2030 may receive, on the secondary channel, an indication of a resource unit directed to the station, transmit an uplink frame to the access point on the secondary channel based on receiving the trigger frame. Secondary channel manager 2030 may negotiate, with the access point, a TWT SP schedule for the secondary channel corresponding to the identified VAP, where the station listens for transmissions from the access point based on the TWT SP schedule. In some cases, the indication of the resource unit directed to the station is received in a multi-user downlink frame from the access point. In some cases, the at least one secondary channel includes a set of secondary channels that are associated with the set of VAPs.

RU manager 2035 may receive, on the secondary channel, an indication of a resource unit of the identified VAP for the station to use for random access to the access point. RU manager 2035 may identify a broadcast resource unit of the secondary channel corresponding to the identified VAP. RU manager 2035 may listen, on the broadcast resource unit, for management frames, or group addressed frames, or announcements, or a combination thereof, transmitted by the access point. In some cases, the indication includes a broadcast AID for the VAP of the at least one second VAP.

Figure 21:
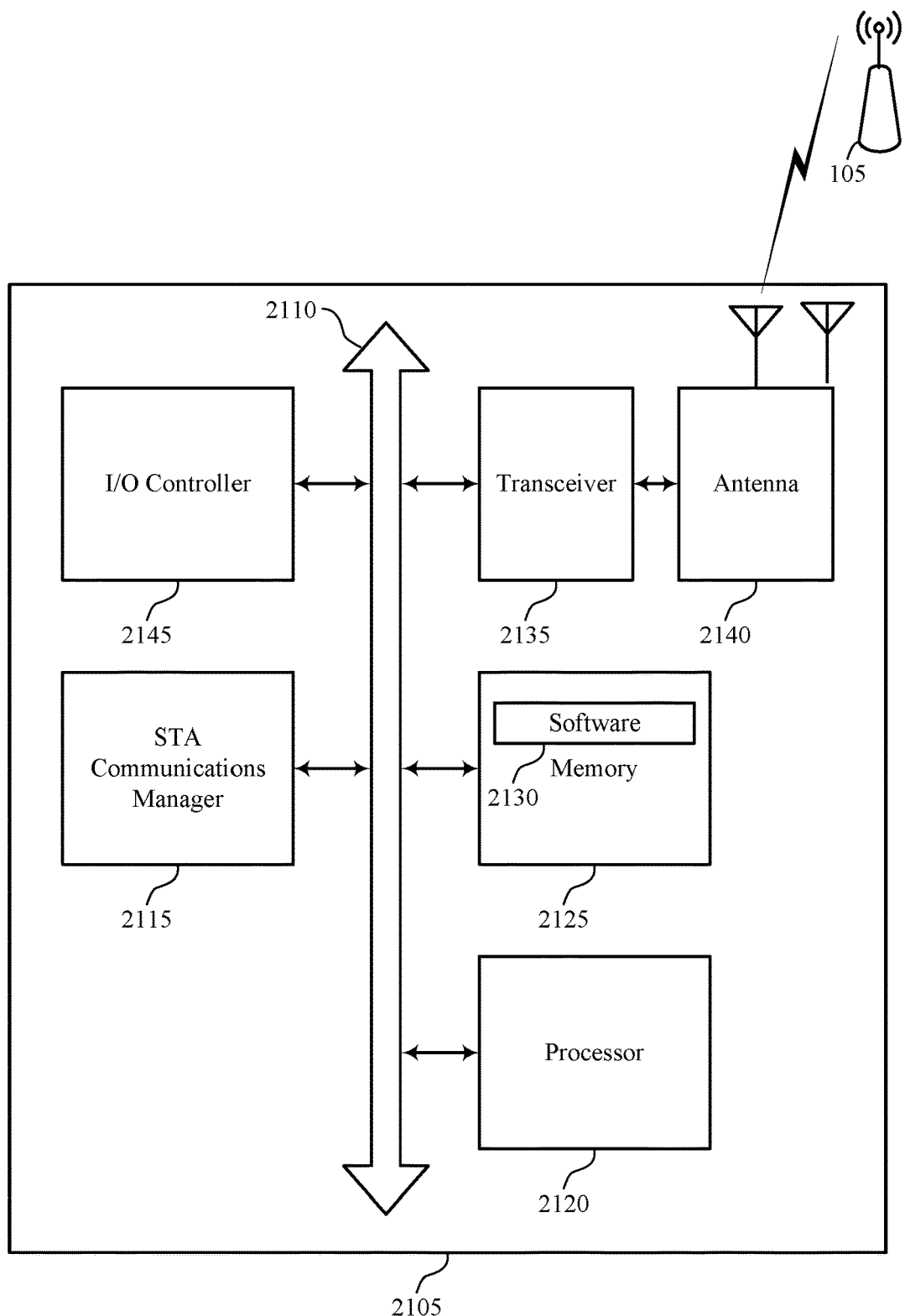
FIG. 21 illustrates a block diagram of a system including a STA that supports a station parked on a secondary channel in accordance with aspects of the present disclosure.

FIG. 21 shows a diagram of a system 2100 including a device 2105 that supports mechanisms to support mechanisms to support secondary channel operation in accordance with aspects of the present disclosure. Device 2105 may be an example of or include the components of wireless device 1405, 1505, 1705, 1905, or a STA 115 as described above, e.g., with reference to FIGS. 14, 15, 17, 18, and 19. Device 2105 may include components for bi-directional voice and data communications including components for transmitting and receiving communications, including STA communications manager 2115, processor 2120, memory 2125, software 2130, transceiver 2135, antenna 2140, and I/O controller 2145. These components may be in electronic communication via one or more buses (e.g., bus 2110). In some cases, device 2105 may be an example of an AP 105 that supports multiple VAPs (e.g., as described above).

Processor 2120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 2120 may be configured to operate a memory array using a memory controller. In other cases, a memory controller may be integrated into processor 2120. Processor 2120 may be configured to execute computer-readable instructions stored in a memory to perform various functions (e.g., functions or tasks supporting mechanisms to support mechanisms to support secondary channel operation).

Memory 2125 may include random access memory (RAM) and read only memory (ROM). The memory 2125 may store computer-readable, computer-executable software 2130 including instructions that, when executed, cause the processor to perform various functions described herein. In some cases, the memory 2125 may contain, among other things, a basic input/output system (BIOS) which may control basic hardware or software operation such as the interaction with peripheral components or devices.

Software 2130 may include code to implement aspects of the present disclosure, including code to support mechanisms to support mechanisms to support secondary channel operation. Software 2130 may be stored in a non-transitory computer-readable medium such as system memory or other memory. In some cases, the software 2130 may not be directly executable by the processor but may cause a computer (e.g., when compiled and executed) to perform functions described herein.

Transceiver 2135 may communicate bi-directionally, via one or more antennas, wired, or wireless links as described above. For example, the transceiver 2135 may represent a wireless transceiver and may communicate bi-directionally with another wireless transceiver. The transceiver 2135 may also include a modem to modulate the packets and provide the modulated packets to the antennas for transmission, and to demodulate packets received from the antennas. In some cases, the wireless device may include a single antenna 2140. However, in some cases the device may have more than one antenna 2140, which may be capable of concurrently transmitting or receiving multiple wireless transmissions.

I/O controller 2145 may manage input and output signals for device 2105. I/O controller 2145 may also manage peripherals not integrated into device 2105. In some cases, I/O controller 2145 may represent a physical connection or port to an external peripheral. In some cases, I/O controller 2145 may utilize an operating system such as iOS®, ANDROID®, MS-DOS®, MS-WINDOWS®, OS/2®, UNIX®, LINUX®, or another known operating system. In other cases, I/O controller 2145 may represent or interact with a modem, a keyboard, a mouse, a touchscreen, or a similar device. In some cases, I/O controller 2145 may be implemented as part of a processor. In some cases, a user may interact with device 2105 via I/O controller 2145 or via hardware components controlled by I/O controller 2145.

Figure 22:
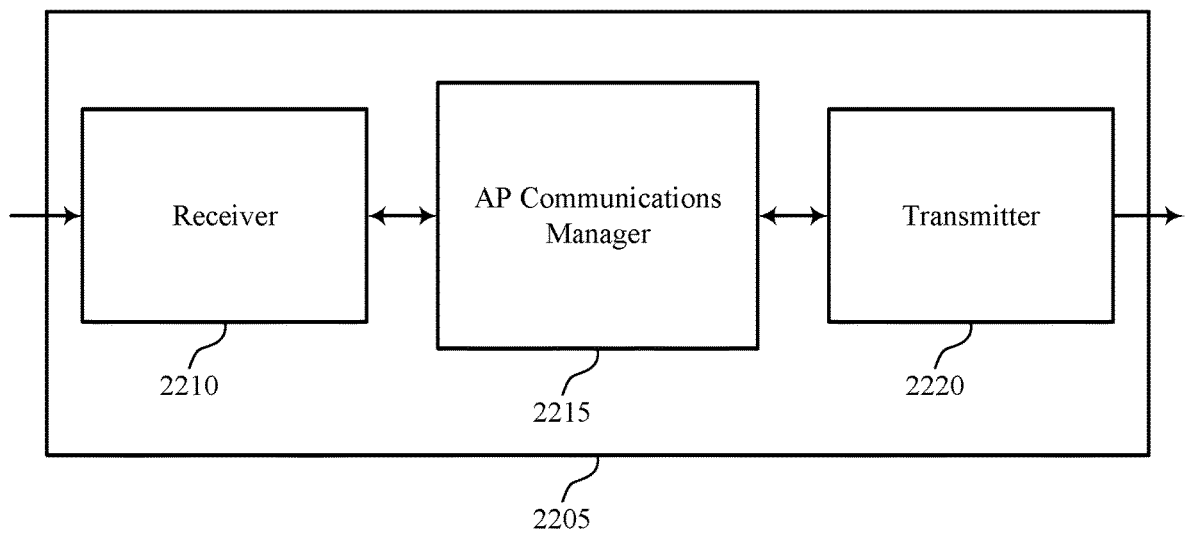
FIGS. 22 through 28 show block diagrams of a device that supports a station parked on a secondary channel in accordance with aspects of the present disclosure.

FIG. 22 shows a block diagram 2200 of a wireless device 2205 that supports mechanisms to support mechanisms to support secondary channel operation in accordance with aspects of the present disclosure. Wireless device 2205 may be an example of aspects of an AP 105 as described herein. Wireless device 2205 may include receiver 2210, AP communications manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to mechanisms to support mechanisms to support secondary channel operation, etc.). Information may be passed on to other components of the device. The receiver 2210 may be an example of aspects of the transceiver 2935 described with reference to FIG. 29. The receiver 2210 may utilize a single antenna or a set of antennas.

AP communications manager 2215 may be an example of aspects of the AP communications manager 2915 described with reference to FIG. 29. AP communications manager 2215 and/or at least some of its various sub-components may be implemented in hardware, software executed by a processor, firmware, or any combination thereof. If implemented in software executed by a processor, the functions of the AP communications manager 2215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The AP communications manager 2215 and/or at least some of its various sub-components may be physically located at various positions, including being distributed such that portions of functions are implemented at different physical locations by one or more physical devices. In some examples, AP communications manager 2215 and/or at least some of its various sub-components may be a separate and distinct component in accordance with various aspects of the present disclosure. In other examples, AP communications manager 2215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

AP communications manager 2215 may identify that a station is associated with the access point on a first secondary channel of the access point, and the access point operates using a primary channel and one or more secondary channels, including the first secondary channel, of a total bandwidth of the access point to communicate with a plurality of stations including the station. AP communications manager 2215 may receive, from the station on the primary channel, an indication that the station is available to receive one or more frames on or more secondary channels, including at least the first secondary channel, identify one or more resource units of the one or more secondary channels, including at least a first resource unit of the first secondary channel, for the access point to use to transmit frames to the station. In some cases, AP communications manager 2215 may transmit one or more frames using the one or more identified resource units of the one or more secondary channels, including at least the first resource unit of the first secondary channel.

In some cases, AP communications manager 2215 may receive, from the station, an indication of a latency threshold (e.g., low latency requirement). In some cases, the low latency requirement may be received on the primary channel. Further, the AP communications manager 2215 (or any of its sub-components described below, such as association manager, resource unit controller, secondary channel manager, duplication controller, and/or random access manager) may identify, in response to the received low latency indication, one or more resource units of the primary channel for exchanging frames with one or more stations (i.e., of the plurality of stations), excluding the station, using the one or more identified resource units of the primary channel. In some aspects, the AP communications manager 2215 may service the station on the first subset of secondary channels, and may service one or more stations of the plurality of stations, excluding the station, on a second subset of secondary channels of the total bandwidth of the access point that are different from the first subset of secondary channels.

AP communications manager 2215 may also may receive, from a station, a request that indicates a first set of two or more channels of a total bandwidth of the access point, the access point operating using a set of channels of the total bandwidth to communicate with a set of stations including the station, the set of channels including the first set of two or more channels and a second set of two or more channels, identify, based on the received request, a primary channel for the station in the indicated first set of two or more channels or in the second set of two or more channels, and transmit, to the station, a response to the received request, the transmitted response including an indication of whether at least one resource unit for the station will be transmitted in the indicated first set of two or more channels or in the second set of two or more channels, and indicated the identified primary channel of the station.

AP communications manager 2215 may also or alternatively transmit, to the station, a first copy of a frame on the primary channel and a second copy of the frame on the first secondary channel, where the frame includes an indication of the primary channel of the access point. AP communications manager 2215 may also or alternatively identify one or more resource units of the first secondary channel for the station to use for random access to the access point and transmit, to the station, an indication of the one or more resource units for the station to use for random access.

AP communications manager 2215 may also or alternatively transmit, on a primary channel transmitted by the access point, an indication of a set of VAPs supported by the access point, where a first VAP of the set of VAPs operates using the primary channel and at least one secondary channel of the access point, and where at least one second VAP of the set of VAPs operates using a secondary channel of the at least one secondary channel. AP communications manager 2215 may receive, from a station, an indication of a VAP of the at least one second VAP for the access point to use to communicate with the station. AP communications manager 1215 may transmit communications to the station on the secondary channel of the at least one secondary channel corresponding to the indicated VAP.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2935 described with reference to FIG. 29. The transmitter 2220 may utilize a single antenna or a set of antennas.

Figure 23:
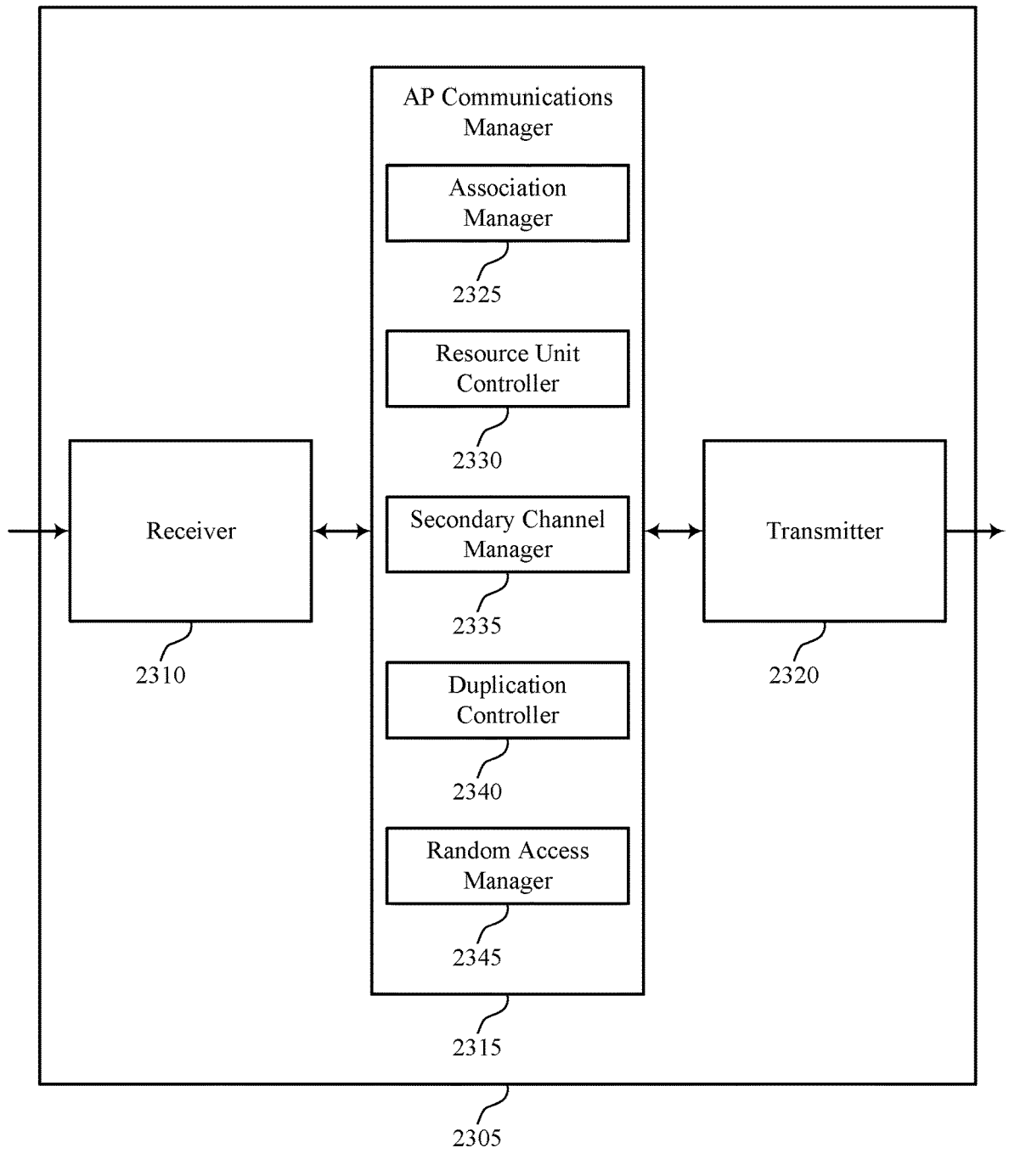

FIG. 23 shows a block diagram 2300 of a wireless device 2305 that supports mechanisms to support mechanisms to support secondary channel operation in accordance with aspects of the present disclosure. Wireless device 2305 may be an example of aspects of a wireless device 2205 or an AP 105 as described with reference to FIG. 22. Wireless device 2305 may include receiver 2310, AP communications manager 2315, and transmitter 2320. Wireless device 2305 may also include a processor. Each of these components may be in communication with one another (e.g., via one or more buses). AP communications manager 2315 may be an example of aspects of the AP communications manager 2915 described with reference to FIG. 29. AP communications manager 2315 may also include association manager 2325, resource unit controller 2330, secondary channel manager 2335, duplication controller 2340, and random access manager 2345.

Receiver 2310 may receive information such as packets, user data, or control information associated with various information channels (e.g., control channels, data channels, and information related to mechanisms to support mechanisms to support secondary channel operation, etc.). Information may be passed on to other components of the device. The receiver 2310 may be an example of aspects of the transceiver 2935 described with reference to FIG. 29. The receiver 2310 may utilize a single antenna or a set of antennas.

Association manager 2325 may identify that a station is associated with the access point on a first secondary channel of the access point, where the access point operates using a primary channel and one or more secondary channels, including the first secondary channel, of a total bandwidth of the access point to communicate with a set of stations including the station.

Resource unit controller 2330 may identify one or more resource units of the one or more secondary channels, including at least a first resource unit of the first secondary channel for the access point to use to transmit frames to the station. Resource unit controller 2330 may assign the first resource unit of the first secondary channel to the station, where the first resource unit is a directed resource unit for the station.

Resource unit controller 2330 may identify one or more resource units of the first secondary channel for the station to use for random access to the access point. In some cases, each of the one or more resource units of the first secondary channel is assigned an AID that is unique within the first secondary channel. In some cases, at least one of the one or more resource units of the first secondary channel is assigned an AID that is a same AID as an AID assigned to a second resource unit used for random access on a second secondary channel of the one or more secondary channels. In some cases, the one or more resource units of the first secondary channel are assigned AIDs different than an AID assigned to a second resource unit used for random access on a second secondary channel of the one or more secondary channels.

Secondary channel manager 2335 may receive, from the station on the primary channel, an indication that the station is available to receive one or more frames on or more secondary channels, including at least the first secondary channel. In some cases, secondary channel manager 2335 may transmit one or more frames using the one or more identified resource units of the one or more secondary channels, including at least the first resource of the first secondary channel.

In some cases, transmitting the one or more frames includes broadcasting one or more control frames or management frames for receipt by a plurality (or set) of stations, including the station, associated with the access point on the first secondary channel, where the identified first resource unit includes a broadcast resource unit. In some cases, the one or more frames include a TSF, or a traffic information, or a probe response, or a TIM, or a combination thereof. In some cases, the one or more frames include control frames or management frames.

Duplication controller 2340 may transmit, to the station, a first copy of a frame on the primary channel and a second copy of the frame on the first secondary channel, where the frame includes an indication of the primary channel of the access point. In some cases, transmitting the first copy of the frame and the second copy of the frame includes transmitting copies of the frame on each of the primary channel and the one or more secondary channels of the total bandwidth of the access point in parallel. In some cases, the frame includes a non-HT duplicate PPDU. In some cases, the frame includes a control frame or a management frame.

Random access manager 2345 may transmit, to the station, an indication of the one or more resource units for the station to use for random access and receive a transmission from the station on the one or more identified resource units. In some cases, the transmitted indication includes an AID indicating that one of the one or more resource units is to be used for random access transmissions by the station.

Transmitter 2320 may transmit signals generated by other components of the device. In some examples, the transmitter 2320 may be collocated with a receiver 2310 in a transceiver module. For example, the transmitter 2320 may be an example of aspects of the transceiver 2935 described with reference to FIG. 29. The transmitter 2320 may utilize a single antenna or a set of antennas.

Figure 24:
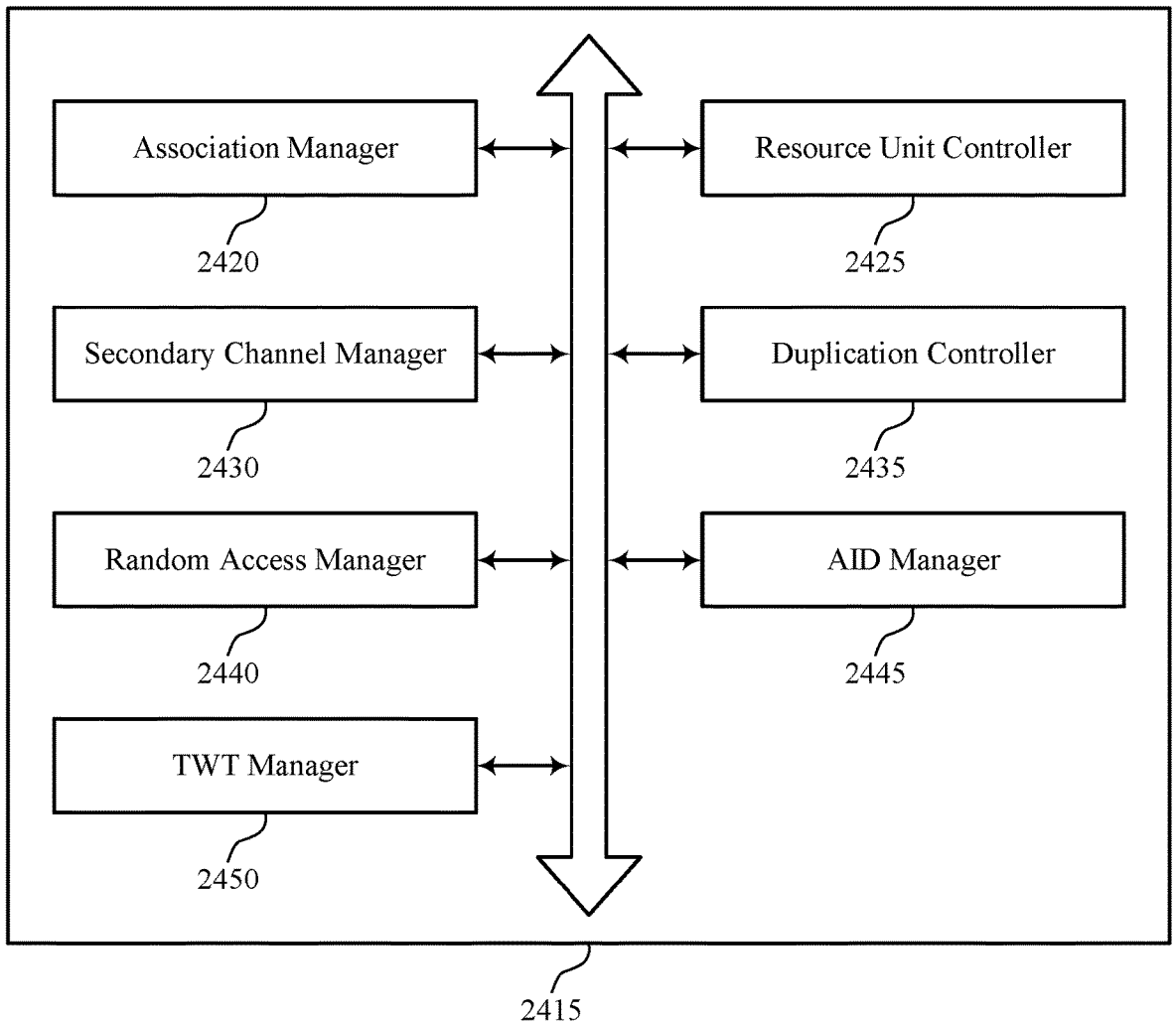

FIG. 24 shows a block diagram 2400 of an AP communications manager 2415 that supports mechanisms to support mechanisms to support secondary channel operation in accordance with aspects of the present disclosure. The AP communications manager 2415 may be an example of aspects of an AP communications manager 2915 described with reference to FIGS. 22, 23, and 29. The AP communications manager 2415 may include association manager 2420, resource unit controller 2425, secondary channel manager 2430, duplication controller 2435, random access manager 2440, AID manager 2445, and TWT manager 2450. Each of these modules may communicate, directly or indirectly, with one another (e.g., via one or more buses).

Association manager 2420 may identify that a station is associated with the access point on a first secondary channel of the access point, where the access point operates using a primary channel and one or more secondary channels, including the first secondary channel, of a total bandwidth of the access point to communicate with a set of stations including the station.

Resource unit controller 2425 may identify one or more resource units of the one or more secondary channels, including at least a first resource unit of the first secondary channel for the access point to use to transmit frames to the station. Resource unit controller 2425 may assign the first resource unit of the first secondary channel to the station, where the first resource unit is a directed resource unit for the station.

Resource unit controller 2425 may identify one or more resource units of the first secondary channel for the station to use for random access to the access point. In some cases, each of the one or more resource units of the first secondary channel is assigned an AID that is unique within the first secondary channel. In some cases, at least one of the one or more resource units of the first secondary channel is assigned an AID that is a same AID as an AID assigned to a second resource unit used for random access on a second secondary channel of the one or more secondary channels. In some cases, the one or more resource units of the first secondary channel are assigned AIDs different than an AID assigned to a second resource unit used for random access on a second secondary channel of the one or more secondary channels.

Secondary channel manager 2430 may receive, from the station on the primary channel, an indication that the station is available to receive one or more frames on or more secondary channels, including at least the first secondary channel. In some cases, secondary channel manager 2430 may transmit one or more frames using the one or more identified resource units of the one or more secondary channels, including at least the first resource of the first secondary channel.

In some cases, transmitting the one or more frames includes broadcasting one or more control frames or management frames for receipt by a plurality of stations, including the station, associated with the access point on the first secondary channel, including the station, where the identified first resource unit includes a broadcast resource unit. In some cases, the one or more frames include a TSF, or a traffic information, or a probe response, or a TIM, or a combination thereof. In some cases, the one or more frames include control frames or management frames.

Duplication controller 2435 may transmit, to the station, a first copy of a frame on the primary channel and a second copy of the frame on the first secondary channel, where the frame includes an indication of the primary channel of the access point. In some cases, transmitting the first copy of the frame and the second copy of the frame includes transmitting copies of the frame on each of the primary channel and the one or more secondary channels of the total bandwidth of the access point in parallel. In some cases, the frame includes a non-HT duplicate PPDU. In some cases, the frame includes a control frame or a management frame.

Random access manager 2440 may transmit, to the station, an indication of the one or more resource units for the station to use for random access and receive a transmission from the station on the one or more identified resource units. In some cases, the transmitted indication includes an AID indicating that one of the one or more resource units is to be used for random access transmissions by the station.

AID manager 2445 may identify a unicast AID for the station. AID manager 2445 may transmit an indication of the unicast AID for the station on the first secondary channel with the one or more frames. AID manager 2445 may transmit an A-MPDU to the station, the A-MPDU including an indication of the unicast AID for the station. AID manager 2445 may identify a broadcast AID for a plurality of stations associated with the access point on the first secondary channel, including the station. AID manager 2445 may transmit an indication of the broadcast AID for the plurality of stations with the one or more control frames or management frames.

In some cases, AID manager 2445 may identify an AID for the one or more secondary channels, where the AID applies to one or more secondary channels of a plurality of second channels for a plurality of time intervals based at least in part on a channel rotation schedule. AID manager 2445 may transmit an indication of the identified AID on the first secondary channel during a first time interval of the channel rotation schedule. AID manager 2445 may also transmit the indication of the identified AID on a second secondary channel during a second time interval of the channel rotation schedule.

TWT manager 2450 may receive, from the station, a TWT request including an indication of the first secondary channel.

Figure 25:
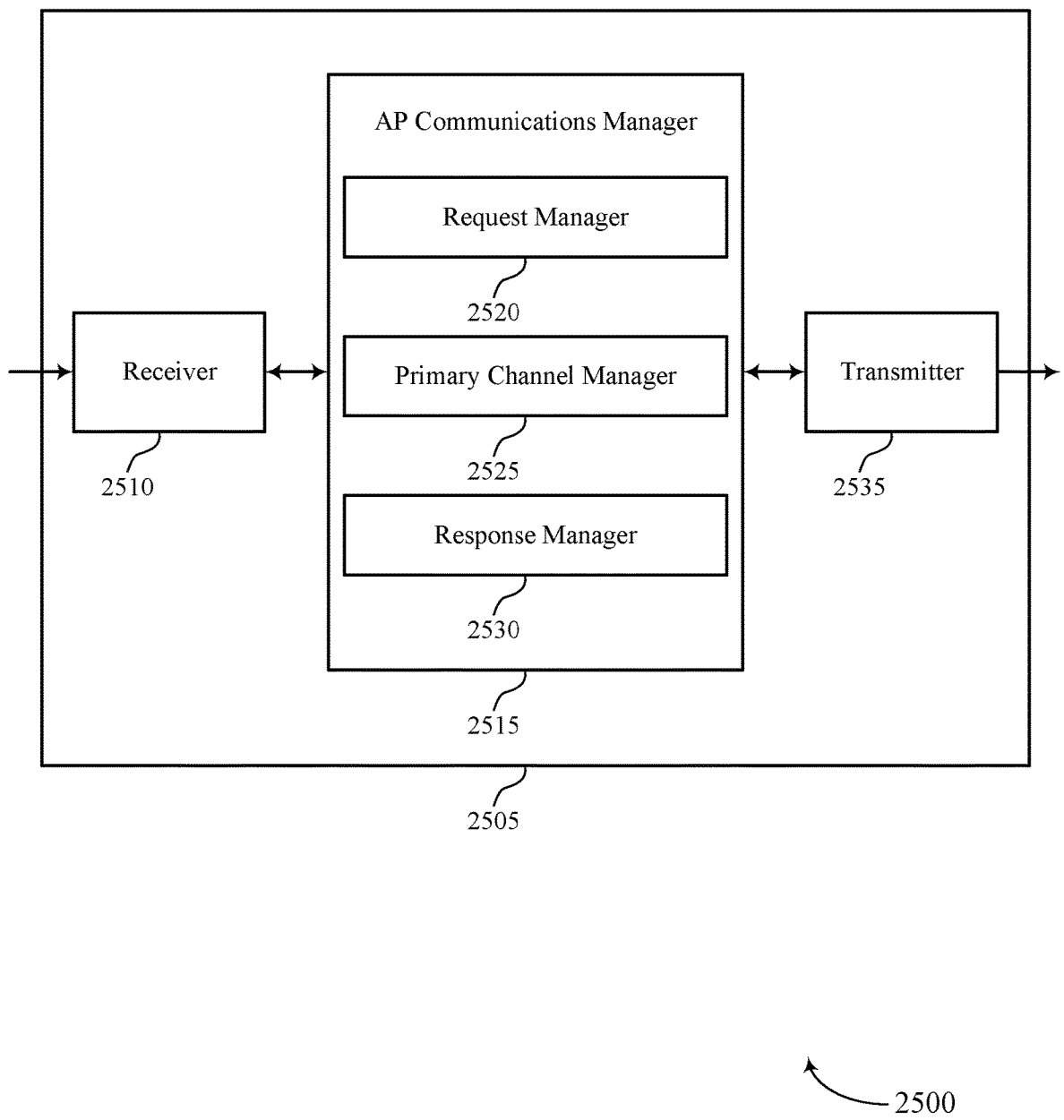

FIG. 25 shows a block diagram 2500 of a device 2505 that supports mechanisms to support a 20 MHz station parked on a secondary channel in accordance with aspects of the present disclosure. The device 2505 may be an example of aspects of a wireless device 2205 or a AP 105 as described herein. The device 2505 may include a receiver 2510, a AP communications manager 2515, and a transmitter 2535. The device 2505 may also include a processor. Each of these components may be in communication with one another (e.g., via one or more buses).

The receiver 2510 may receive information such as packets, user data, or control information associated with various information channels (e.g., control channels, data channels, and information related to mechanisms to support a 20 MHz station parked on a secondary channel, etc.). Information may be passed on to other components of the device. The receiver 2510 may be an example of aspects of the transceiver 2935 described with reference to FIG. 29. The receiver 2510 may utilize a single antenna or a set of antennas.

The AP communications manager 2515 may be an example of aspects of the AP communications manager 2915 as described herein. The AP communications manager 2515 may include a request manager 2520, a primary channel manager 2525, and a response manager 2530.

The request manager 2520 may receive, from a station, a request that indicates a first set of two or more channels of a total bandwidth of the access point, the access point operating using a set of channels of the total bandwidth to communicate with a set of stations including the station, the set of channels including the first set of two or more channels and a second set of two or more channels.

The primary channel manager 2525 may identify, based on the received request, a primary channel for the station in the indicated first set of two or more channels or in the second set of two or more channels.

The response manager 2530 may transmit, to the station, a response to the received request, the transmitted response including an indication of whether at least one resource unit for the station will be transmitted in the indicated first set of two or more channels or in the second set of two or more channels, and indicated the identified primary channel of the station.

The transmitter 2535 may transmit signals generated by other components of the device. In some examples, the transmitter 2535 may be collocated with a receiver 2510 in a transceiver module. For example, the transmitter 2535 may be an example of aspects of the transceiver 2935 described with reference to FIG. 29. The transmitter 2535 may utilize a single antenna or a set of antennas.

Figure 26:
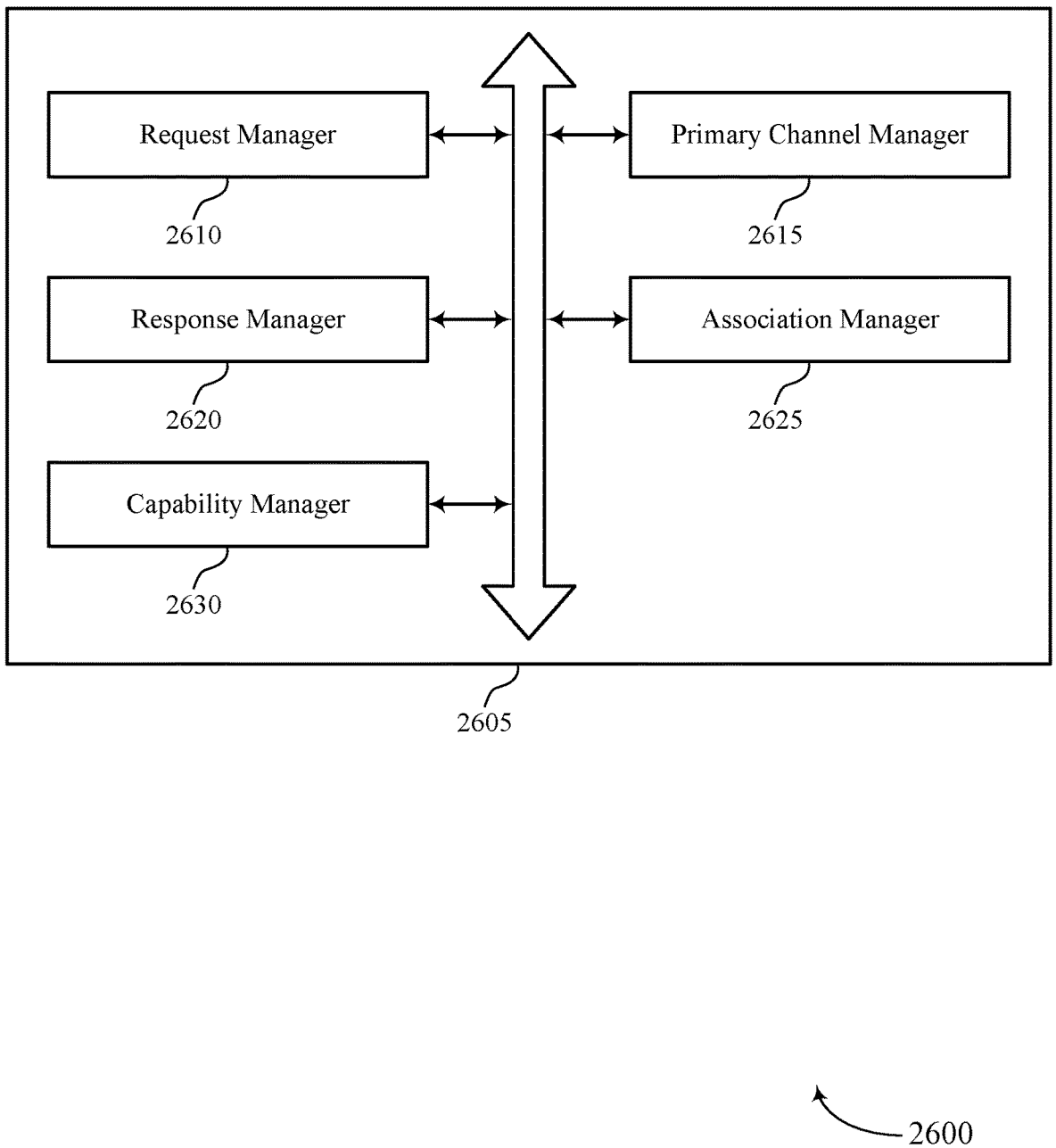

FIG. 26 shows a block diagram 2600 of a AP communications manager 2605 that supports mechanisms to support a 20 MHz station parked on a secondary channel in accordance with aspects of the present disclosure. The AP communications manager 2605 may be an example of aspects of a AP communications manager as described herein with reference to FIGS. 22-29. The AP communications manager 2605 may include a request manager 2610, a primary channel manager 2615, a response manager 2620, an association manager 2625, and a capability manager 2630. Each of these modules may communicate, directly or indirectly, with one another (e.g., via one or more buses).

The request manager 2610 may receive, from a station, a request that indicates a first set of two or more channels of a total bandwidth of the access point, the access point operating using a set of channels of the total bandwidth to communicate with a set of stations including the station, the set of channels including the first set of two or more channels and a second set of two or more channels.

In some cases, the received request includes a first TWT channel field that identifies the first set of two or more channels of the total bandwidth.

In some cases, the received request includes a probe request, or a probe response, or an association request response, or a reassociation request response, or a TWT request, or a TWT response, or an action frame, or a combination thereof.

The primary channel manager 2615 may identify, based on the received request, a primary channel for the station in the indicated first set of two or more channels or in the second set of two or more channels.

The response manager 2620 may transmit, to the station, a response to the received request, the transmitted response including an indication of whether at least one resource unit for the station will be transmitted in the indicated first set of two or more channels or in the second set of two or more channels, and indicated the identified primary channel of the station.

In some examples, the response manager 2620 may transmit a set of two or more bits corresponding to the indicated first set of two or more channels, where one bit of the set of two or more bits has a different value than a remaining one or more bits of the set of two or more bits. In some cases, the response to the received request includes at least one bit of the set of two or more bits having a same value as a corresponding bit of the first set of two or more bits to indicate secondary channel of the first set of two or more channels. In some cases, the response to the received request includes a second TWT channel field that identifies the indicated first set of two or more channels or the second set of two or more channel to indicate whether at least one resource unit for the station will be transmitted in the indicated first set of two or more channels or in the second set of two or more channels. In some cases, the response to the received request includes a TWT response.

In some cases, the transmitted response includes a probe request, or a probe response, or an association request response, or a reassociation request response, or a TWT request, or a TWT response, or an action frame, or a combination thereof.

In some cases, the received request includes a first set of two or more bits corresponding to the first set of two or more channels, each bit of the first set of two or more bits corresponding to one channel of the first set of two or more channels.

The association manager 2625 may perform an association procedure with the station, where the request is received from the station after the association procedure is performed.

In some examples, the association manager 2625 may perform an association procedure with the station after transmitting the response to the received request.

In some examples, the association manager 2625 may receive, from the station on the identified primary channel, a request to associate with the access point.

The capability manager 2630 may transmit, to the station, an operating mode indication identifying a second primary channel for the station, the station to switch, in response to the transmitted operating mode indication, to monitoring the second primary channel from monitoring the identified primary channel.

In some examples, the capability manager 2630 may receive, in a capability element from the station, an indication that the station supports subchannel selective transmission, the TWT request received based on the capability element.

Figure 27:
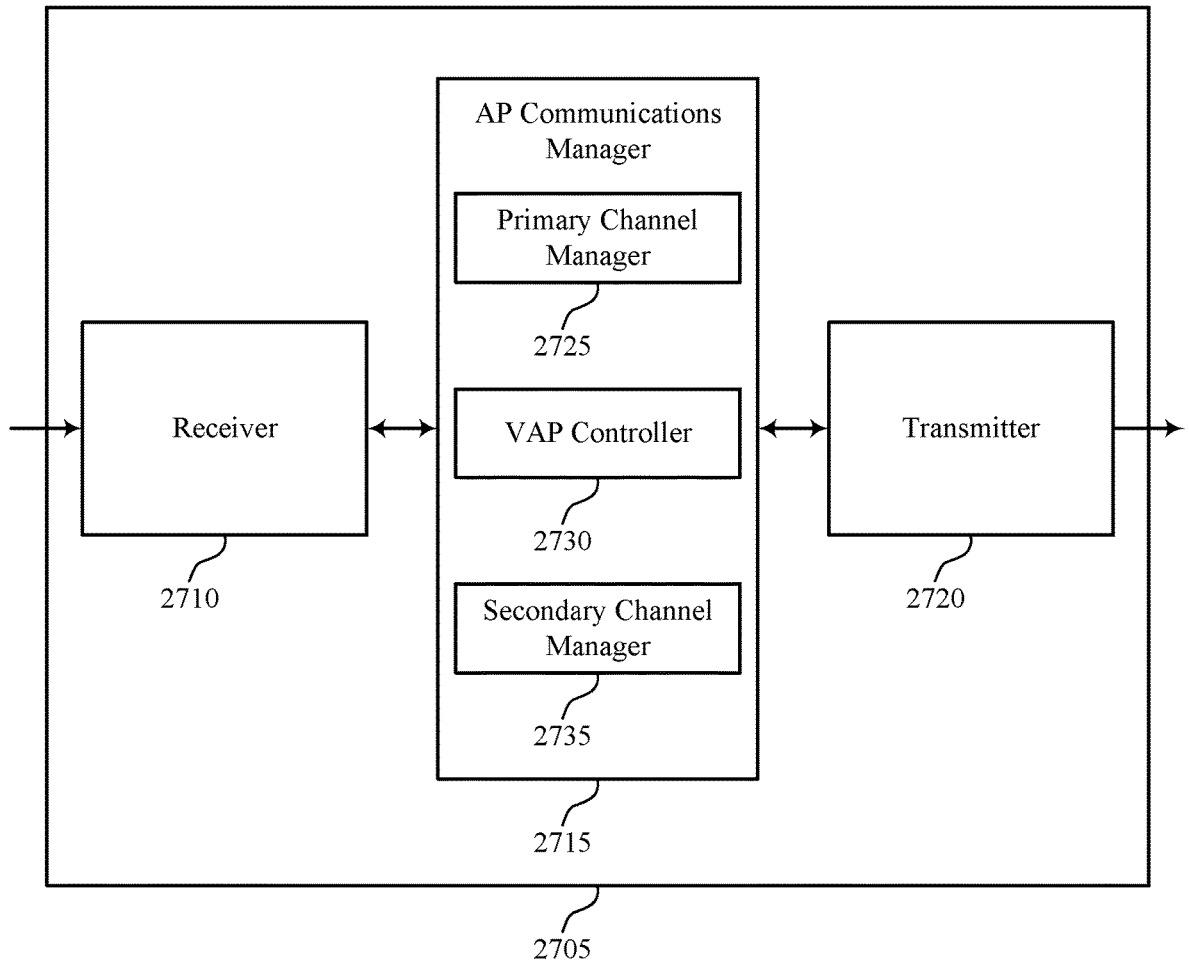

FIG. 27 shows a block diagram 2700 of a wireless device 2705 that supports multiple basic service sets supporting secondary channels in accordance with aspects of the present disclosure. Wireless device 2705 may be an example of aspects of a wireless device 2205 or a AP 105 as described with reference to FIG. 22. Wireless device 2705 may include receiver 2710, AP communications manager 2715, and transmitter 2720. Wireless device 2705 may also include a processor. Each of these components may be in communication with one another (e.g., via one or more buses). AP communications manager 2715 may be an example of aspects of the AP communications manager 2915 described with reference to FIG. 29. AP communications manager 2715 may also include primary channel manager 2725, VAP controller 2730, and secondary channel manager 2735.

Receiver 2710 may receive information such as packets, user data, or control information associated with various information channels (e.g., control channels, data channels, and information related to multiple basic service sets supporting secondary channels, etc.). Information may be passed on to other components of the device. The receiver 2710 may be an example of aspects of the transceiver 2935 described with reference to FIG. 29. The receiver 2710 may utilize a single antenna or a set of antennas.

Primary channel manager 2725 may transmit, on a primary channel transmitted by the access point, an indication of a set of VAPs supported by the access point, where a first VAP of the set of VAPs operates using the primary channel and at least one secondary channel of the access point, and where at least one second VAP of the set of VAPs operates using a secondary channel of the at least one secondary channel. In some cases, transmitting the information identifying the set of VAPs supported by the access point includes transmitting a multiple BSSID element in a beacon, the multiple BSSID element including the information identifying the set of VAPs supported by the access point. In some cases, the multiple BSSID element includes an indication that a primary channel for the at least one second VAP is shifted in frequency with reference to the primary channel transmitted from the access point, or the first VAP, or a combination thereof. In some cases, the multiple BSSID element includes an indication of a center frequency for the at least one second VAP with reference to a center frequency of the primary channel transmitted from the access point, or the first VAP, or a combination thereof. In some cases, transmitting the information identifying the set of VAPs includes transmitting a set of AIDs, the set of VAPs associated with the set of AIDs to indicate broadcast traffic.

VAP controller 2730 may receive, from a station, an indication of a VAP of the at least one second VAP for the access point to use to communicate with the station. VAP controller 2730 may receive, from the station, an indication of the identified VAP, the communications transmitted to the station based on the received indication of the identified VAP.

Secondary channel manager 2735 may transmit communications to the station on the secondary channel of the at least one secondary channel corresponding to the indicated VAP. Secondary channel manager 2735 may transmit, on the secondary channel, an indication of a resource unit directed to the station. Secondary channel manager 2735 may receive, from the station, an uplink frame on the secondary channel based on the transmitted trigger frame. Secondary channel manager 2735 may negotiate, with the station, a TWT SP schedule for the secondary channel corresponding to the identified VAP, where the access point transmits communications to the station based on the TWT SP schedule. In some cases, the indication of the resource unit directed to the station is transmitted by the access point in a multi-user downlink frame. In some cases, the at least one secondary channel includes a set of secondary channels that are associated with the set of VAPs.

Transmitter 2720 may transmit signals generated by other components of the device. In some examples, the transmitter 2720 may be collocated with a receiver 2710 in a transceiver module. For example, the transmitter 2720 may be an example of aspects of the transceiver 2935 described with reference to FIG. 29. The transmitter 2720 may utilize a single antenna or a set of antennas.

Figure 28:
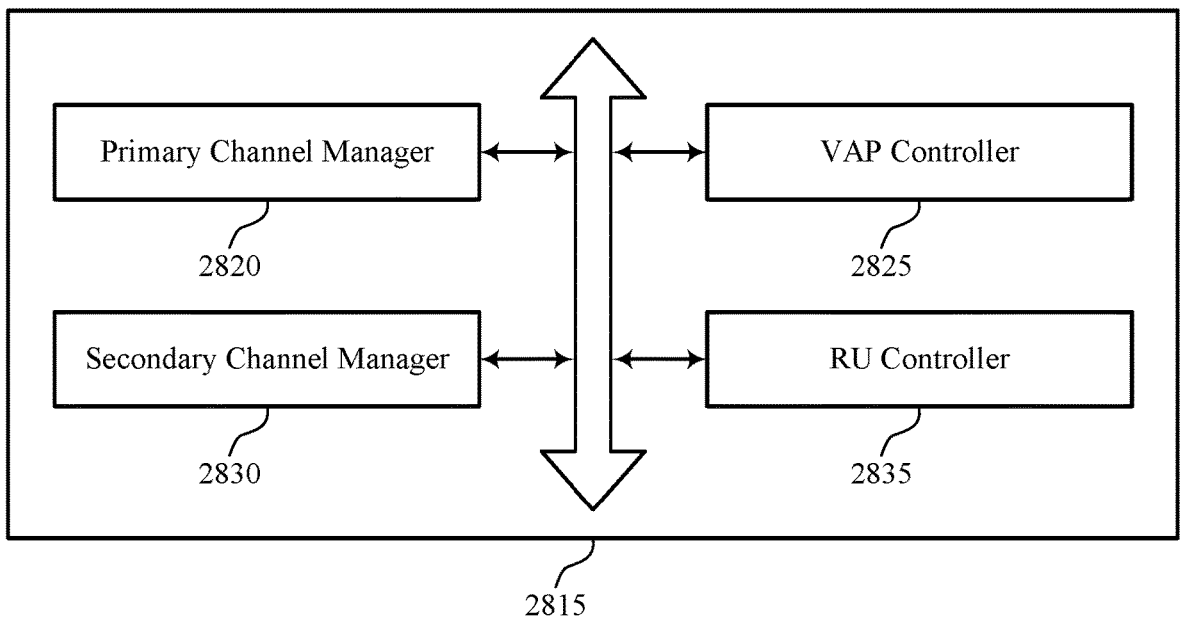

FIG. 28 shows a block diagram 2800 of a AP communications manager 2815 that supports multiple basic service sets supporting secondary channels in accordance with aspects of the present disclosure. The AP communications manager 2815 may be an example of aspects of a AP communications manager described with reference to FIGS. 22-29. The AP communications manager 2815 may include primary channel manager 2820, VAP controller 2825, secondary channel manager 2830, and RU controller 2835. Each of these modules may communicate, directly or indirectly, with one another (e.g., via one or more buses).

Primary channel manager 2820 may transmit, on a primary channel transmitted by the access point, an indication of a set of VAPs supported by the access point, where a first VAP of the set of VAPs operates using the primary channel and at least one secondary channel of the access point, and where at least one second VAP of the set of VAPs operates using a secondary channel of the at least one secondary channel. In some cases, transmitting the information identifying the set of VAPs supported by the access point includes transmitting a multiple BSSID element in a beacon, the multiple BSSID element including the information identifying the set of VAPs supported by the access point. In some cases, the multiple BSSID element includes an indication that a primary channel for the at least one second VAP is shifted in frequency with reference to the primary channel transmitted from the access point, or the first VAP, or a combination thereof. In some cases, the multiple BSSID element includes an indication of a center frequency for the at least one second VAP with reference to a center frequency of the primary channel transmitted from the access point, or the first VAP, or a combination thereof. In some cases, transmitting the information identifying the set of VAPs includes transmitting a set of AIDs, the set of VAPs associated with the set of AIDs to indicate broadcast traffic.

VAP controller 2825 may receive, from a station, an indication of a VAP of the at least one second VAP for the access point to use to communicate with the station. VAP controller 2825 may receive, from the station, an indication of the identified VAP, the communications transmitted to the station based on the received indication of the identified VAP.

Secondary channel manager 2830 may transmit communications to the station on the secondary channel of the at least one secondary channel corresponding to the indicated VAP. Secondary channel manager 2830 may transmit, on the secondary channel, an indication of a resource unit directed to the station. Secondary channel manager 2830 may receive, from the station, an uplink frame on the secondary channel based on the transmitted trigger frame. Secondary channel manager 2830 may negotiate, with the station, a TWT SP schedule for the secondary channel corresponding to the identified VAP, where the access point transmits communications to the station based on the TWT SP schedule. In some cases, the indication of the resource unit directed to the station is transmitted by the access point in a multi-user downlink frame. In some cases, the at least one secondary channel includes a set of secondary channels that are associated with the set of VAPs.

RU controller 2835 may identify a broadcast resource unit of the secondary channel corresponding to the identified VAP. RU controller 2835 may transmit, on the broadcast resource unit, management frames, or group addressed frames, or announcements, or a combination thereof. RU controller 2835 may transmit, on the secondary channel, an indication of a resource unit of the VAP of the at least one second VAP for the station to use for random access to the access point. In some cases, the indication includes a broadcast AID for the at least one second VAPs of the set of VAPs.

Figure 29:
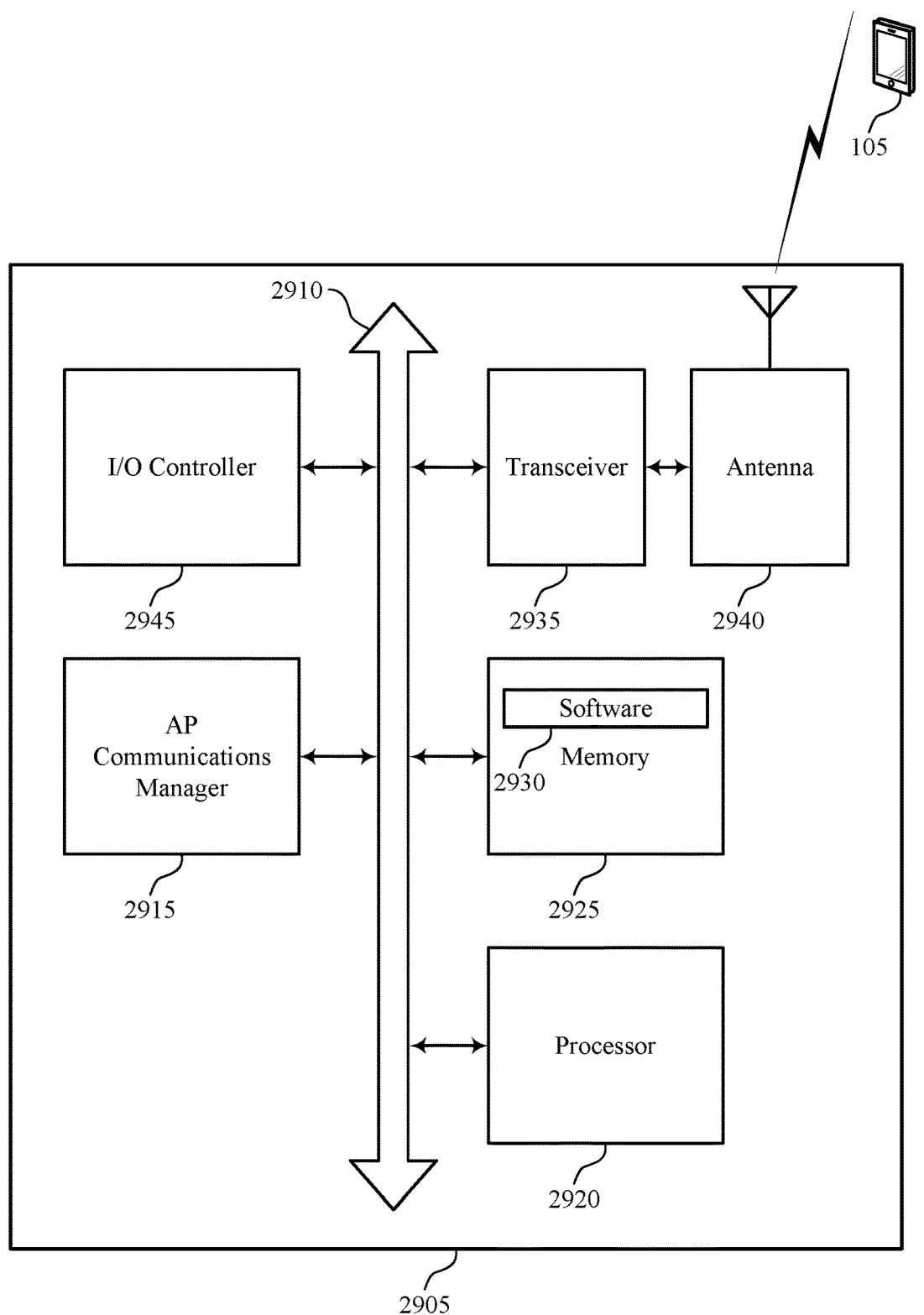
FIG. 29 illustrates a block diagram of a system including an AP that supports a station parked on a secondary channel in accordance with aspects of the present disclosure.

FIG. 29 shows a diagram of a system 2900 including a device 2905 that supports mechanisms to support mechanisms to support secondary channel operation in accordance with aspects of the present disclosure. Device 2905 may be an example of or include the components of AP 105 as described above, e.g., with reference to FIG. 1. Device 2905 may include components for bi-directional voice and data communications including components for transmitting and receiving communications, including AP communications manager 2915, processor 2920, memory 2925, software 2930, transceiver 2935, antenna 2940, and I/O controller 2945. These components may be in electronic communication via one or more buses (e.g., bus 2910).

Processor 2920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2920 may be configured to operate a memory array using a memory controller. In other cases, a memory controller may be integrated into processor 2920. Processor 2920 may be configured to execute computer-readable instructions stored in a memory to perform various functions (e.g., functions or tasks supporting mechanisms to support mechanisms to support secondary channel operation).

Memory 2925 may include RAM and ROM. The memory 2925 may store computer-readable, computer-executable software 2930 including instructions that, when executed, cause the processor to perform various functions described herein. In some cases, the memory 2925 may contain, among other things, a BIOS which may control basic hardware or software operation such as the interaction with peripheral components or devices.

Software 2930 may include code to implement aspects of the present disclosure, including code to support mechanisms to support mechanisms to support secondary channel operation. Software 2930 may be stored in a non-transitory computer-readable medium such as system memory or other memory. In some cases, the software 2930 may not be directly executable by the processor but may cause a computer (e.g., when compiled and executed) to perform functions described herein.

Transceiver 2935 may communicate bi-directionally, via one or more antennas, wired, or wireless links as described above. For example, the transceiver 2935 may represent a wireless transceiver and may communicate bi-directionally with another wireless transceiver. The transceiver 2935 may also include a modem to modulate the packets and provide the modulated packets to the antennas for transmission, and to demodulate packets received from the antennas. In some cases, the wireless device may include a single antenna 2940. However, in some cases the device may have more than one antenna 2940, which may be capable of concurrently transmitting or receiving multiple wireless transmissions.

I/O controller 2945 may manage input and output signals for device 2905. I/O controller 2945 may also manage peripherals not integrated into device 2905. In some cases, I/O controller 2945 may represent a physical connection or port to an external peripheral. In some cases, I/O controller 2945 may utilize an operating system such as iOS®, ANDROID®, MS-DOS®, MS-WINDOWS®, OS/2®, UNIX®, LINUX®, or another known operating system. In other cases, I/O controller 2945 may represent or interact with a modem, a keyboard, a mouse, a touchscreen, or a similar device. In some cases, I/O controller 2945 may be implemented as part of a processor. In some cases, a user may interact with device 2905 via I/O controller 2945 or via hardware components controlled by I/O controller 2945.

Figure 30:
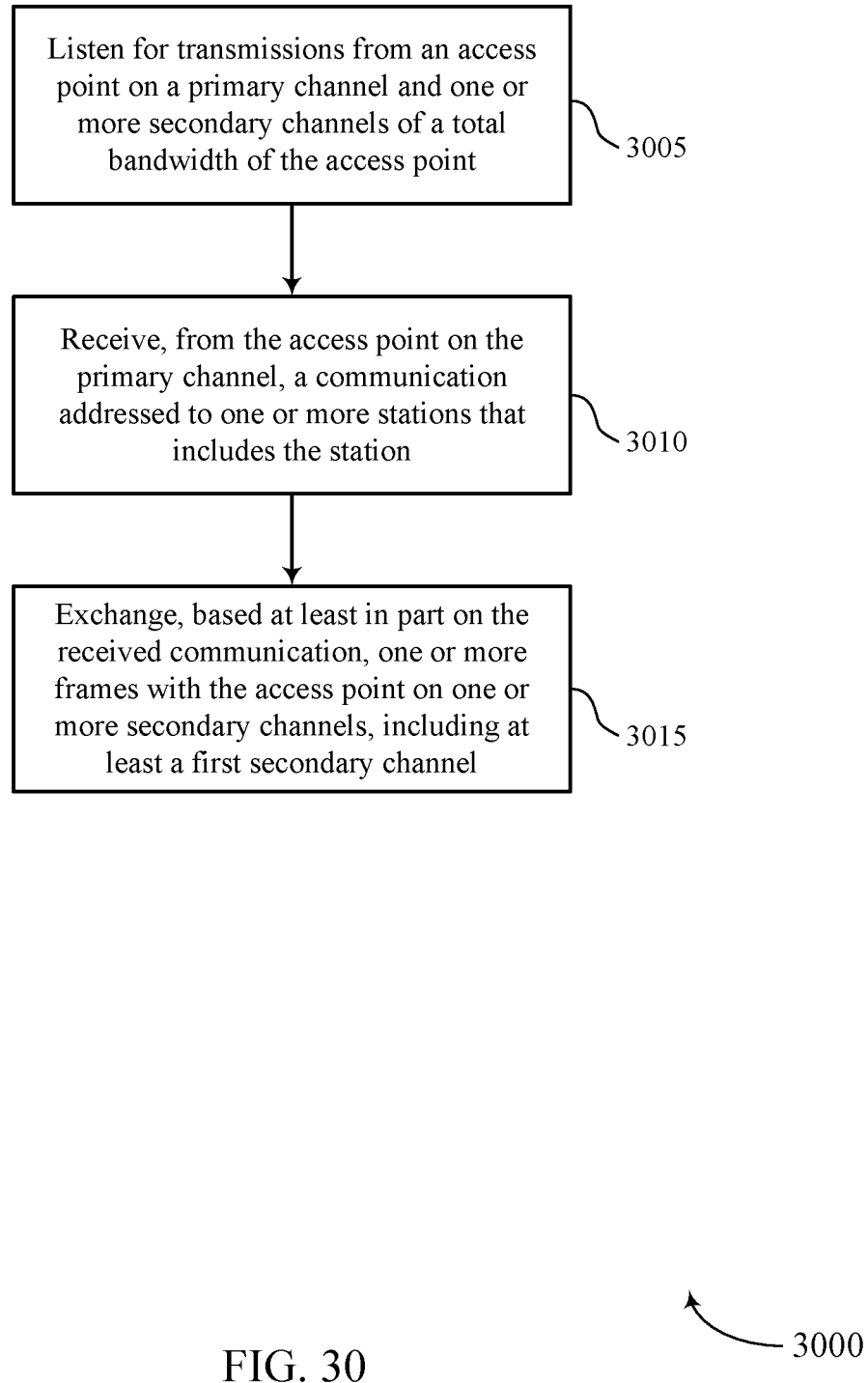
FIGS. 30 through 37 illustrate methods for mechanisms to support secondary channel operation in accordance with aspects of the present disclosure.

FIG. 30 shows a flowchart illustrating a method 3000 for mechanisms to support mechanisms to support secondary channel operation in accordance with aspects of the present disclosure. The operations of method 3000 may be implemented by a STA 115 or its components as described herein. For example, the operations of method 3000 may be performed by a STA communications manager as described with reference to FIGS. 14 through 21. In some examples, a STA 115 may execute a set of codes to control the functional elements of the device to perform the functions described below. Additionally or alternatively, the STA 115 may perform aspects of the functions described below using special-purpose hardware.

At 3005, the STA 115 may listen for transmissions from an access point on a primary channel and one or more secondary channels of a total bandwidth of the access point. In some cases, the STA 115 may listen for transmissions from an access point a primary channel of the access point, and the access point operates using the primary channel and one or more secondary channels. In some cases, the STA 115 listens for the transmissions during a plurality of target wake time (TWT) service periods (SPs) defined by a TWT schedule. In some cases, the STA 115 may listen for the transmissions during a DTIM target beacon transmission time (TBTT). The operations of 3005 may be performed according to the methods described herein. In certain examples, aspects of the operations of 3005 may be performed by a primary channel manager as described with reference to FIGS. 15 through 20.

At 3010, the STA 115 may receive, from the access point on the primary channel, a communication (e.g., a plurality of beacons) addressed to one or more stations that includes the station. In some cases, at least one beacon of the plurality (or set) of beacons includes a DTIM where the DTIM is addressed to the plurality of stations (i.e., that includes the station), and is received during one or more of the plurality of TWT SPs or during a DTIM TBTT. The operations of 3010 may be performed according to the methods described herein. In certain examples, aspects of the operations of 3010 may be performed by a beacon controller as described with reference to FIGS. 15 through 16.

At 3015, the STA 115 may exchange, based at least in part on the received communication (e.g., a beacon from the set of beacons including the DTIM), one or more frames with the access point on one or more secondary channels, including at least a first secondary channel. In some cases, the exchange of the one or more frames over the secondary channels may be based at least in part on the STA 115 transmitting, on the primary channel during one or more of the plurality of TWT SPs or DTIM TBTT, an indication that the STA is available to receive one or more frames on one or more secondary channels, including at least the first secondary channel.

In some circumstances, the STA 115 may provide an indication of such a wide bandwidth capability to the AP. As described above, the AP and STA 115 may exchange frames using any bandwidth supported by the STA 115, provided that the indicated (i.e., negotiated) secondary channel is part of the PPDU transmission. In some cases, the SST channel may serve as a temporary primary channel of the STA 115. That is, the bandwidth of the PPDU may follow the same channelization mapping of the basic service set (BSS). In some examples, the operations of 3015 may be performed according to the methods described herein. In certain examples, aspects of the operations of 3015 may be performed by a secondary channel manager as described with reference to FIGS. 15 through 20.

Figure 31:
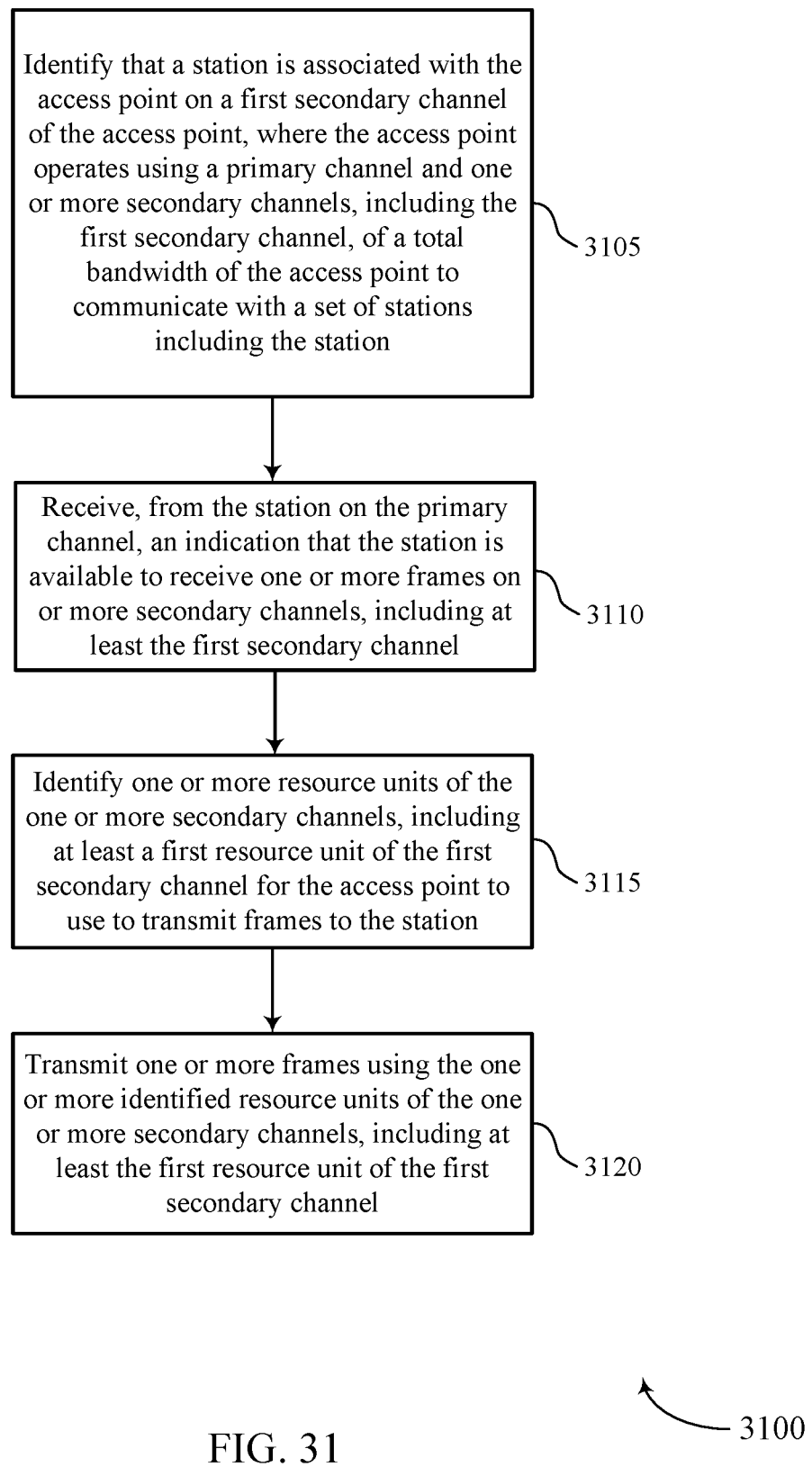

FIG. 31 shows a flowchart illustrating a method 3100 for mechanisms to support mechanisms to support secondary channel operation in accordance with aspects of the present disclosure. The operations of method 3100 may be implemented by an AP 105 or its components as described herein. For example, the operations of method 3100 may be performed by an AP communications manager as described with reference to FIGS. 14 through 21. In some examples, an AP 105 may execute a set of codes to control the functional elements of the device to perform the functions described below. Additionally or alternatively, the AP 105 may perform aspects of the functions described below using special-purpose hardware.

At 3105, the AP 105 may identify that a station is associated with the access point on a first secondary channel of the access point, where the access point operates using a primary channel and one or more secondary channels, including the first secondary channel, of a total bandwidth of the access point to communicate with a plurality of stations including the station. The operations of 3105 may be performed according to the methods described herein. In certain examples, aspects of the operations of 3105 may be performed by an association manager as described with reference to FIG. 18.

At 3110, the AP 105 may receive, from the station on the primary channel, an indication that the station is available to receive one or more frames on one or more secondary channels, including at least the first secondary channel. In some cases, the station may be assigned an SST channel (e.g., the first secondary channel) via an individual (or unicast) addressed frame. For instance, the station and AP 105 may perform TWT negotiations via unicast TWT request/TWT response frames. In such cases, the AP 105 and station may be capable of communicating over a wider bandwidth (i.e., any bandwidth supported by the station), as long as the station has indicated a wideband capability, and provided that the SST channel is part of the PPDU transmission.

In some other cases, the station and AP 105 may perform TWT negotiations via broadcast frames. In such cases, the AP 105 may only send frames to one or more stations, including the station, that are limited to the indicated SST channel. As an example, if a second station is not amongst the one or more stations, including the station, that has negotiated a SST channel using broadcast frames (e.g., broadcast TWT element), the AP 105 may not simultaneously communicate with the first and second station in a broadcast manner. The operations of 3110 may be performed according to the methods described herein. In certain examples, aspects of the operations of 3110 may be performed by a secondary channel manager as described with reference to FIGS. 15 through 20.

At 3115, the AP 105 may identify one or more resource units of the one or more secondary channels, including at least a first resource unit of the first secondary channel for the access point to use to transmit frames to the station. The operations of 3115 may be performed according to the methods described herein. In certain examples, aspects of the operations of 3115 may be performed by a resource unit controller or resource unit manager described with reference to FIGS. 15 through 20.

At 3120, the AP 105 may transmit one or more frames using the one or more identified resource units of the one or more secondary channels, including at least the first resource unit of the first secondary channel. The operations of 3120 may be performed according to the methods described herein. In certain examples, aspects of the operations of 3120 may be performed by a secondary channel manager as described with reference to FIGS. 15 through 20.

Figure 32:
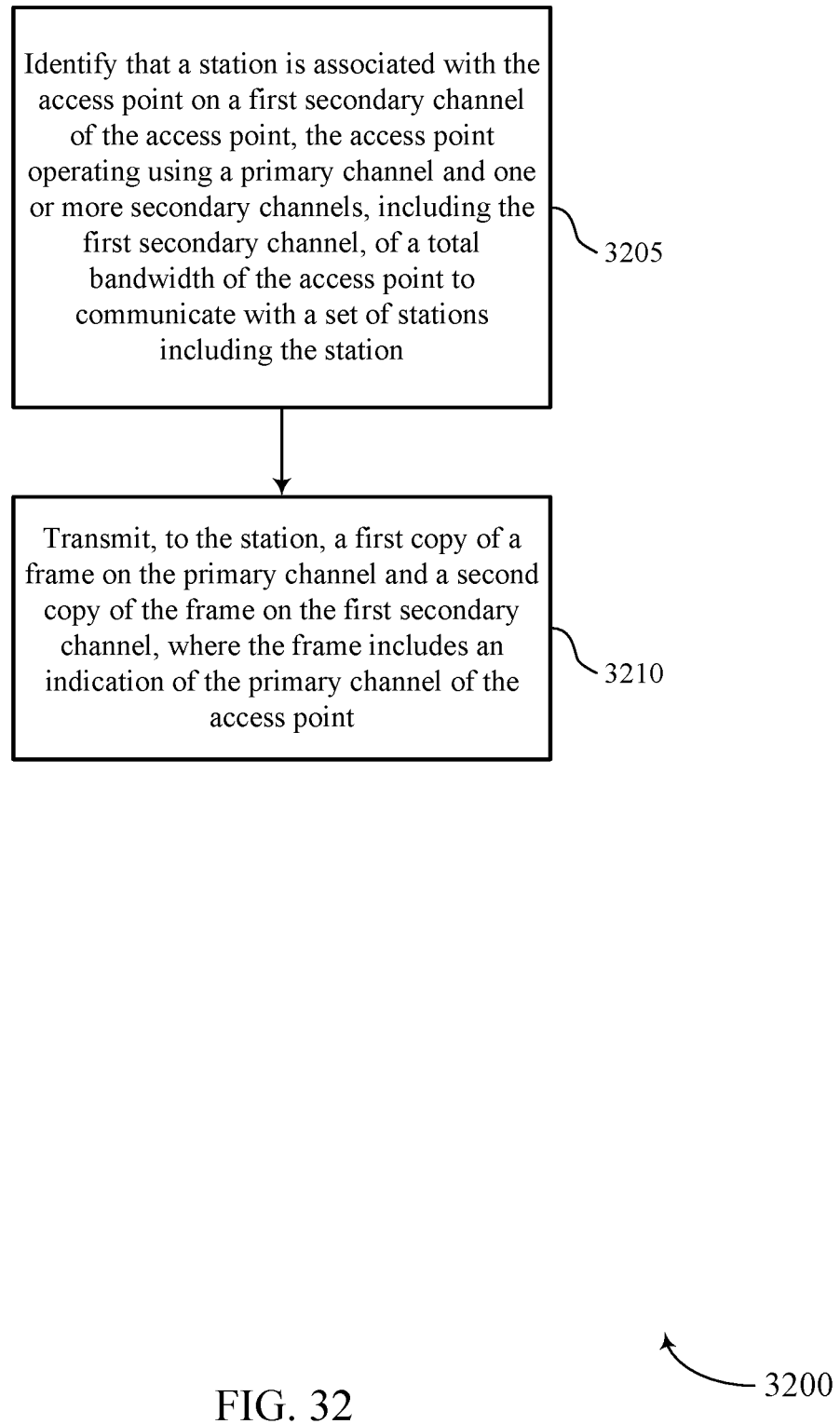

FIG. 32 shows a flowchart illustrating a method 3200 for mechanisms to support mechanisms to support secondary channel operation in accordance with aspects of the present disclosure. The operations of method 3200 may be implemented by an AP 105 or its components as described herein. For example, the operations of method 3200 may be performed by an AP communications manager as described with reference to FIGS. 22 through 29. In some examples, an AP 105 may execute a set of codes to control the functional elements of the device to perform the functions described below. Additionally or alternatively, the AP 105 may perform aspects of the functions described below using special-purpose hardware.

At 3205, the AP 105 may identify that a station is associated with the access point on a first secondary channel of the access point, the access point operating using a primary channel and one or more secondary channels, including the first secondary channel, of a total bandwidth of the access point to communicate with a plurality of stations including the station. The operations of 3205 may be performed according to the methods described herein. In certain examples, aspects of the operations of 3205 may be performed by an association manager as described with reference to FIGS. 23, 24, and 26.

At 3210, the AP 105 may transmit, to the station, a first copy of a frame on the primary channel and a second copy of the frame on the first secondary channel, and the frame includes an indication of the primary channel of the access point. The operations of 3210 may be performed according to the methods described herein. In certain examples, aspects of the operations of 3210 may be performed by a duplication controller as described with reference to FIGS. 23-24.

Figure 33:
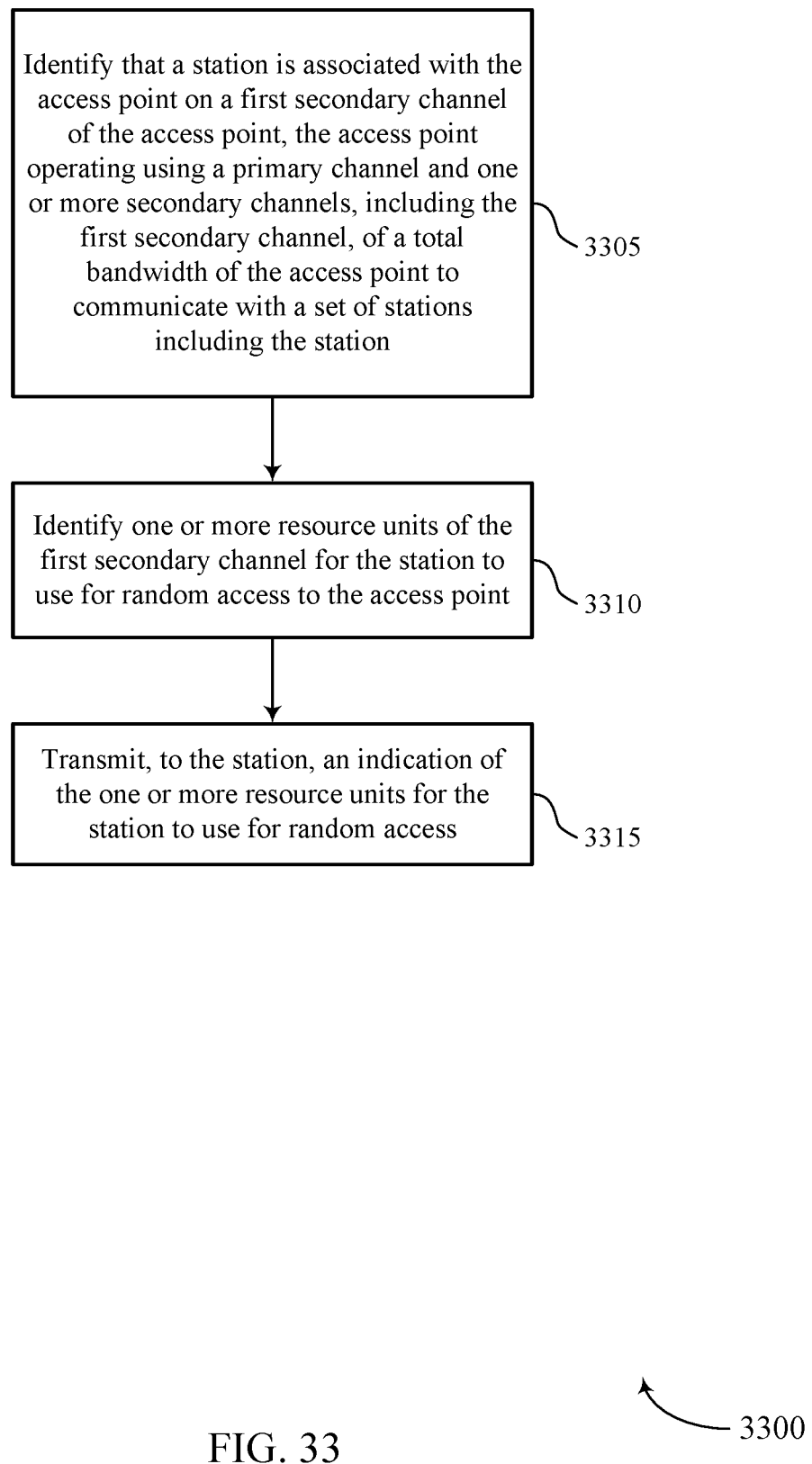

FIG. 33 shows a flowchart illustrating a method 3300 for mechanisms to support mechanisms to support secondary channel operation in accordance with aspects of the present disclosure. The operations of method 3300 may be implemented by an AP 105 or its components as described herein. For example, the operations of method 3300 may be performed by an AP communications manager as described with reference to FIGS. 15 through 18. In some examples, an AP 105 may execute a set of codes to control the functional elements of the device to perform the functions described below. Additionally or alternatively, the AP 105 may perform aspects of the functions described below using special-purpose hardware.

At 3305, the AP 105 may identify that a station is associated with the access point on a first secondary channel of the access point, the access point operating using a primary channel and one or more secondary channels, including the first secondary channel, of a total bandwidth of the access point to communicate with a plurality of stations including the station. The operations of 3305 may be performed according to the methods described herein. In certain examples, aspects of the operations of 3305 may be performed by an association manager as described with reference to FIGS. 23, 24, and 26.

At 3310, the AP 105 may identify one or more resource units of the first secondary channel for the station to use for random access to the access point. The operations of 3310 may be performed according to the methods described herein. In certain examples, aspects of the operations of 3310 may be performed by a resource unit controller as described with reference to FIGS. 23 through 24.

At 3315, the AP 105 may transmit, to the station, an indication of the one or more resource units for the station to use for random access. The operations of 3315 may be performed according to the methods described herein. In certain examples, aspects of the operations of 3315 may be performed by a random access manager as described with reference to FIGS. 23 through 24.

Figure 34:
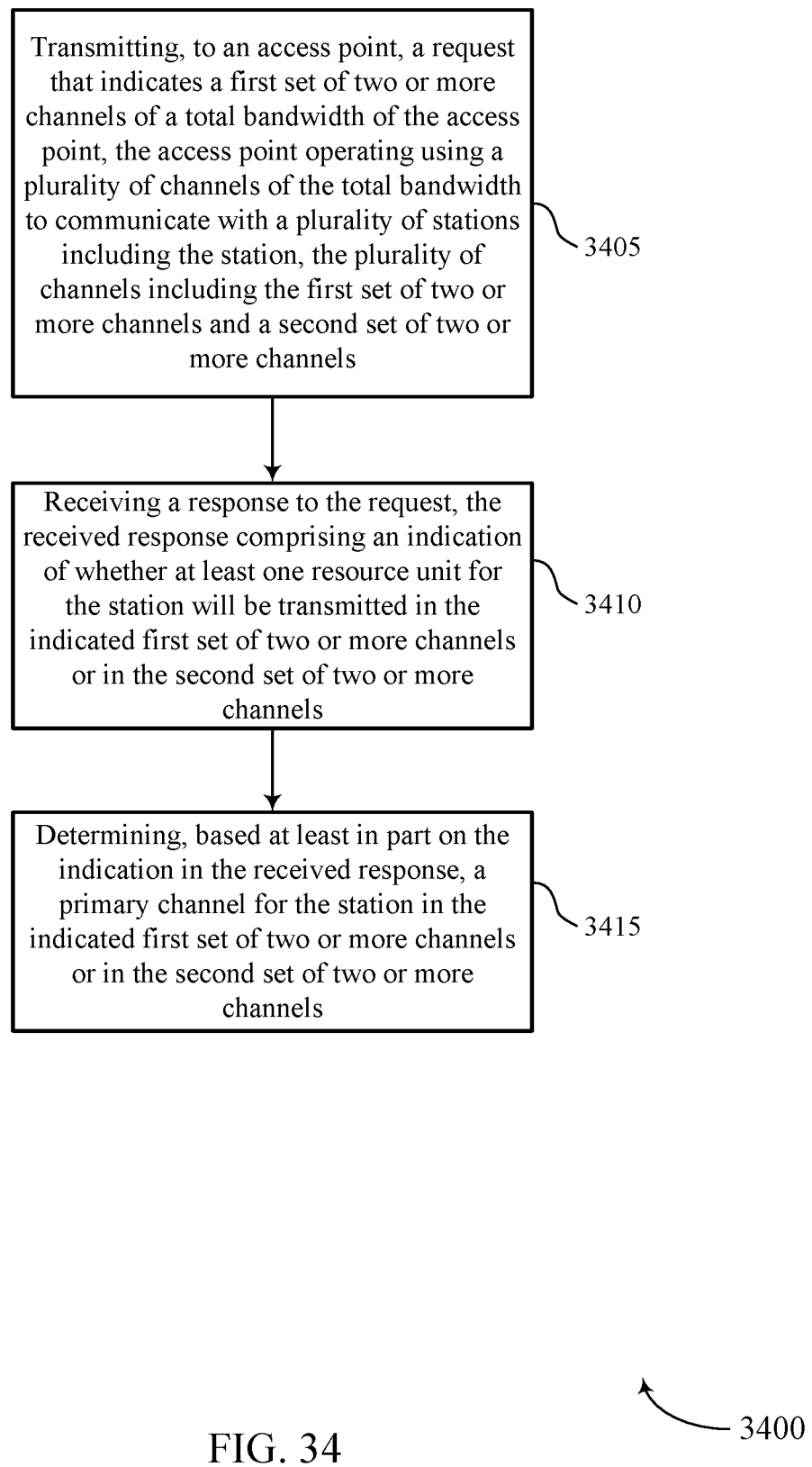

FIG. 34 shows a flowchart illustrating a method 3400 for mechanisms to support mechanisms to support secondary channel operation in accordance with aspects of the present disclosure. The operations of method 3400 may be implemented by a STA 115 or its components as described herein. For example, the operations of method 3400 may be performed by a STA communications manager as described with reference to FIGS. 14 through 21. In some examples, a STA 115 may execute a set of codes to control the functional elements of the device to perform the functions described below. Additionally or alternatively, the STA 115 may perform aspects of the functions described below using special-purpose hardware.

At 3405, the STA 115 may transmit, to an access point, a request that indicates a first set of two or more channels of a total bandwidth of the access point, the access point operating using a plurality of channels of the total bandwidth to communicate with a plurality of stations including the station, the plurality of channels including the first set of two or more channels and a second set of two or more channels. The operations of 3405 may be performed according to the methods described herein. In certain examples, aspects of the operations of 3405 may be performed by a request manager as described with reference to FIGS. 17 through 18.

At 3410, the STA 115 may receive a response to the request, the received response comprising an indication of whether at least one resource unit for the station will be transmitted in the indicated first set of two or more channels or in the second set of two or more channels. The operations of 3410 may be performed according to the methods described herein. In certain examples, aspects of the operations of 3410 may be performed by a response manager as described with reference to FIGS. 17 through 18.

At 3415, the STA 115 may determine, based at least in part on the indication in the received response, a primary channel for the station in the indicated first set of two or more channels or in the second set of two or more channels. The operations of 3415 may be performed according to the methods described herein. In certain examples, aspects of the operations of 3415 may be performed by a primary channel manager as described with reference to FIGS. 15 through 19.

Figure 35:
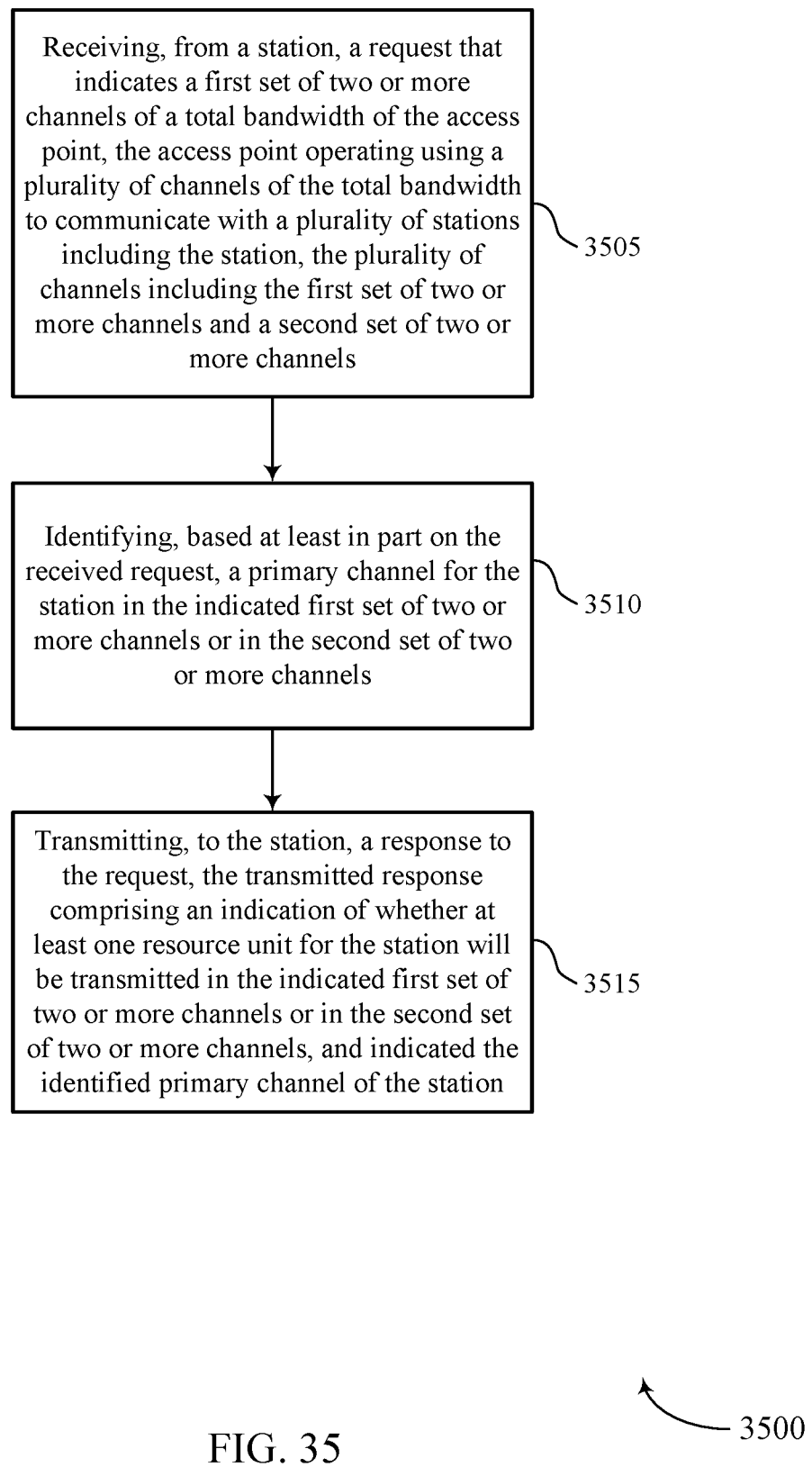

FIG. 35 shows a flowchart illustrating a method 3500 for mechanisms to support mechanisms to support secondary channel operation in accordance with aspects of the present disclosure. The operations of method 3500 may be implemented by an AP 105 or its components as described herein. For example, the operations of method 3500 may be performed by an AP communications manager as described with reference to FIGS. 22 through 29. In some examples, an AP 105 may execute a set of codes to control the functional elements of the device to perform the functions described below. Additionally or alternatively, the AP 105 may perform aspects of the functions described below using special-purpose hardware.

At 3505, the AP 105 may receive, from a station, a request that indicates a first set of two or more channels of a total bandwidth of the access point, the access point operating using a plurality of channels of the total bandwidth to communicate with a plurality of stations including the station, the plurality of channels including the first set of two or more channels and a second set of two or more channels. The operations of 3505 may be performed according to the methods described herein. In certain examples, aspects of the operations of 3505 may be performed by a request manager as described with reference to FIGS. 25 through 26.

At 3510, the AP 105 may identify, based at least in part on the received request, a primary channel for the station in the indicated first set of two or more channels or in the second set of two or more channels. The operations of 3510 may be performed according to the methods described herein. In certain examples, aspects of the operations of 3510 may be performed by a primary channel manager as described with reference to FIGS. 25 through 28.

At 3515, the AP may transmit, to the station, a response to the request, the transmitted response comprising an indication of whether at least one resource unit for the station will be transmitted in the indicated first set of two or more channels or in the second set of two or more channels, and indicated the identified primary channel of the station. The operations of 3515 may be performed according to the methods described herein. In certain examples, aspects of the operations of 3515 may be performed by a response manager as described with reference to FIGS. 25 through 26.

Figure 36:
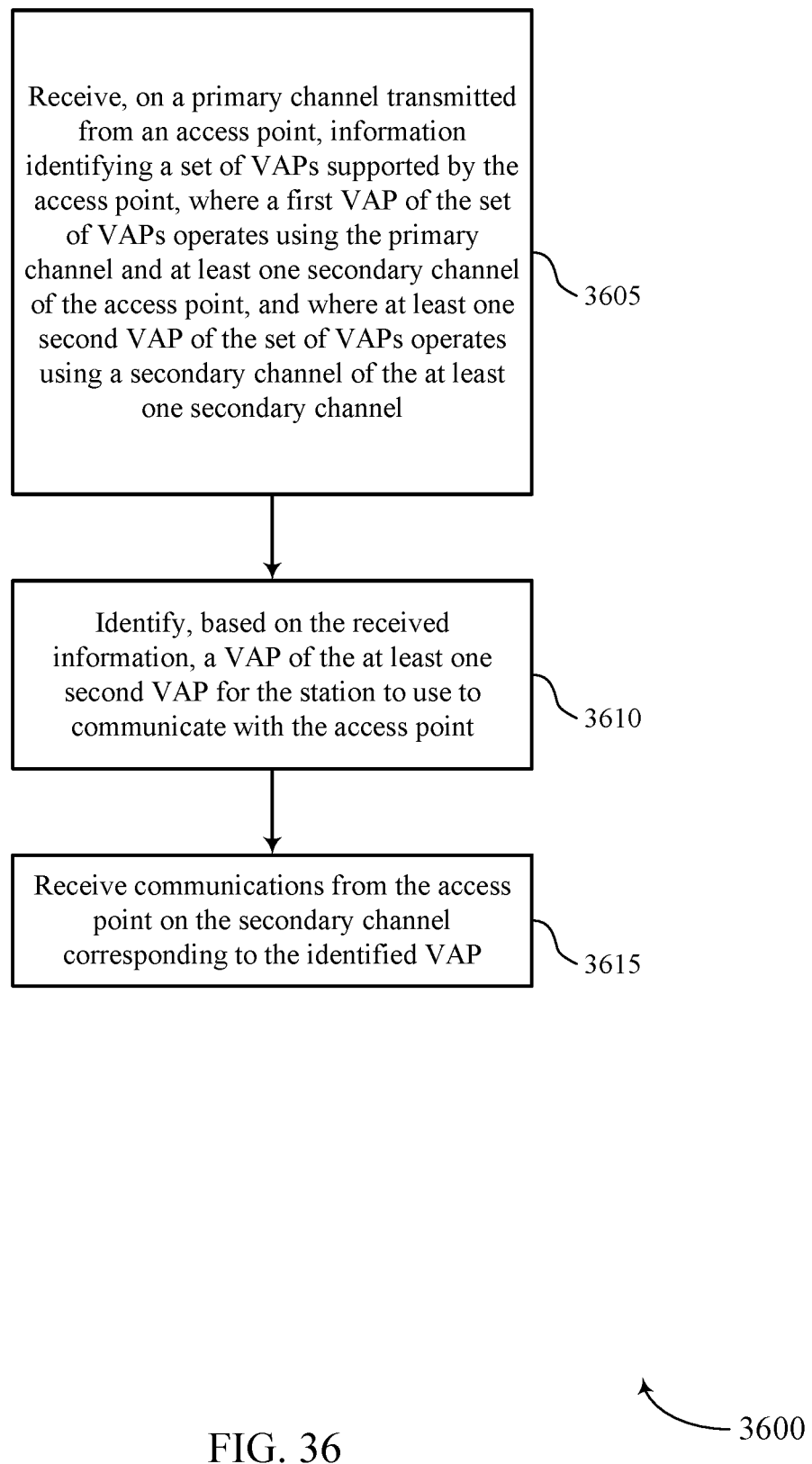

FIG. 36 shows a flowchart illustrating a method 3600 for multiple basic service sets supporting secondary channels in accordance with aspects of the present disclosure. The operations of method 3600 may be implemented by a STA 115 or its components as described herein. For example, the operations of method 3600 may be performed by a STA communications manager as described with reference to FIGS. 14 through 21. In some examples, a STA 115 may execute a set of codes to control the functional elements of the device to perform the functions described below. Additionally or alternatively, the STA 115 may perform aspects of the functions described below using special-purpose hardware.

At 3605 the STA 115 may receive, on a primary channel transmitted from an access point, information identifying a plurality of VAPs supported by the access point, a first VAP of the plurality of VAPs operates using the primary channel and at least one secondary channel of the access point, and at least one second VAP of the plurality of VAPs operates using a secondary channel of the at least one secondary channel. The operations of 3605 may be performed according to the methods described herein. In certain examples, aspects of the operations of 3605 may be performed by a primary channel controller as described with reference to FIGS. 19 through 20.

At 3610 the STA 115 may identify, based at least in part on the received information, a VAP of the at least one second VAP for the station to use to communicate with the access point. The operations of 3610 may be performed according to the methods described herein. In certain examples, aspects of the operations of 3610 may be performed by a VAP manager as described with reference to FIGS. 19 through 20.

At 3615 the STA 115 may receive communications from the access point on the secondary channel corresponding to the identified VAP. The operations of 3615 may be performed according to the methods described herein. In certain examples, aspects of the operations of 3615 may be performed by a secondary channel manager as described with reference to FIGS. 15 through 20.

Figure 37:
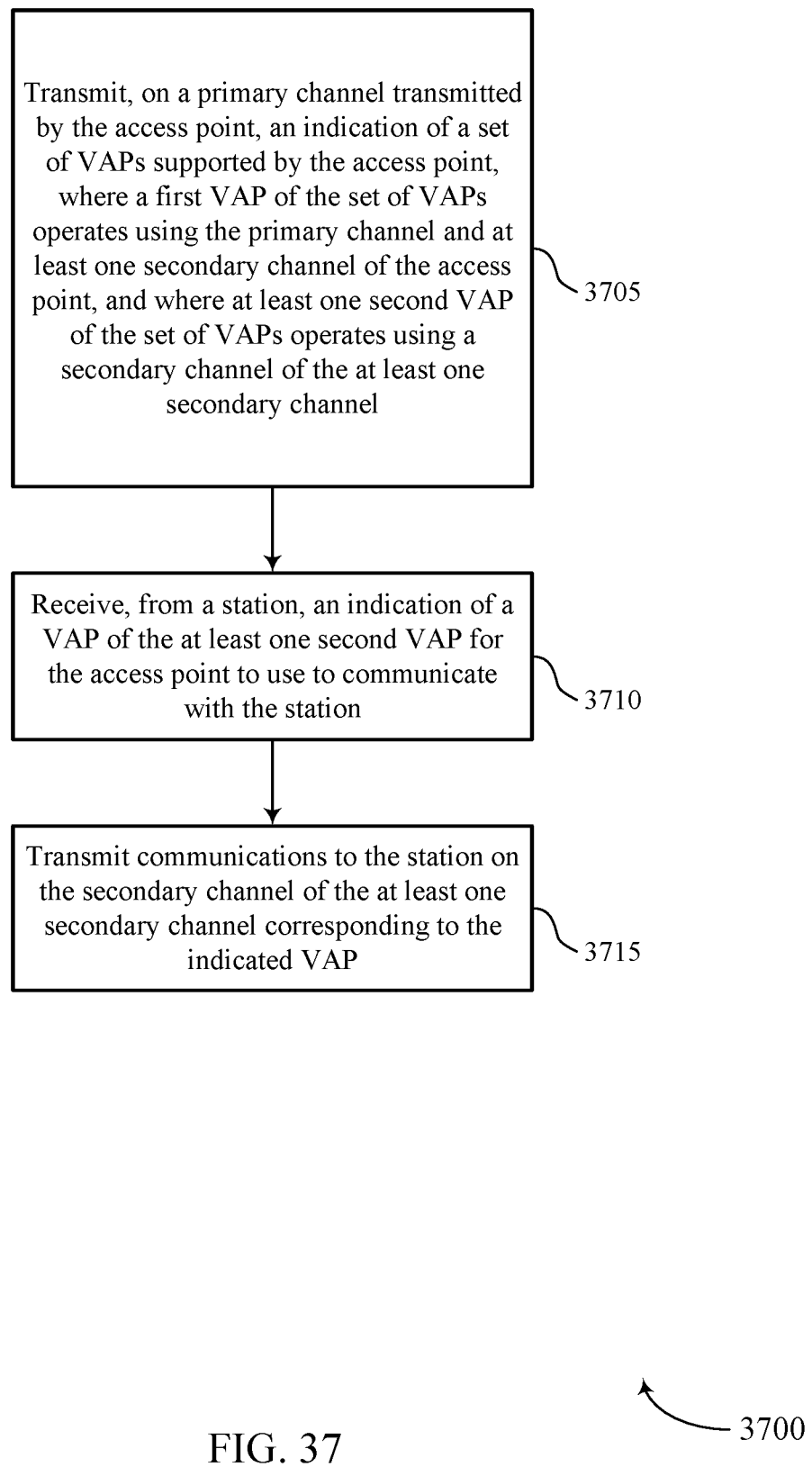

FIG. 37 shows a flowchart illustrating a method 3700 for multiple basic service sets supporting secondary channels in accordance with aspects of the present disclosure. The operations of method 3700 may be implemented by a AP 105 or its components as described herein. For example, the operations of method 3700 may be performed by a AP communications manager as described with reference to FIGS. 22 through 29. In some examples, a AP 105 may execute a set of codes to control the functional elements of the device to perform the functions described below. Additionally or alternatively, the AP 105 may perform aspects of the functions described below using special-purpose hardware.

At 3705 the AP 105 may transmit, on a primary channel transmitted by the access point, an indication of a plurality of VAPs supported by the access point, a first VAP of the plurality of VAPs operates using the primary channel and at least one secondary channel of the access point, and at least one second VAP of the plurality of VAPs operates using a secondary channel of the at least one secondary channel. The operations of 3705 may be performed according to the methods described herein. In certain examples, aspects of the operations of 3705 may be performed by a primary channel manager as described with reference to FIGS. 26 through 28.

At 3710 the AP 105 may receive, from a station, an indication of a VAP of the at least one second VAP for the access point to use to communicate with the station. The operations of 3710 may be performed according to the methods described herein. In certain examples, aspects of the operations of 3710 may be performed by a VAP controller as described with reference to FIGS. 27 through 28.

At 3715 the AP 105 may transmit communications to the station on the secondary channel of the at least one secondary channel corresponding to the indicated VAP. The operations of 3715 may be performed according to the methods described herein. In certain examples, aspects of the operations of 3715 may be performed by a secondary channel manager as described with reference to FIGS. 23 through 28.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A wireless station, comprising:
a processing system that includes processor circuitry and memory circuitry that stores code, the processing system configured to cause the wireless station to:
transmit, to an access point operating using a primary channel and a plurality of secondary channels of a total bandwidth of the access point, a request to include a resource unit allocation for the wireless station on a set of two or more secondary channels of the plurality of secondary channels;
receive, from the access point based at least in part on the request, a communication addressed to the wireless station; and
exchange, based at least in part on the received communication, one or more frames with the access point on the set of two or more secondary channels of the plurality of secondary channels.

2. The wireless station of claim 1, wherein, to receive the communication, the processing system is configured to cause the wireless station to receive a unicast communication addressed to the wireless station.

3. A wireless station, comprising:
a processing system that includes processor circuitry and memory circuitry that stores code, the processing system configured to cause the wireless station to:
transmit, to an access point operating using a primary channel and one or more secondary channels of a total bandwidth of the access point, a request to include a resource unit allocation for the wireless station on at least a first secondary channel of the one or more secondary channels;
receive, from the access point based at least in part on the request, a communication addressed to the wireless station, wherein the received communications is a broadcast communication addressed to a group of wireless stations; and
exchange, based at least in part on the received communication, one or more frames with the access point on at least the first secondary channel of the one or more secondary channels.

4. The wireless station of claim 1, wherein, to transmit the request, the processing system is configured to cause the wireless station to transmit the request on the primary channel.

5. The wireless station of claim 4, wherein a target wake time (TWT) schedule is identified for the set of two or more secondary channels, the request corresponds to a TWT request transmitted to the access point on the primary channel, and the received communication corresponds to a TWT response received from the access point on the primary channel.

6. The wireless station of claim 1, wherein the processing system is further configured to cause the wireless station to:
receive, on the set of two or more secondary channels of the plurality of secondary channels, a trigger frame from the access point; and
identify, based at least in part on the trigger frame, a resource unit of the set of two or more secondary channels for the wireless station to use to transmit uplink frames to the access point in response to the trigger frame.

7. The wireless station of claim 1, wherein the processing system is further configured to cause the wireless station to:
listen for transmissions from the access point during a plurality of target wake time (TWT) service periods defined by a TWT schedule.

8. The wireless station of claim 1, wherein the processing system is further configured to cause the wireless station to:
listen for transmissions from the access point during a delivery traffic indication map (DTIM) target beacon transmission time (TBTT).

9. The wireless station of claim 7, wherein the request corresponds to a TWT request, the received communication corresponds to a TWT response from the access point, and the processing system is further configured to cause the wireless station to:
identify the TWT schedule based at least in part on the TWT request and the TWT response.

10. The wireless station of claim 1, wherein the wireless station exchanges data frames with the access point on the set of two or more secondary channels of the plurality of secondary channels exclusive of transmissions on the primary channel.

11. The wireless station of claim 1, wherein a bandwidth of the primary channel is 20 MHz, a bandwidth of a first secondary channel of the one or more secondary channels is 20 MHz, and the total bandwidth of the access point is an integer multiple of 20 MHz.

12. The wireless station of claim 1, wherein the wireless station is configured to communicate with the access point using a latency below a threshold.

13. The wireless station of claim 1, wherein the wireless station is configured to communicate with the access point according to an Enhanced Distributed Channel Access (EDCA) protocol.

14. The wireless station of claim 13, wherein the wireless station exchanges data frames with the access point on the primary channel.

15. The wireless station of claim 1, wherein the processing system is further configured to cause the wireless station to:
transmit a Request to Send (RTS) to the access point to block a first set of one or more secondary channels of the total bandwidth of the access point; and
receive a Clear to Send (CTS) message from the access point in response to the RTS, the CTS message blocking the total bandwidth.

16. A method for wireless communication at a wireless station, comprising:
transmitting, to an access point operating using a primary channel and a plurality of secondary channels of a total bandwidth of the access point, a request to include a resource unit allocation for the wireless station on a set of two or more secondary channels of the plurality of secondary channels;
receiving, from the access point based at least in part on the request, a communication addressed to the wireless station; and
exchanging, based at least in part on the received communication, one or more frames with the access point on the set of two or more secondary channels of the plurality of secondary channels.

17. The method of claim 16, wherein receiving the communication comprises receiving a unicast communication addressed to the wireless station.

18. The method of claim 16, further comprising:
receiving, on the set of two or more secondary channels of the plurality of secondary channels, a trigger frame from the access point; and
identifying, based at least in part on the trigger frame, a resource unit of the set of two or more secondary channels for the wireless station to use to transmit uplink frames to the access point in response to the trigger frame.

19. A method for wireless communication at a wireless station, comprising:
transmitting, to an access point operating using a primary channel and one or more secondary channels of a total bandwidth of the access point, a request to include a resource unit allocation for the wireless station on at least a first secondary channel of the one or more secondary channels;
receiving, from the access point based at least in part on the request, a communication addressed to the wireless station, wherein the received communication is a broadcast communication addressed to a group of wireless stations; and
exchanging, based at least in part on the received communication, one or more frames with the access point on at least the first secondary channel of the one or more secondary channels.

20. The method of claim 16, wherein transmitting the request comprises transmitting the request on the primary channel.

21. The method of claim 20, wherein a target wake time (TWT) schedule is identified for the set of two or more secondary channels, the request corresponds to a TWT request transmitted to the access point on the primary channel, the received communication corresponds to and a TWT response received from the access point on the primary channel.

22. A wireless station, comprising:
a processing system that includes processor circuitry and memory circuitry that stores code, the processing system configured to cause the wireless station to:
listen for transmissions from an access point on a set of two or more secondary channels of the access point based at least in part on a request to include a resource unit allocation for the wireless station on the set of two or more secondary channels, the access point operating using a primary channel and a plurality of secondary channels of a total bandwidth of the access point including the set of two or more secondary channels;

receive, from the access point, a communication addressed to one or more wireless stations that includes the wireless station; and exchange, based at least in part on the received communication, one or more frames with the access point on the set of two or more secondary channels and excluding the primary channel.

23. The wireless station of claim 22, wherein the processing system is further configured to cause the wireless station to:

transmit, to the access point on the set of two or more secondary channels, the request to include the resource unit allocation for the wireless station on the set of two or more secondary channels of the plurality of secondary channels.

24. The wireless station of claim 22, wherein the processing system is further configured to cause the wireless station to:

receive, on the set of two or more secondary channels of the plurality of secondary channels, a trigger frame from the access point; and transmit, in response to the trigger frame, one or more uplink frames to the access point using one or more resource units of the set of two or more secondary channels.

25. The wireless station of claim 22, wherein, to receive the communication, the processing system is configured to cause the wireless station to receive a plurality of beacons.

26. The wireless station of claim 25, wherein at least one beacon of the plurality of beacons includes a delivery traffic indication map (DTIM).

27. The wireless station of claim 26, wherein the DTIM is addressed to a group of wireless stations that includes the wireless station.

28. The wireless station of claim 25, wherein the plurality of beacons comprise a subset of all beacons transmitted by the access point on the primary channel.

* * * * *